US012670228B2

(12) United States Patent
Tran et al.

(10) Patent No.: US 12,670,228 B2
(45) Date of Patent: Jun. 30, 2026

(54) VECTOR-BY-MATRIX-MULTIPLICATION ARRAY UTILIZING ANALOG OUTPUTS

(71) Applicant: Silicon Storage Technology, Inc., San Jose, CA (US)

(72) Inventors: Hieu Van Tran, San Jose, CA (US); Thuan Vu, San Jose, CA (US); Stanley Hong, San Jose, CA (US); Stephen Trinh, San Jose, CA (US); Mark Reiten, Alamo, CA (US)

(73) Assignee: Silicon Storage Technology, Inc., San Jose, CA (US)

( * ) Notice: Subject to any disclaimer, the term of this patent is extended or adjusted under 35 U.S.C. 154(b) by 1043 days.

(21) Appl. No.: 17/847,491

(22) Filed: Jun. 23, 2022

(65) Prior Publication Data

US 2023/0325650 A1 Oct. 12, 2023

Related U.S. Application Data

(60) Provisional application No. 63/328,473, filed on Apr. 7, 2022.

(51) Int. Cl.
*G06N 3/065* (2023.01)
*G06F 17/16* (2006.01)
(Continued)

(52) U.S. Cl.
CPC .............. *G06N 3/065* (2023.01); *G06F 17/16* (2013.01); *G06N 3/048* (2023.01); *G06G 7/16* (2013.01)

(58) Field of Classification Search
CPC .......... G06G 7/16; G11C 11/54; G11C 13/00; G11C 7/1006; G06N 3/063; G06N 3/065;
(Continued)

(56) References Cited

U.S. PATENT DOCUMENTS

| 5,029,130 | A | 7/1991 | Yeh |
| 6,747,310 | B2 | 6/2004 | Fan |

(Continued)

FOREIGN PATENT DOCUMENTS

| JP | 2022517810 | A | 3/2022 |
| TW | 202040779 | | 11/2020 |

(Continued)

OTHER PUBLICATIONS

Mercer, Doug. "Wiki." Chapter 11: The Current Mirror [Analog Devices Wiki], 2021, wiki.analog.com/university/courses/electronics/text/chapter-11. (Year: 2021).*

(Continued)

*Primary Examiner* — Andrew Caldwell
*Assistant Examiner* — Huy Duong
(74) *Attorney, Agent, or Firm* — Vedder Price P.C.

(57) ABSTRACT

Numerous examples are disclosed of an artificial neural network that comprises vector-by-matrix multiplication arrays utilizing analog outputs. In one example, a system comprises a vector by matrix multiplication array comprising a plurality of non-volatile memory cells arranged in rows and columns; and an output circuit to receive a respective neuron current from respective columns of the vector by matrix multiplication array and to generate a respective output voltage, the output circuit comprising a neuron scalar to generate a scaled current from the received respective neuron current, and a current-to-voltage converter to convert the scaled current into the respective output voltage.

11 Claims, 54 Drawing Sheets

VMM System
3900

(51) Int. Cl.
    *G06G 7/16*         (2006.01)
    *G06N 3/048*       (2023.01)

(58) Field of Classification Search
    CPC .... G06N 3/048; G06N 3/0442; G06N 3/0464;
            G06N 3/04; G06N 3/08; G06N 3/044;
            G06N 3/0475; G06N 3/0495; G06N
            3/0499; G06N 3/047; G06N 3/0895;
            G06N 3/09; G06N 3/091; G06N 3/092;
            G06N 3/094; G06N 3/096; G06N 3/098;
            G06N 3/0985; G06F 15/7821; G06F
            15/785; G06F 7/44–443; G06F 7/523;
                          G06F 7/5443
    See application file for complete search history.

(56) References Cited

U.S. PATENT DOCUMENTS

| | | | |
|---|---|---|---|
| 10,748,630 | B2 | 8/2020 | Tran |
| 2017/0337466 | A1 | 11/2017 | Bayat |
| 2018/0253643 | A1* | 9/2018 | Buchanan ............. G06F 7/5443 |
| 2020/0234111 | A1* | 7/2020 | Tran ........................ G06N 3/044 |
| 2020/0342938 | A1* | 10/2020 | Tran ........................ G11C 16/08 |
| 2020/0349421 | A1* | 11/2020 | Tran ........................ G11C 29/50 |
| 2021/0209456 | A1* | 7/2021 | Tran ..................... G11C 16/349 |
| 2021/0209457 | A1* | 7/2021 | Tran ..................... G06N 3/0442 |
| 2021/0209458 | A1* | 7/2021 | Tran ..................... G06N 3/0442 |
| 2021/0280240 | A1* | 9/2021 | Tran ........................ G06N 3/063 |
| 2021/0350217 | A1* | 11/2021 | Tran ................... G11C 16/0425 |
| 2021/0358551 | A1* | 11/2021 | Tran ................... G11C 16/0433 |
| 2022/0004860 | A1* | 1/2022 | Tran ................... G11C 16/0425 |
| 2022/0028444 | A1* | 1/2022 | Papageorgiou ........ G06N 3/048 |
| 2022/0115067 | A1* | 4/2022 | Mackin .................. G06N 3/065 |

FOREIGN PATENT DOCUMENTS

| | | |
|---|---|---|
| TW | 202201396 | 1/2022 |
| TW | 202213360 | 4/2022 |

OTHER PUBLICATIONS

PCT Search Report and Written Opinion mailed on Dec. 15, 2022 corresponding to the related PCT Patent Application No. US2022/038094.

Office Action from European Patent Office, filed under European Patent Application No. 22754995.3, 9 pages.

Taiwanese Office Action mailed on Apr. 9, 2024 corresponding to the related Taiwanese Patent Application No. 112109056.

Machine Translation of Office Action from Japan Patent Office, dated Oct. 21, 2025, filed under Japan Application No. 2024-559239, 5 pages.

\* cited by examiner

FIGURE 1 (PRIOR ART)

Memory Cell
210

Memory Cell
310

Memory Cell
410

Memory Cell
510

LSTM
1400

FIGURE 17

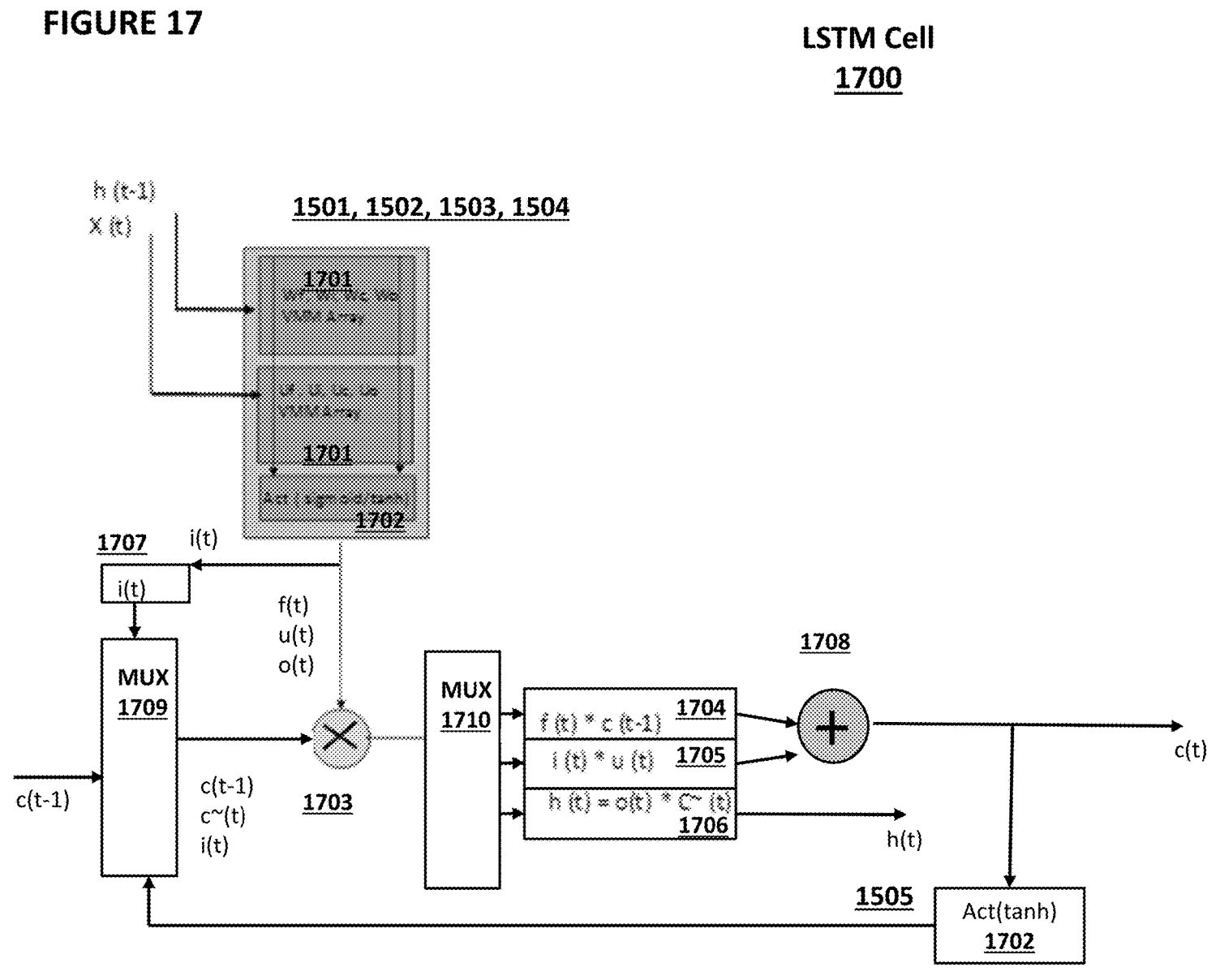

LSTM Cell
1700

1501, 1502, 1503, 1504 h (t-1)

x (t)

1701    1701    1702 i(t)    1707    i(t)

f(t)
u(t)
o(t)

MUX
1709 c(t-1)
c~(t)
i(t)

×
1703 c(t-1)

MUX
1710 f (t) * c (t-1)    1704 i (t) * u (t)    1705 h (t) = o(t) * C~ (t)    1706

+
1708 c(t)

h(t)

1505

Act(tanh)
1702

2900

VMM System
3300

FIGURE 37

Analog Voltage Input Circuit
3700

FIGURE 39

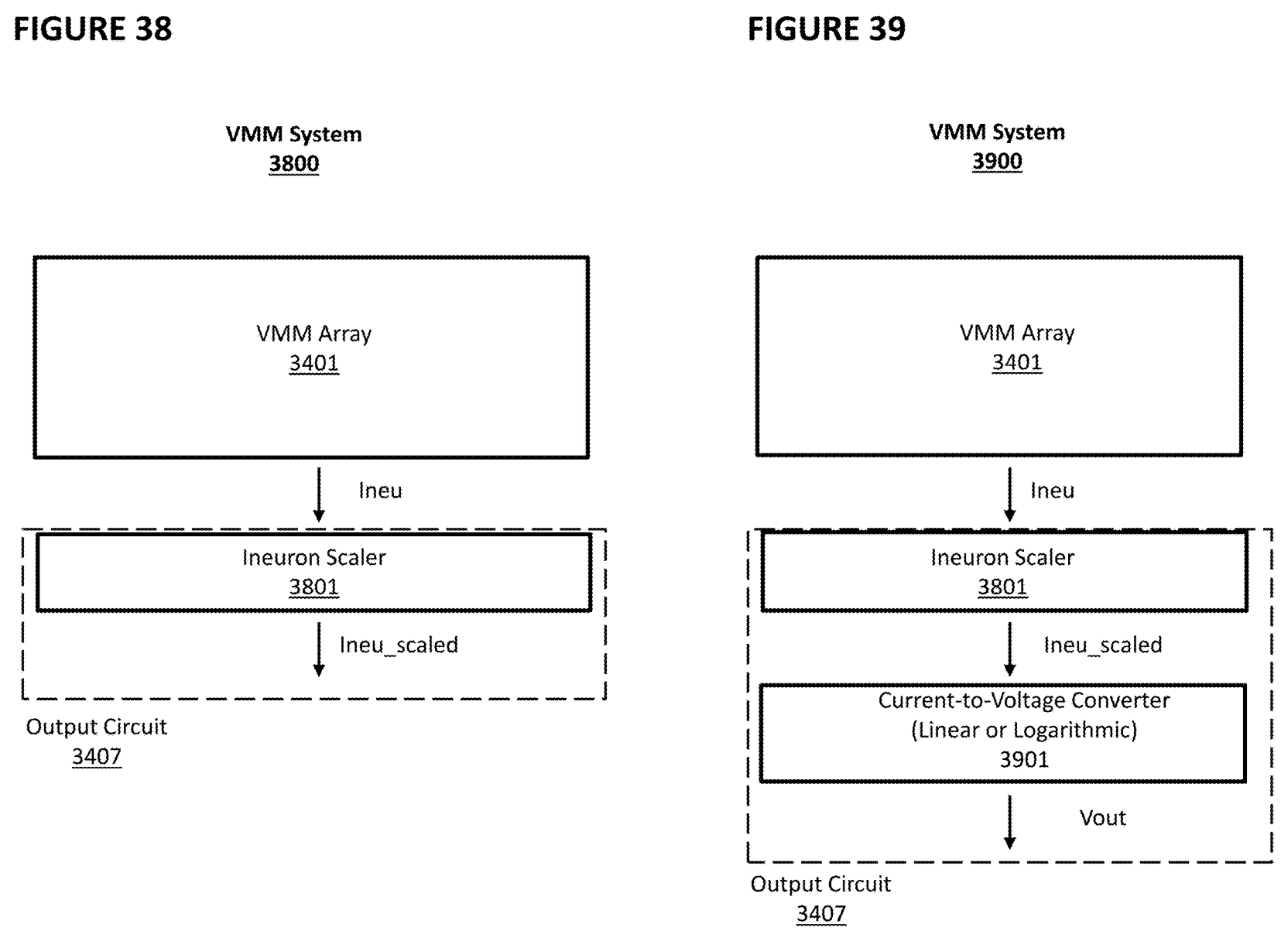

VMM System
3900

VMM Array
3401

Ineu

Ineuron Scaler
3801

Ineu_scaled

Current-to-Voltage Converter
(Linear or Logarithmic)
3901

Vout

Output Circuit
3407

FIGURE 38

VMM System
3800

VMM Array
3401

Ineu

Ineuron Scaler
3801

Ineu_scaled

Output Circuit
3407

VMM System
4100

VMM Array
3401

Ineu

Current-to-Pulse Count
Converter
4101

Pulse_count

Output Circuit
3407

VMM System
4000

VMM Array
3401

Ineu

Current-to-Pulse Width
Converter
4001

Pulse_width

Output Circuit
3407

Current-to-Voltage Converter (Logarithmic)
4650

VNEUOU

COMPOUT

4653

BUFF

4656

VREF

4651

IBL

4655

WL

CG

EG

4654

VIN

4652

Controller
4657

Current-to-Voltage Converter (Logarithmic)
4600

VNEUOUT

4603

BLR

VREF

4601

WL

CG

EG

SL

4602

Controller
4604

Current-to_Pulse Converter 4800

FIGURE 52

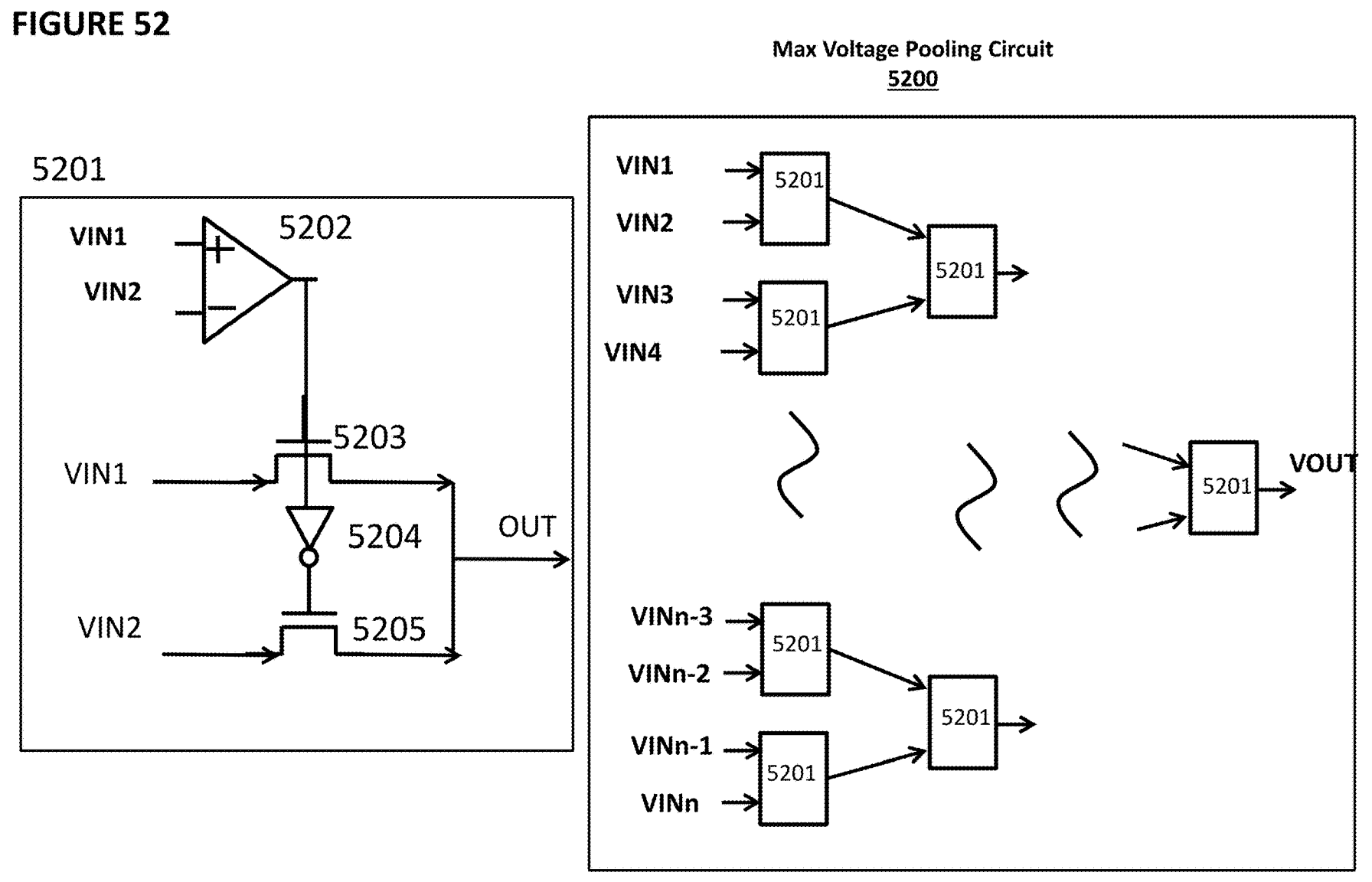

Max Voltage Pooling Circuit
5200

VOUT

VIN1
VIN2
VIN3
VIN4

VINn-3
VINn-2
VINn-1
VINn

5201

5201

5201

5201

5201

5201

5201
VIN1
VIN2

5202

5203
5204
5205

OUT

VIN1

VIN2

VECTOR-BY-MATRIX-MULTIPLICATION ARRAY UTILIZING ANALOG OUTPUTS

PRIORITY CLAIM

This application claims priority to U.S. Provisional Patent Application No. 63/328,473, filed on Apr. 7, 2022, and titled, "Artificial Neural Network Comprising Vector-By-Matrix Multiplication Arrays Utilizing Analog Inputs and Analog Outputs," which is incorporated by reference herein.

FIELD OF THE INVENTION

Numerous examples are disclosed of an artificial neural network comprising vector-by-matrix multiplication arrays utilizing analog outputs.

BACKGROUND OF THE INVENTION

Artificial neural networks mimic biological neural networks (the central nervous systems of animals, in particular the brain) and are used to estimate or approximate functions that can depend on a large number of inputs and are generally unknown. Artificial neural networks generally include layers of interconnected "neurons" which exchange messages between each other.

Figure 1:
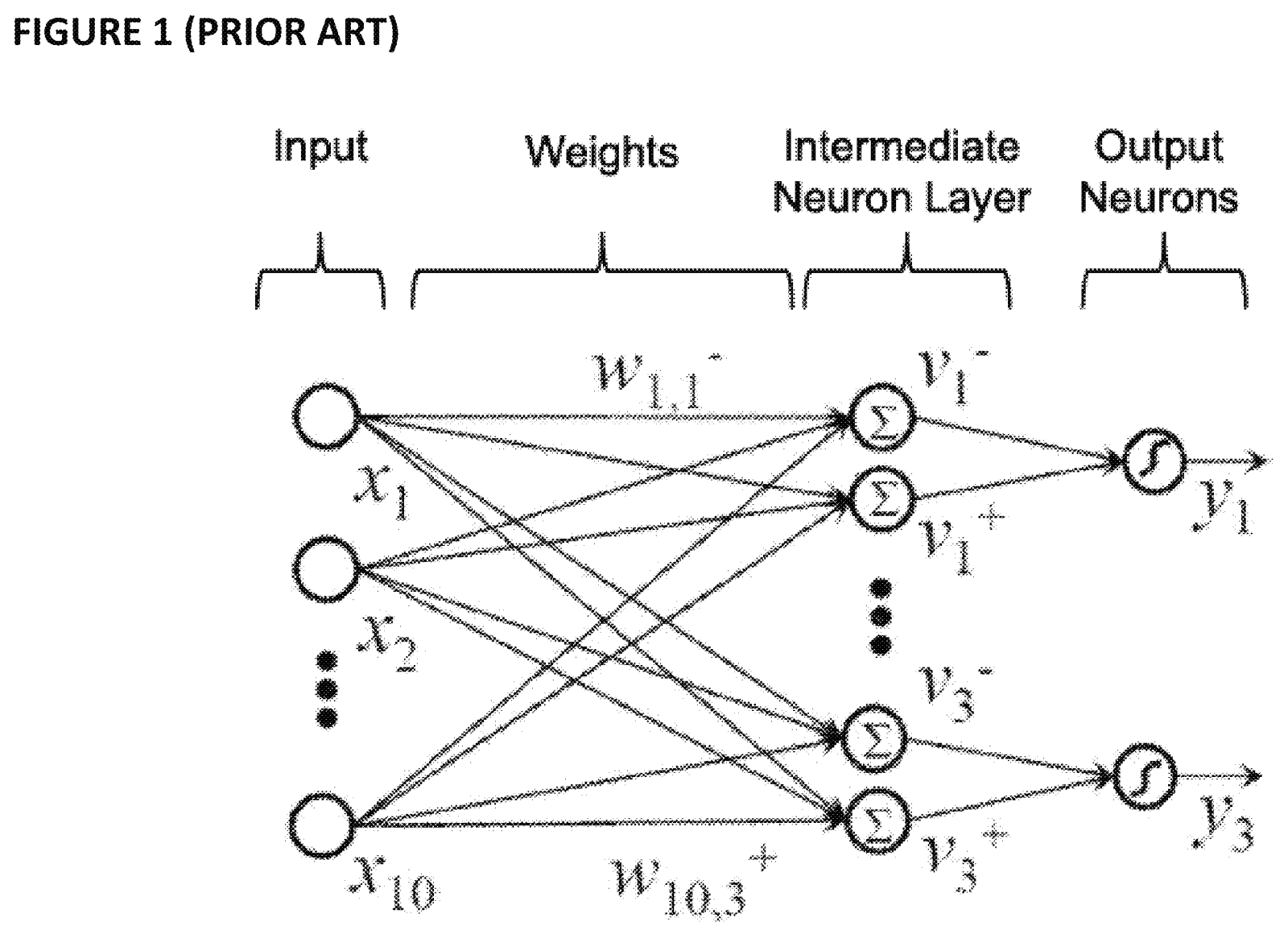

FIG. 1 illustrates an artificial neural network, where the circles represent the inputs or layers of neurons. The connections (called synapses) are represented by arrows and have numeric weights that can be tuned based on experience. This makes neural networks adaptive to inputs and capable of learning. Typically, neural networks include a layer of multiple inputs. There are typically one or more intermediate layers of neurons, and an output layer of neurons that provide the output of the neural network. The neurons at each level individually or collectively make a decision based on the received data from the synapses.

One of the major challenges in the development of artificial neural networks for high-performance information processing is a lack of adequate hardware technology. Indeed, practical neural networks rely on a very large number of synapses, enabling high connectivity between neurons, i.e., a very high computational parallelism. In principle, such complexity can be achieved with digital supercomputers or specialized graphics processing unit clusters. However, in addition to high cost, these approaches also suffer from mediocre energy efficiency as compared to biological networks, which consume much less energy primarily because they perform low-precision analog computation. CMOS analog circuits have been used for artificial neural networks, but most CMOS-implemented synapses have been too bulky given the high number of neurons and synapses.

Applicant previously disclosed an artificial (analog) neural network that utilizes one or more non-volatile memory arrays as the synapses in U.S. Patent Application Publication 2017/0337466A1, which is incorporated by reference. The non-volatile memory arrays operate as an analog neural memory and comprise non-volatile memory cells arranged in rows and columns. The neural network includes a first plurality of synapses configured to receive a first plurality of inputs and to generate therefrom a first plurality of outputs, and a first plurality of neurons configured to receive the first plurality of outputs. The first plurality of synapses includes a plurality of memory cells, wherein each of the memory cells includes spaced apart source and drain regions formed in a semiconductor substrate with a channel region extending there between, a floating gate disposed over and insulated from a first portion of the channel region and a non-floating gate disposed over and insulated from a second portion of the channel region. Each of the plurality of memory cells store a weight value corresponding to a number of electrons on the floating gate. The plurality of memory cells multiply the first plurality of inputs by the stored weight values to generate the first plurality of outputs.

Non-Volatile Memory Cells

Non-volatile memories are well known. For example, U.S. Pat. No. 5,029,130 ("the '130 patent"), which is incorporated herein by reference, discloses an array of split gate non-volatile memory cells, which are a type of flash memory cells. Such a memory cell 210 is shown in FIG. 2. Each memory cell 210 includes source region 14 and drain region 16 formed in semiconductor substrate 12, with channel region 18 there between. Floating gate 20 is formed over and insulated from (and controls the conductivity of) a first portion of the channel region 18, and over a portion of the source region 14. Word line terminal 22 (which is typically coupled to a word line) has a first portion that is disposed over and insulated from (and controls the conductivity of) a second portion of the channel region 18, and a second portion that extends up and over the floating gate 20. The floating gate 20 and word line terminal 22 are insulated from the substrate 12 by a gate oxide. Bitline 24 is coupled to drain region 16.

Memory cell 210 is erased (where electrons are removed from the floating gate) by placing a high positive voltage on the word line terminal 22, which causes electrons on the floating gate 20 to tunnel through the intermediate insulation from the floating gate 20 to the word line terminal 22 via Fowler-Nordheim (FN) tunneling.

Memory cell 210 is programmed by source side injection (SSI) with hot electrons (where electrons are placed on the floating gate) by placing a positive voltage on the word line terminal 22, and a positive voltage on the source region 14. Electron current will flow from the drain region 16 towards the source region 14. The electrons will accelerate and become heated when they reach the gap between the word line terminal 22 and the floating gate 20. Some of the heated electrons will be injected through the gate oxide onto the floating gate 20 due to the attractive electrostatic force from the floating gate 20.

Memory cell 210 is read by placing positive read voltages on the drain region 16 and word line terminal 22 (which turns on the portion of the channel region 18 under the word line terminal). If the floating gate 20 is positively charged (i.e., erased of electrons), then the portion of the channel region 18 under the floating gate 20 is turned on as well, and current will flow across the channel region 18, which is sensed as the erased or "1" state. If the floating gate 20 is negatively charged (i.e., programmed with electrons), then the portion of the channel region under the floating gate 20 is mostly or entirely turned off, and current will not flow (or there will be little flow) across the channel region 18, which is sensed as the programmed or "0" state.

Table No. 1 depicts typical voltage and current ranges that can be applied to the terminals of memory cell 210 for performing read, erase, and program operations:

TABLE NO. 1

| Operation of Flash Memory Cell 210 of FIG. 2 | | | |
|---|---|---|---|
| | WL | BL | SL |
| Read | 2-3 V | 0.6-2 V | 0 V |
| Erase | ~11-13 V | 0 V | 0 V |
| Program | 1-2 V | 10.5-3 μA | 9-10 V |

Other split gate memory cell configurations, which are other types of flash memory cells, are known. For example, FIG. 3 depicts a four-gate memory cell 310 comprising source region 14, drain region 16, floating gate 20 over a first portion of channel region 18, a select gate 22 (typically coupled to a word line, WL) over a second portion of the channel region 18, a control gate 28 over the floating gate 20, and an erase gate 30 over the source region 14. This configuration is described in U.S. Pat. No. 6,747,310, which is incorporated herein by reference for all purposes. Here, all gates are non-floating gates except floating gate 20, meaning that they are electrically connected or connectable to a voltage source. Programming is performed by heated electrons from the channel region 18 injecting themselves onto the floating gate 20. Erasing is performed by electrons tunneling from the floating gate 20 to the erase gate 30.

Table No. 2 depicts typical voltage and current ranges that can be applied to the terminals of memory cell 310 for performing read, erase, and program operations:

TABLE NO. 2

| Operation of Flash Memory Cell 310 of FIG. 3 | | | | |
|---|---|---|---|---|
| | WL/SG | BL | CG | EG | SL |
| Read | 1.0-2 V | 0.6-2 V | 0-2.6 V | 0-2.6 V | 0 V |
| Erase | -0.5 V/0 V | 0 V | 0 V/-8 V | 8-12 V | 0 V |
| Program | 1 V | 0.1-1 μA | 8-11 V | 4.5-9 V | 4.5-5 V |

FIG. 4 depicts a three-gate memory cell 410, which is another type of flash memory cell. Memory cell 410 is identical to the memory cell 310 of FIG. 3 except that memory cell 410 does not have a separate control gate. The erase operation (whereby erasing occurs through use of the erase gate) and read operation are similar to that of the FIG. 3 except there is no control gate bias applied. The programming operation also is done without the control gate bias, and as a result, a higher voltage is applied on the source line during a program operation to compensate for a lack of control gate bias.

Table No. 3 depicts typical voltage and current ranges that can be applied to the terminals of memory cell 410 for performing read, erase, and program operations:

TABLE NO. 3

| Operation of Flash Memory Cell 410 of FIG. 4 | | | |
|---|---|---|---|
| | WL/SG | BL | EG | SL |
| Read | 0.7-2.2 V | 0.6-2 V | 0-2.6 V | 0 V |
| Erase | -0.5 V/0 V | 0 V | 11.5 V | 0 V |
| Program | 1 V | 0.2-3 μA | 4.5 V | 7-9 V |

FIG. 5 depicts stacked gate memory cell 510, which is another type of flash memory cell. Memory cell 510 is similar to memory cell 210 of FIG. 2, except that floating gate 20 extends over the entire channel region 18, and control gate 22 (which here will be coupled to a word line)

extends over floating gate 20, separated by an insulating layer (not shown). The erase is done by FN tunneling of electrons from FG to substrate, programming is by channel hot electron (CHE) injection at region between the channel 18 and the drain region 16, by the electrons flowing from the source region 14 towards to drain region 16 and read operation which is similar to that for memory cell 210 with a higher control gate voltage.

Table No. 4 depicts typical voltage ranges that can be applied to the terminals of memory cell 510 and substrate 12 for performing read, erase, and program operations:

TABLE NO. 4

| Operation of Flash Memory Cell 510 of FIG. 5 | | | | |
|---|---|---|---|---|
| | CG | BL | SL | Substrate |
| Read | 2-5 V | 0.6-2 V | 0 V | 0 V |
| Erase | -8 to -10 V/0 V | FLT | FLT | 8-10 V/15-20 V |
| Program | 8-12 V | 3-5 V | 0 V | 0 V |

The methods and means described herein may apply to other non-volatile memory technologies such as FINFET split gate flash or stack gate flash memory, NAND flash, SONOS (silicon-oxide-nitride-oxide-silicon, charge trap in nitride), MONOS (metal-oxide-nitride-oxide-silicon, metal charge trap in nitride), ReRAM (resistive ram), PCM (phase change memory), MRAM (magnetic ram), FeRAM (ferro-electric ram), CT (charge trap) memory, CN (carbon-tube) memory, OTP (bi-level or multi-level one time programmable), and CeRAM (correlated electron ram), without limitation.

In order to utilize the memory arrays comprising one of the types of non-volatile memory cells described above in an artificial neural network, two modifications are made. First, the lines are configured so that each memory cell can be individually programmed, erased, and read without adversely affecting the memory state of other memory cells in the array, as further explained below. Second, continuous (analog) programming of the memory cells is provided.

Specifically, the memory state (i.e., charge on the floating gate) of each memory cell in the array can be continuously changed from a fully erased state to a fully programmed state, and vice-versa, independently and with minimal disturbance of other memory cells. This means the cell storage is effectively analog or at the very least can store one of many discrete values (such as 16 or 64 different values), which allows for very precise and individual tuning of all the memory cells in the memory array, and which makes the memory array ideal for storing and making fine tuning adjustments to the synapse weights of the neural network. Neural Networks Employing Non-Volatile Memory Cell Arrays FIG. 6 conceptually illustrates a non-limiting example of a neural network utilizing a non-volatile memory array of the present examples. This example uses the non-volatile memory array neural network for a facial recognition application, but any other appropriate application could be implemented using a non-volatile memory array based neural network.

S0 is the input layer, which for this example is a 32×32 pixel RGB image with 5 bit precision (i.e. three 32×32 pixel arrays, one for each color R, G and B, each pixel being 5 bit precision). The synapses CB1 going from input layer S0 to layer C1 apply different sets of weights in some instances and shared weights in other instances and scan the input image with 3×3 pixel overlapping filters (kernel), shifting the filter by 1 pixel (or more than 1 pixel as dictated by the model). Specifically, values for 9 pixels in a 3×3 portion of the image (i.e., referred to as a filter or kernel) are provided to the synapses CB1, where these 9 input values are multiplied by the appropriate weights and, after summing the outputs of that multiplication, a single output value is determined and provided by a first synapse of CB1 for generating a pixel of one of the feature maps of layer C1. The 3×3 filter is then shifted one pixel to the right within input layer S0 (i.e., adding the column of three pixels on the right, and dropping the column of three pixels on the left), whereby the 9 pixel values in this newly positioned filter are provided to the synapses CB1, where they are multiplied by the same weights and a second single output value is determined by the associated synapse. This process is continued until the 3×3 filter scans across the entire 32×32 pixel image of input layer S0, for all three colors and for all bits (precision values). The process is then repeated using different sets of weights to generate a different feature map of layer C1, until all the features maps of layer C1 have been calculated.

In layer C1, in the present example, there are 16 feature maps, with 30×30 pixels each. Each pixel is a new feature pixel extracted from multiplying the inputs and kernel, and therefore each feature map is a two dimensional array, and thus in this example layer C1 constitutes 16 layers of two dimensional arrays (keeping in mind that the layers and arrays referenced herein are logical relationships, not necessarily physical relationships—i.e., the arrays are not necessarily oriented in physical two dimensional arrays). Each of the 16 feature maps in layer C1 is generated by one of sixteen different sets of synapse weights applied to the filter scans. The C1 feature maps could all be directed to different aspects of the same image feature, such as boundary identification. For example, the first map (generated using a first weight set, shared for all scans used to generate this first map) could identify circular edges, the second map (generated using a second weight set different from the first weight set) could identify rectangular edges, or the aspect ratio of certain features, and so on.

An activation function P1 (pooling) is applied before going from layer C1 to layer S1, which pools values from consecutive, non-overlapping 2×2 regions in each feature map. The purpose of the pooling function P1 is to average out the nearby location (or a max function can also be used), to reduce the dependence of the edge location for example and to reduce the data size before going to the next stage. At layer S1, there are 16 15×15 feature maps (i.e., sixteen different arrays of 15×15 pixels each). The synapses CB2 going from layer S1 to layer C2 scan maps in layer S1 with 4×4 filters, with a filter shift of 1 pixel. At layer C2, there are 22 12×12 feature maps. An activation function P2 (pooling) is applied before going from layer C2 to layer S2, which pools values from consecutive non-overlapping 2×2 regions in each feature map. At layer S2, there are 22 6×6 feature maps. An activation function (pooling) is applied at the synapses CB3 going from layer S2 to layer C3, where every neuron in layer C3 connects to every map in layer S2 via a respective synapse of CB3. At layer C3, there are 64 neurons. The synapses CB4 going from layer C3 to the output layer S3 fully connects C3 to S3, i.e. every neuron in layer C3 is connected to every neuron in layer S3. The output at S3 includes 10 neurons, where the highest output neuron determines the class. This output could, for example, be indicative of an identification or classification of the contents of the original image.

Each layer of synapses is implemented using an array, or a portion of an array, of non-volatile memory cells.

FIG. 7 is a block diagram of an array that can be used for that purpose. Vector-by-matrix multiplication (VMM) array 32 includes non-volatile memory cells and is utilized as the synapses (such as CB1, CB2, CB3, and CB4 in FIG. 6) between one layer and the next layer. Specifically, VMM array 32 includes an array of non-volatile memory cells 33, erase gate and word line gate decoder 34, control gate decoder 35, bit line decoder 36 and source line decoder 37, which decode the respective inputs for the non-volatile memory cell array 33. Input to VMM array 32 can be from the erase gate and wordline gate decoder 34 or from the control gate decoder 35. Source line decoder 37 in this example also decodes the output of the non-volatile memory cell array 33. Alternatively, bit line decoder 36 can decode the output of the non-volatile memory cell array 33.

Non-volatile memory cell array 33 serves two purposes. First, it stores the weights that will be used by the VMM array 32. Second, the non-volatile memory cell array 33 effectively multiplies the inputs by the weights stored in the non-volatile memory cell array 33 and adds them up per output line (source line or bit line) to produce the output, which will be the input to the next layer or input to the final layer. By performing the multiplication and addition function, the non-volatile memory cell array 33 negates the need for separate multiplication and addition logic circuits and is also power efficient due to its in-situ memory computation.

The output of non-volatile memory cell array 33 is supplied to a differential summer (such as a summing op-amp or a summing current mirror) 38, which sums up the outputs of the non-volatile memory cell array 33 to create a single value for that convolution. The differential summer 38 is arranged to perform summation of positive weight and negative weight.

The summed-up output values of differential summer 38 are then supplied to an activation function block 39, which rectifies the output. The activation function block 39 may provide sigmoid, tanh, or ReLU functions. The rectified output values of activation function block 39 become an element of a feature map as the next layer (e.g. C1 in FIG. 6), and are then applied to the next synapse to produce the next feature map layer or final layer. Therefore, in this example, non-volatile memory cell array 33 constitutes a plurality of synapses (which receive their inputs from the prior layer of neurons or from an input layer such as an image database), and summing op-amp 38 and activation function block 39 constitute a plurality of neurons.

The input to VMM array 32 in FIG. 7 (WLx, EGx, CGx, and optionally BLx and SLx) can be analog level, binary level, or digital bits (in which case a DAC is provided to convert digital bits to appropriate input analog level) and the output can be analog level, binary level, or digital bits (in which case an output ADC is provided to convert output analog level into digital bits).

FIG. 8 is a block diagram depicting the usage of numerous layers of VMM arrays 32, here labeled as VMM arrays 32a, 32b, 32c, 32d, and 32e. As shown in FIG. 8, the input, denoted Inputx, is converted from digital to analog by a digital-to-analog converter 31 and provided to input VMM array 32a. The converted analog inputs could be voltage or current. The input D/A conversion for the first layer could be done by using a function or a LUT (look up table) that maps the inputs Inputx to appropriate analog levels for the matrix multiplier of input VMM array 32a. The input conversion could also be done by an analog to analog (A/A) converter to convert an external analog input to a mapped analog input to the input VMM array 32a.

The output generated by input VMM array 32a is provided as an input to the next VMM array (hidden level 1) 32b, which in turn generates an output that is provided as an input to the next VMM array (hidden level 2) 32c, and so on. The various layers of VMM array 32 function as different layers of synapses and neurons of a convolutional neural network (CNN). Each VMM array 32a, 32b, 32c, 32d, and 32e can be a stand-alone, physical non-volatile memory array, or multiple VMM arrays could utilize different portions of the same physical non-volatile memory array, or multiple VMM arrays could utilize overlapping portions of the same physical non-volatile memory array. The example shown in FIG. 8 contains five layers (32a,32b,32c,32d,32e): one input layer (32a), two hidden layers (32b,32c), and two fully connected layers (32d,32e). One of ordinary skill in the art will appreciate that this is merely an example and that a system instead could comprise more than two hidden layers and more than two fully connected layers.

Vector-by-Matrix Multiplication (VMM) Arrays

FIG. 9 depicts neuron VMM array 900, which is particularly suited for memory cells 310 as shown in FIG. 3 and is utilized as the synapses and parts of neurons between an input layer and the next layer. VMM array 900 comprises memory array 901 of non-volatile memory cells and reference array 902 (at the top of the array) of non-volatile reference memory cells. Alternatively, another reference array can be placed at the bottom.

In VMM array 900, control gate lines, such as control gate line 903, run in a vertical direction (hence reference array 902 in the row direction is orthogonal to control gate line 903), and erase gate lines, such as erase gate line 904, run in a horizontal direction. Here, the inputs to VMM array 900 are provided on the control gate lines (CG0, CG1, CG2, CG3), and the output of VMM array 900 emerges on the source lines (SL0, SL1). In one example, only even rows are used, and in another example, only odd rows are used. The current placed on each source line (SL0, SL1, respectively) performs a summing function of all the currents from the memory cells connected to that particular source line.

As described herein for neural networks, the non-volatile memory cells of VMM array 900, i.e., the memory cells 310 of VMM array 900, may be configured to operate in a sub-threshold region.

The non-volatile reference memory cells and the non-volatile memory cells described herein are biased in weak inversion (sub threshold region):

$$Ids = Io^* e^{(Vg-Vth)/nVt} = w^* Io^* e^{(Vg)/nVt},$$

$$\text{where } w = e^{(-Vth)/nVt}$$

where Ids is the drain to source current; Vg is gate voltage on the memory cell; Vth is threshold voltage of the memory cell; Vt is thermal voltage=k*T/q with k being the Boltzmann constant, T the temperature in Kelvin, and q the electronic charge; n is a slope factor=1+(Cdep/Cox) with Cdep=capacitance of the depletion layer, and Cox capacitance of the gate oxide layer; Io is the memory cell current at gate voltage equal to threshold voltage, Io is proportional to $(Wt/L)^* u^* Cox^*(n-1)^* Vt^2$ where u is carrier mobility and Wt and L are width and length, respectively, of the memory cell.

For an I-to-V log converter using a memory cell (such as a reference memory cell or a peripheral memory cell) or a transistor to convert input current into an input voltage:

$$Vg = n^* Vt^* \log[Ids / wp^* Io]$$

where, wp is w of a reference or peripheral memory cell.

For a memory array used as a vector matrix multiplier VMM array with the current input, the output current is:

$$Iout = wa^* Io^* e^{(Vg)/nVt}, \text{ namely}$$

$$Iout = (wa / wp)^* Iin = W^* Iin$$

$$W = e^{(Vthp-Vtha)/nVt}$$

Here, wa=w of each memory cell in the memory array. Vthp is effective threshold voltage of the peripheral memory cell and Vtha is effective threshold voltage of the main (data) memory cell. Note that the threshold voltage of a transistor is a function of substrate body bias voltage and the substrate body bias voltage, denoted Vsb, can be modulated to compensate for various conditions, on such temperature. The threshold voltage Vth can be expressed as:

$$Vth = Vth0 + \text{gamma}(SQRT | Vsb - 2^*\varphi F) - SQRT|2^*\varphi F|)$$

where Vth0 is threshold voltage with zero substrate bias, φF is a surface potential, and gamma is a body effect parameter.

A wordline or control gate can be used as the input for the memory cell for the input voltage.

Alternatively, the flash memory cells of VMM arrays described herein can be configured to operate in the linear region:

$$Ids = \text{beta}^*(Vgs - Vth)^* Vds; \quad \text{beta} = u^* Cox^* Wt/L$$

$$W = \alpha(Vgs - Vth)$$

meaning weight W in the linear region is proportional to (Vgs–Vth)

A wordline or control gate or bitline or sourceline can be used as the input for the memory cell operated in the linear region. The bitline or sourceline can be used as the output for the memory cell.

For an I-to-V linear converter, a memory cell (such as a reference memory cell or a peripheral memory cell) or a transistor operating in the linear region can be used to linearly convert an input/output current into an input/output voltage.

Alternatively, the memory cells of VMM arrays described herein can be configured to operate in the saturation region:

$$Ids = 1/2^* \text{beta}^*(Vgs - Vth)^2; \quad \text{beta} = u^* Cox^* Wt/L$$

$$W\alpha(Vgs - Vth)^2, \text{ meaning weight } W \text{ is proportional to } (Vgs - Vth)^2$$

A wordline, control gate, or erase gate can be used as the input for the memory cell operated in the saturation region. The bitline or sourceline can be used as the output for the output neuron.

Alternatively, the memory cells of VMM arrays described herein can be used in all regions or a combination thereof (sub threshold, linear, or saturation) for each layer or multi layers of a neural network.

Other examples for VMM array 32 of FIG. 7 are described in U.S. Pat. No. 10,748,630, which is incorporated by reference herein. As described in that application. a source-line or a bitline can be used as the neuron output (current summation output).

FIG. 10 depicts neuron VMM array 1000, which is particularly suited for memory cells 210 as shown in FIG. 2 and is utilized as the synapses between an input layer and the next layer. VMM array 1000 comprises a memory array 1003 of non-volatile memory cells, reference array 1001 of first non-volatile reference memory cells, and reference array 1002 of second non-volatile reference memory cells.

WL0, WL1, WL2, and WL3, and the output emerges on the respective bit lines BL0-BLN during a read (inference) operation. The current placed on each of the bit lines BL0-BLN performs a summing function of the currents from all non-volatile memory cells connected to that particular bitline.

Table No. 5 depicts operating voltages and currents for VMM array 1000. The columns in the table indicate the voltages placed on word lines for selected cells, word lines for unselected cells, bit lines for selected cells, bit lines for unselected cells, source lines for selected cells, and source lines for unselected cells. The rows indicate the operations of read, erase, and program.

TABLE NO. 5

| Operation of VMM Array 1000 of FIG. 10: | | | | | | |
|---|---|---|---|---|---|---|
| | WL | WL-unsel | BL | BL-unsel | SL | SL-unsel |
| Read | 1-3.5 V | −0.5 V/0 V | 0.6-2 V (Ineuron) | 0.6 V-2 V/0 V | 0 V | 0 V |
| Erase | ~5-13 V | 0 V | 0 V | 0 V | 0 V | 0 V |
| Program | 1-2 V | −0.5 V/0 V | 0.1-3 uA | Vinh ~2.5 V | 4-10 V | 0-1 V/FLT |

Reference arrays 1001 and 1002, arranged in the column direction of the array, serve to convert current inputs flowing into terminals BLR0, BLR1, BLR2, and BLR3 into voltage inputs WL0, WL1, WL2, and WL3. In effect, the first and second non-volatile reference memory cells are diode-connected through multiplexors 1014 (only partially depicted) with current inputs flowing into them. The reference cells are tuned (e.g., programmed) to target reference levels. The target reference levels are provided by a reference mini-array matrix (not shown).

Memory array 1003 serves two purposes. First, it stores the weights that will be used by the VMM array 1000 on respective memory cells thereof. Second, memory array 1003 effectively multiplies the inputs (i.e. current inputs provided in terminals BLR0, BLR1, BLR2, and BLR3, which reference arrays 1001 and 1002 convert into the input voltages to supply to wordlines WL0, WL1, WL2, and WL3) by the weights stored in the memory array 1003 and then adds all the results (memory cell currents) to produce the output on the respective bit lines (BL0-BLN), which will be the input to the next layer or input to the final layer. By performing the multiplication and addition function, memory array 1003 negates the need for separate multiplication and addition logic circuits and is also power efficient. Here, the voltage inputs are provided on the word lines FIG. 11 depicts neuron VMM array 1100, which is particularly suited for memory cells 210 as shown in FIG. 2 and is utilized as the synapses and parts of neurons between an input layer and the next layer. VMM array 1100 comprises a memory array 1103 of non-volatile memory cells, reference array 1101 of first non-volatile reference memory cells, and reference array 1102 of second non-volatile reference memory cells. Reference arrays 1101 and 1102 run in row direction of the VMM array 1100. VMM array is similar to VMM 1000 except that in VMM array 1100, the word lines run in the vertical direction. Here, the inputs are provided on the word lines (WLA0, WLB0, WLA1, WLB2, WLA2, WLB2, WLA3, WLB3), and the output emerges on the source line (SL0, SL1) during a read operation. The current placed on each source line performs a summing function of all the currents from the memory cells connected to that particular source line.

Table No. 6 depicts operating voltages and currents for VMM array 1100. The columns in the table indicate the voltages placed on word lines for selected cells, word lines for unselected cells, bit lines for selected cells, bit lines for unselected cells, source lines for selected cells, and source lines for unselected cells. The rows indicate the operations of read, erase, and program.

TABLE NO. 6

| Operation of VMM Array 1100 of FIG. 11 | | | | | | |
|---|---|---|---|---|---|---|
| | WL | WL-unsel | BL | BL-unsel | SL | SL-unsel |
| Read | 1-3.5 V | −0.5 V/0 V | 0.6-2 V | 0.6 V-2 V/0 V | ~0.3-1 V (Ineuron) | 0 V |
| Erase | ~5-13 V | 0 V | 0 V | 0 V | 0 V | SL-inhibit (~4-8 V) |
| Program | 1-2 V | −0.5 V/0 V | 0.1-3 uA | Vinh ~2.5 V | 4-10 V | 0-1 V/FLT |

FIG. 12 depicts neuron VMM array 1200, which is particularly suited for memory cells 310 as shown in FIG. 3 and is utilized as the synapses and parts of neurons between an input layer and the next layer. VMM array 1200 comprises a memory array 1203 of non-volatile memory cells, reference array 1201 of first non-volatile reference memory cells, and reference array 1202 of second non-volatile reference memory cells. Reference arrays 1201 and 1202 serve to convert current inputs flowing into terminals BLR0, BLR1, BLR2, and BLR3 into voltage inputs CG0, CG1, CG2, and CG3. In effect, the first and second non-volatile reference memory cells are diode-connected through multi-voltages placed on word lines for selected cells, word lines for unselected cells, bit lines for selected cells, bit lines for unselected cells, control gates for selected cells, control gates for unselected cells in the same sector as the selected cells, control gates for unselected cells in a different sector than the selected cells, erase gates for selected cells, erase gates for unselected cells, source lines for selected cells, and source lines for unselected cells. The rows indicate the operations of read, erase, and program.

TABLE NO. 7

| | | | | | CG | CG-unsel same sector | CG-unsel | | EG-unsel | | SL-unsel |
|---|---|---|---|---|---|---|---|---|---|---|---|
| | WL | WL-unsel | BL | BL-unsel | CG | | | EG | | SL | |
| Read | 1.0-2 V | −0.5 V/0 V | 0.6-2 V (Ineuron) | 0 V | 0-2.6 V | 0-2.6 V | 0-2.6 V | 0-2.6 V | 0-2.6 V | 0 V | 0 V |
| Erase | 0 V | 0 V | 0 V | 0 V | 0 V | 0-2.6 V | 0-2.6 V | 5-12 V | 0-2.6 V | 0 V | 0 V |
| Program | 0.7-1 V | −0.5 V/0 V | 0.1-1 uA | Vinh (1-2 V) | 4-11 V | 0-2.6 V | 0-2.6 V | 4.5-5 V | 0-2.6 V | 4.5-5 V | 0 V | plexors 1212 (only partially shown) with current inputs flowing into them through BLR0, BLR1, BLR2, and BLR3. Multiplexors 1212 each include a respective multiplexor 1205 and a cascoding transistor 1204 to ensure a constant voltage on the bitline (such as BLR0) of each of the first and second non-volatile reference memory cells during a read operation. The reference cells are tuned to target reference levels.

Memory array 1203 serves two purposes. First, it stores the weights that will be used by the VMM array 1200. Second, memory array 1203 effectively multiplies the inputs (current inputs provided to terminals BLR0, BLR1, BLR2, and BLR3, for which reference arrays 1201 and 1202 convert these current inputs into the input voltages to supply to the control gates (CG0, CG1, CG2, and CG3) by the weights stored in the memory array and then add all the results (cell currents) to produce the output, which appears on BL0-BLN, and will be the input to the next layer or input to the final layer. By performing the multiplication and addition function, the memory array negates the need for separate multiplication and addition logic circuits and is also power efficient. Here, the inputs are provided on the control gate lines (CG0, CG1, CG2, and CG3), and the output emerges on the bit lines (BL0-BLN) during a read operation. The current placed on each bitline performs a summing function of all the currents from the memory cells connected to that particular bitline.

VMM array 1200 implements uni-directional tuning for non-volatile memory cells in memory array 1203. That is, each non-volatile memory cell is erased and then partially programmed until the desired charge on the floating gate is reached. If too much charge is placed on the floating gate (such that the wrong value is stored in the cell), the cell is erased and the sequence of partial programming operations starts over. As shown, two rows sharing the same erase gate (such as EG0 or EG1) are erased together (which is known as a page erase), and thereafter, each cell is partially programmed until the desired charge on the floating gate is reached.

Table No. 7 depicts operating voltages and currents for VMM array 1200. The columns in the table indicate the FIG. 13 depicts neuron VMM array 1300, which is particularly suited for memory cells 310 as shown in FIG. 3, and is utilized as the synapses and parts of neurons between an input layer and the next layer. VMM array 1300 comprises a memory array 1303 of non-volatile memory cells, reference array 1301 or first non-volatile reference memory cells, and reference array 1302 of second non-volatile reference memory cells. EG lines EGR0, EG0, EG1 and EGR1 are run vertically while CG lines CG0, CG1, CG2 and CG3 and SL lines WL0, WL1, WL2 and WL3 are run horizontally. VMM array 1300 is similar to VMM array 1400, except that VMM array 1300 implements bi-directional tuning, where each individual cell can be completely erased, partially programmed, and partially erased as needed to reach the desired amount of charge on the floating gate due to the use of separate EG lines. As shown, reference arrays 1301 and 1302 convert input current in the terminal BLR0, BLR1, BLR2, and BLR3 into control gate voltages CG0, CG1, CG2, and CG3 (through the action of diode-connected reference cells through multiplexors 1314) to be applied to the memory cells in the row direction. The current output (neuron) is in the bit lines BL0-BLN, where each bit line sums all currents from the non-volatile memory cells connected to that particular bitline.

Table No. 8 depicts operating voltages and currents for VMM array 1300. The columns in the table indicate the voltages placed on word lines for selected cells, word lines for unselected cells, bit lines for selected cells, bit lines for unselected cells, control gates for selected cells, control gates for unselected cells in the same sector as the selected cells, control gates for unselected cells in a different sector than the selected cells, erase gates for selected cells, erase gates for unselected cells, source lines for selected cells, and source lines for unselected cells. The rows indicate the operations of read, erase, and program.

TABLE NO. 8

Operation of VMM Array 1300 of FIG. 13

| | WL | WL-unsel | BL | BL-unsel | CG | CG-unsel same sector | CG-unsel | EG | EG-unsel | SL | SL-unsel |
|---|---|---|---|---|---|---|---|---|---|---|---|
| Read | 1.0-2 V | −0.5 V/0 V | 0.6-2 V (Ineuron) | 0 V | 0-2.6 V | 0-2.6 V | 0-2.6 V | 0-2.6 V | 0-2.6 V | 0 V | 0 V |
| Erase | 0 V | 0 V | 0 V | 0 V | 0 V | 4-9 V | 0-2.6 V | 5-12 V | 0-2.6 V | 0 V | 0 V |
| Program | 0.7-1 V | −0.5 V/0 V | 0.1-1 uA | Vinh (1-2 V) | 4-11 V | 0-2.6 V | 0-2.6 V | 4.5-5 V | 0-2.6 V | 4.5-5 V | 0-1 V |

FIG. 22 depicts neuron VMM array 2200, which is particularly suited for memory cells 210 as shown in FIG. 2 and is utilized as the synapses and parts of neurons between an input layer and the next layer. In VMM array 2200, the inputs $INPUT_0 \ldots, INPUT_N$ are received on bit lines $BL_0, \ldots BL_N$, respectively, and the outputs $OUTPUT_1$, $OUTPUT_2$, $OUTPUT_3$, and $OUTPUT_4$ are generated on source lines $SL_0$, $SL_1$, $SL_2$, and $SL_3$, respectively.

FIG. 23 depicts neuron VMM array 2300, which is particularly suited for memory cells 210 as shown in FIG. 2 and is utilized as the synapses and parts of neurons between an input layer and the next layer. In this example, the inputs $INPUT_0$, $INPUT_1$, $INPUT_2$, and $INPUT_3$ are received on source lines $SL_0$, $SL_1$, $SL_2$, and $SL_3$, respectively, and the outputs $OUTPUT_0, \ldots OUTPUT_N$ are generated on bit lines $BL_0, \ldots, BL_N$.

FIG. 24 depicts neuron VMM array 2400, which is particularly suited for memory cells 210 as shown in FIG. 2, and is utilized as the synapses and parts of neurons between an input layer and the next layer. In this example, the inputs $INPUT_0, \ldots, INPUT_M$ are received on word lines $WL_0, \ldots, WL_M$, respectively, and the outputs $OUTPUT_0, \ldots OUTPUT_N$ are generated on bit lines $BL_0, \ldots, BL_N$.

FIG. 25 depicts neuron VMM array 2500, which is particularly suited for memory cells 310 as shown in FIG. 3, and is utilized as the synapses and parts of neurons between an input layer and the next layer. In this example, the inputs $INPUT_0, \ldots, INPUT_M$ are received on word lines $WL_0, \ldots, WL_M$, respectively, and the outputs $OUTPUT_0, \ldots OUTPUT_N$ are generated on bit lines $BL_0, \ldots, BL_N$.

FIG. 26 depicts neuron VMM array 2600, which is particularly suited for memory cells 410 as shown in FIG. 4, and is utilized as the synapses and parts of neurons between an input layer and the next layer. In this example, the inputs $INPUT_0, \ldots, INPUT_n$ are received on vertical control gate lines $CG_0, \ldots, CG_N$, respectively, and the outputs $OUTPUT_1$ and $OUTPUT_2$ are generated on source lines $SL_0$ and $SL_1$.

FIG. 27 depicts neuron VMM array 2700, which is particularly suited for memory cells 410 as shown in FIG. 4 and is utilized as the synapses and parts of neurons between an input layer and the next layer. In this example, the inputs $INPUT_0, \ldots, INPUT_N$ are received on the gates of bit line control gates 2701-1, 2701-2, ..., 2701-(N−1), and 2701-N, respectively, which are coupled to bit lines $BL_0, \ldots, BL_N$, respectively. Example outputs $OUTPUT_1$ and $OUTPUT_2$ are generated on source lines $SL_0$ and $SL_1$.

FIG. 28 depicts neuron VMM array 2800, which is particularly suited for memory cells 310 as shown in FIG. 3, memory cells 510 as shown in FIG. 5, and memory cells 710 as shown in FIG. 7, and is utilized as the synapses and parts of neurons between an input layer and the next layer. In this example, the inputs $INPUT_0, \ldots, INPUT_M$ are received on word lines $WL_0, \ldots, WL_M$, and the outputs $OUTPUT_0, \ldots, OUTPUT_N$ are generated on bit lines $BL0, \ldots, BL_N$, respectively.

FIG. 29 depicts neuron VMM array 2900, which is particularly suited for memory cells 310 as shown in FIG. 3, memory cells 510 as shown in FIG. 5, and memory cells 710 as shown in FIG. 7, and is utilized as the synapses and parts of neurons between an input layer and the next layer. In this example, the inputs $INPUT_0, \ldots, INPUT_M$ are received on control gate lines $CG_0, \ldots, CG_M$. Outputs $OUTPUT_0, \ldots, OUTPUT_N$ are generated on vertical source lines $SL_0, \ldots, SL_N$, respectively, where each source line $SL_i$ is coupled to the source lines of all memory cells in column i.

FIG. 30 depicts neuron VMM array 3000, which is particularly suited for memory cells 310 as shown in FIG. 3, memory cells 510 as shown in FIG. 5, and memory cells 710 as shown in FIG. 7, and is utilized as the synapses and parts of neurons between an input layer and the next layer. In this example, the inputs $INPUT_0, \ldots, INPUT_M$ are received on control gate lines $CG_0, \ldots, CG_M$. Outputs $OUTPUT_0, \ldots, OUTPUT_N$ are generated on vertical bit lines $BL_0, \ldots, BL_N$, respectively, where each bit line $BL_i$ is coupled to the bit lines of all memory cells in column i.

Long Short-Term Memory

The prior art includes a concept known as long short-term memory (LSTM). LSTM units often are used in neural networks. LSTM allows a neural network to remember information over predetermined arbitrary time intervals and to use that information in subsequent operations. A conventional LSTM unit comprises a cell, an input gate, an output gate, and a forget gate. The three gates regulate the flow of information into and out of the cell and the time interval that the information is remembered in the LSTM. VMMs are particularly useful in LSTM units.

Figure 14:
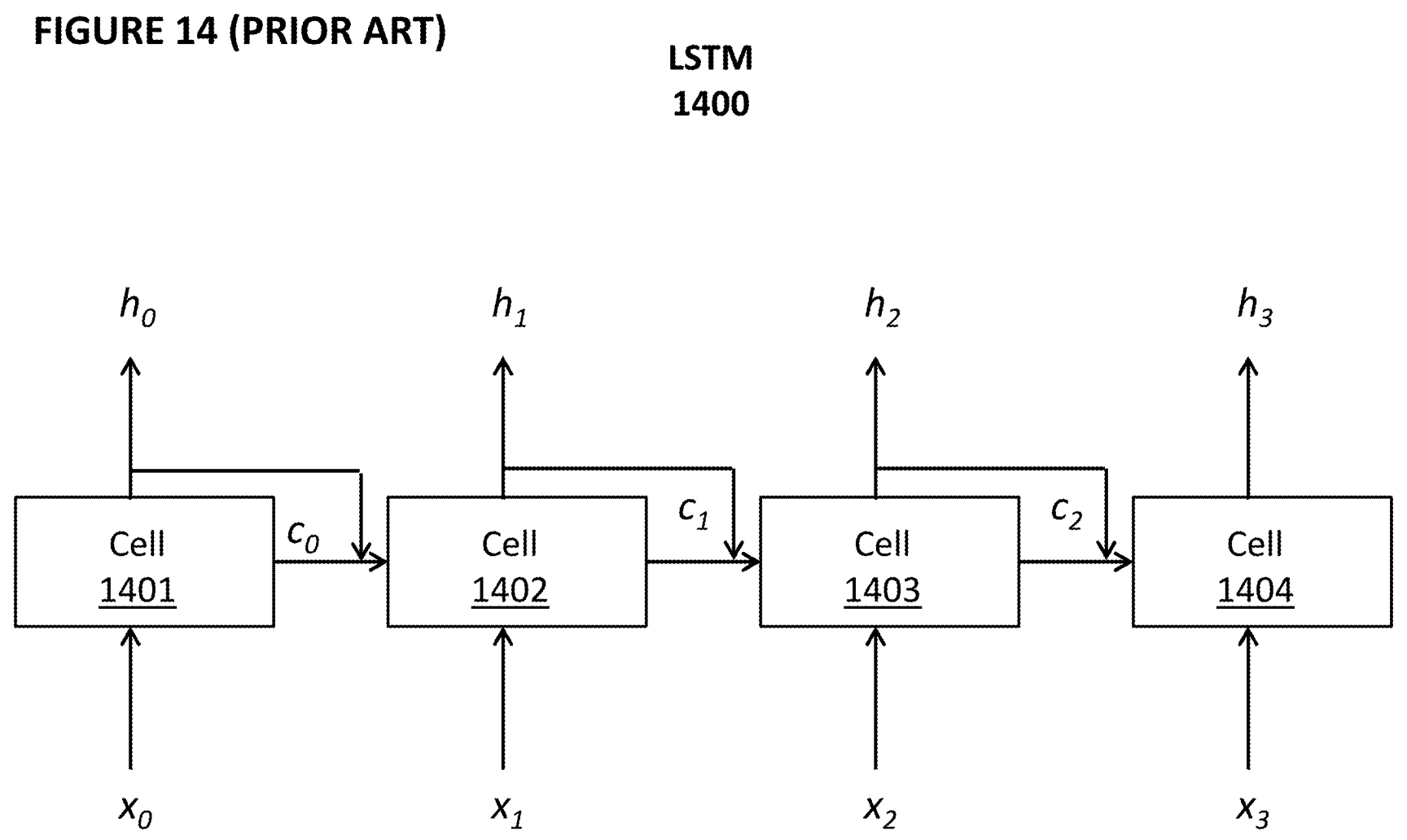

FIG. 14 depicts an example LSTM 1400. LSTM 1400 in this example comprises cells 1401, 1402, 1403, and 1404. Cell 1401 receives input vector $x_0$ and generates output vector $h_0$ and cell state vector $c_0$. Cell 1402 receives input vector $x_1$, the output vector (hidden state) $h_0$ from cell 1401, and cell state $c_0$ from cell 1401 and generates output vector $h_1$ and cell state vector $c_1$. Cell 1403 receives input vector $x_2$, the output vector (hidden state) $h_1$ from cell 1402, and cell state $c_1$ from cell 1402 and generates output vector $h_2$ and cell state vector $c_2$. Cell 1404 receives input vector $x_3$, the output vector (hidden state) $h_2$ from cell 1403, and cell state $c_2$ from cell 1403 and generates output vector $h_3$. Additional cells can be used, and an LSTM with four cells is merely an example.

FIG. 15 depicts an example implementation of an LSTM cell 1500, which can be used for cells 1401, 1402, 1403, and 1404 in FIG. 14. LSTM cell 1500 receives input vector x(t), cell state vector c(t−1) from a preceding cell, and output vector h(t−1) from a preceding cell, and generates cell state vector c(t) and output vector h(t).

LSTM cell 1500 comprises sigmoid function devices 1501, 1502, and 1503, each of which applies a number between 0 and 1 to control how much of each component in the input vector is allowed through to the output vector. LSTM cell 1500 also comprises tanh devices 1504 and 1505 to apply a hyperbolic tangent function to an input vector, multiplier devices 1506, 1507, and 1508 to multiply two vectors together, and addition device 1509 to add two vectors together. Output vector h(t) can be provided to the next LSTM cell in the system, or it can be accessed for other purposes.

FIG. 16 depicts an LSTM cell 1600, which is an example of an implementation of LSTM cell 1500. For the reader's convenience, the same numbering from LSTM cell 1500 is used in LSTM cell 1600. Sigmoid function devices 1501, 1502, and 1503 and tanh device 1504 each comprise multiple VMM arrays 1601 and activation function blocks 1602. Thus, it can be seen that VMM arrays are particular useful in LSTM cells used in certain neural network systems. The multiplier devices 1506, 1507, and 1508 and the addition device 1509 are implemented in a digital manner or in an analog manner. The activation function blocks 1602 can be implemented in a digital manner or in an analog manner.

An alternative to LSTM cell 1600 (and another example of an implementation of LSTM cell 1500) is shown in FIG. 17. In FIG. 17, sigmoid function devices 1501, 1502, and 1503 and tanh device 1504 share the same physical hardware (VMM arrays 1701 and activation function block 1702) in a time-multiplexed fashion. LSTM cell 1700 also comprises multiplier device 1703 to multiply two vectors together, addition device 1708 to add two vectors together, tanh device 1505 (which comprises activation function block 1702), register 1707 to store the value i(t) when i(t) is output from sigmoid function block 1702, register 1704 to store the value f(t)*c(t−1) when that value is output from multiplier device 1703 through multiplexor 1710, register 1705 to store the value i(t) u(t) when that value is output from multiplier device 1703 through multiplexor 1710, and register 1706 to store the value o(t)*c~(t) when that value is output from multiplier device 1703 through multiplexor 1710, and multiplexor 1709.

Whereas LSTM cell 1600 contains multiple sets of VMM arrays 1601 and respective activation function blocks 1602, LSTM cell 1700 contains only one set of VMM arrays 1701 and activation function block 1702, which are used to represent multiple layers in the example of LSTM cell 1700. LSTM cell 1700 will require less space than LSTM 1600, as LSTM cell 1700 will require ¼ as much space for VMMs and activation function blocks compared to LSTM cell 1600.

It can be further appreciated that LSTM units will typically comprise multiple VMM arrays, each of which requires functionality provided by certain circuit blocks outside of the VMM arrays, such as a summer and activation function block and high voltage generation blocks. Providing separate circuit blocks for each VMM array would require a significant amount of space within the semiconductor device and would be somewhat inefficient. The examples described below therefore reduce the circuitry required outside of the VMM arrays themselves.

Gated Recurrent Units

An analog VMM implementation can be utilized for a GRU (gated recurrent unit) system. GRUs are a gating mechanism in recurrent neural networks. GRUs are similar to LSTMs, except that GRU cells generally contain fewer components than an LSTM cell.

FIG. 18 depicts an example GRU 1800. GRU 1800 in this example comprises cells 1801, 1802, 1803, and 1804. Cell 1801 receives input vector $x_0$ and generates output vector $h_0$. Cell 1802 receives input vector $x_1$, the output vector $h_0$ from cell 1801 and generates output vector $h_1$. Cell 1803 receives input vector $x_2$ and the output vector (hidden state) $h_1$ from cell 1802 and generates output vector $h_2$. Cell 1804 receives input vector $x_3$ and the output vector (hidden state) $h_2$ from cell 1803 and generates output vector $h_3$. Additional cells can be used, and an GRU with four cells is merely an example.

FIG. 19 depicts an example implementation of a GRU cell 1900, which can be used for cells 1801, 1802, 1803, and 1804 of FIG. 18. GRU cell 1900 receives input vector x(t) and output vector h(t−1) from a preceding GRU cell and generates output vector h(t), GRU cell 1900 comprises sigmoid function devices 1901 and 1902, each of which applies a number between 0 and 1 to components from output vector h(t−1) and input vector x(t). GRU cell 1900 also comprises a tanh device 1903 to apply a hyperbolic tangent function to an input vector, a plurality of multiplier devices 1904, 1905, and 1906 to multiply two vectors together, an addition device 1907 to add two vectors together, and a complementary device 1908 to subtract an input from 1 to generate an output.

FIG. 20 depicts a GRU cell 2000, which is an example of an implementation of GRU cell 1900. For the reader's convenience, the same numbering from GRU cell 1900 is used in GRU cell 2000. As can be seen in FIG. 20, sigmoid function devices 1901 and 1902, and tanh device 1903 each comprise multiple VMM arrays 2001 and activation function blocks 2002. Thus, it can be seen that VMM arrays are of particular use in GRU cells used in certain neural network systems. The multiplier devices 1904, 1905, 1906, the addition device 1907, and the complementary device 1908 are implemented in a digital manner or in an analog manner. The activation function blocks 2002 can be implemented in a digital manner or in an analog manner.

An alternative to GRU cell 2000 (and another example of an implementation of GRU cell 1900) is shown in FIG. 21. In FIG. 21, GRU cell 2100 utilizes VMM arrays 2101 and activation function block 2102, which when configured as a sigmoid function applies a number between 0 and 1 to control how much of each component in the input vector is allowed through to the output vector. In FIG. 21, sigmoid function devices 1901 and 1902 and tank device 1903 share the same physical hardware (VIM arrays 2101 and activation function block 2102) in a time-multiplexed fashion. GRU cell 2100 also comprises multiplier device 2103 to multiply two vectors together, addition device 2105 to add two vectors together, complementary device 2109 to subtract an input from 1 to generate an output, multiplexor 2104, register 2106 to hold the value h(t−1)*r(t) when that value is output from multiplier device 2103 through multiplexor 2104, register 2107 to hold the value h(t−1)*z(t) when that value is output from multiplier device 2103 through multiplexor 2104, and register 2108 to hold the value h^(t)*(1−z(t)) when that value is output from multiplier device 2103 through multiplexor 2104.

Whereas GRU cell 2000 contains multiple sets of VMM arrays 2001 and activation function blocks 2002, GRU cell 2100 contains only one set of VMM arrays 2101 and activation function block 2102, which are used to represent multiple layers in the example of GRU cell 2100. GRU cell 2100 will require less space than GRU cell 2000, as GRU cell 2100 will require ⅓ as much space for VMMs and activation function blocks compared to GRU cell 2000.

It can be further appreciated that GRU systems will typically comprise multiple VMM arrays, each of which requires functionality provided by certain circuit blocks outside of the VMM arrays, such as a summer and activation function block and high voltage generation blocks. Providing separate circuit blocks for each VMM array would require a significant amount of space within the semiconductor device and would be somewhat inefficient. The examples described below therefore reduce the circuitry required outside of the VMM arrays themselves.

The input to the VMM arrays can be an analog level, a binary level, a pulse, a time modulated pulse, or digital bits (in this case a DAC is needed to convert digital bits to appropriate input analog level) and the output can be an analog level, a binary level, a timing pulse, pulses, or digital bits (in this case an output ADC is needed to convert output analog level into digital bits).

In general, for each memory cell in a VMM array, each weight W can be implemented by a single memory cell or by a differential cell or by two blend memory cells (average of 2 cells). In the differential cell case, two memory cells are needed to implement a weight W as a differential weight (W=W+−W−). In the two blend memory cells, two memory cells are needed to implement a weight W as an average of two cells.

FIG. 31 depicts VMM system 3100. In some examples, the weights, W, stored in a VMM array are stored as differential pairs, W+ (positive weight) and W− (negative weight), where W=(W+)−(W−). In VMM system 3100, half of the bit lines are designated as W+ lines, that is, bit lines connecting to memory cells that will store positive weights W+, and the other half of the bit lines are designated as W− lines, that is, bit lines connecting to memory cells implementing negative weights W−. The W− lines are interspersed among the W+ lines in an alternating fashion. The subtraction operation is performed by a summation circuit that receives current from a W+ line and a W− line, such as summation circuits 3101 and 3102. The output of a W+ line and the output of a W− line are combined together to give effectively W=W+− W− for each pair of (W+, W−) cells for all pairs of (W+, W−) lines. While the above has been described in relation to W− lines interspersed among the W+ lines in an alternating fashion, in other examples W+ lines and W− lines can be arbitrarily located anywhere in the array.

FIG. 32 depicts another example. In VMM system 3210, positive weights W+ are implemented in first array 3211 and negative weights W− are implemented in a second array 3212, second array 3212 separate from the first array, and the resulting weights are appropriately combined together by summation circuits 3213.

FIG. 33 depicts VMM system 3300. the weights, W, stored in a VMM array are stored as differential pairs, W+ (positive weight) and W− (negative weight), where W=(W+)− (W−). VMM system 3300 comprises array 3301 and array 3302. Half of the bit lines in each of array 3301 and 3302 are designated as W+ lines, that is, bit lines connecting to memory cells that will store positive weights W+, and the other half of the bit lines in each of array 3301 and 3302 are designated as W− lines, that is, bit lines connecting to memory cells implementing negative weights W−. The W− lines are interspersed among the W+ lines in an alternating fashion. The subtraction operation is performed by a summation circuit that receives current from a W+ line and a W− line, such as summation circuits 3303,

3304, 3305, and 3306. The output of a W+ line and the output of a W− line from each array 3301, 3302 are respectively combined together to give effectively W=W+− W− for each pair of (W+, W−) cells for all pairs of (W+, W−) lines. In addition, the W values from each array 3301 and 3302 can be further combined through summation circuits 3307 and 3308, such that each W value is the result of a W value from array 3301 minus a W value from array 3302, meaning that the end result from summation circuits 3307 and 3308 is a differential value of two differential values.

Each non-volatile memory cells used in the analog neural memory system is to be erased and programmed to hold a very specific and precise amount of charge, i.e., the number of electrons, in the floating gate. For example, each floating gate should hold one of N different values, where N is the number of different weights that can be indicated by each cell. Examples of N include 16, 32, 64, 128, and 256.

As the applications for artificial neural networks become more complex, there is an increasing need for increased speed while maintaining accuracy. In prior art VMM systems, digital inputs and digital outputs are utilized, which require analog-to-digital and digital-to-analog conversion at various stages.

What is needed is an architecture for a VMM system that operates in the analog domain, where outputs are in analog form.

SUMMARY OF THE INVENTION

Numerous examples are described for providing an artificial neural network system comprising vector-by-matrix multiplication arrays utilizing analog outputs.

BRIEF DESCRIPTION OF THE DRAWINGS

FIG. 1 is a diagram that illustrates an artificial neural network.

FIG. 14 depicts a prior art long short-term memory system.

FIG. 17 depicts another example implementation of the cell of FIG. 15.

FIG. 37 depicts an analog voltage input circuit.

FIG. 38 depicts another example of a VMM system.

FIG. 39 depicts another example of a VMM system.

FIG. 52 depicts an example max voltage pooling circuit.

DETAILED DESCRIPTION OF THE INVENTION

VMM System Architecture

Figure 2:
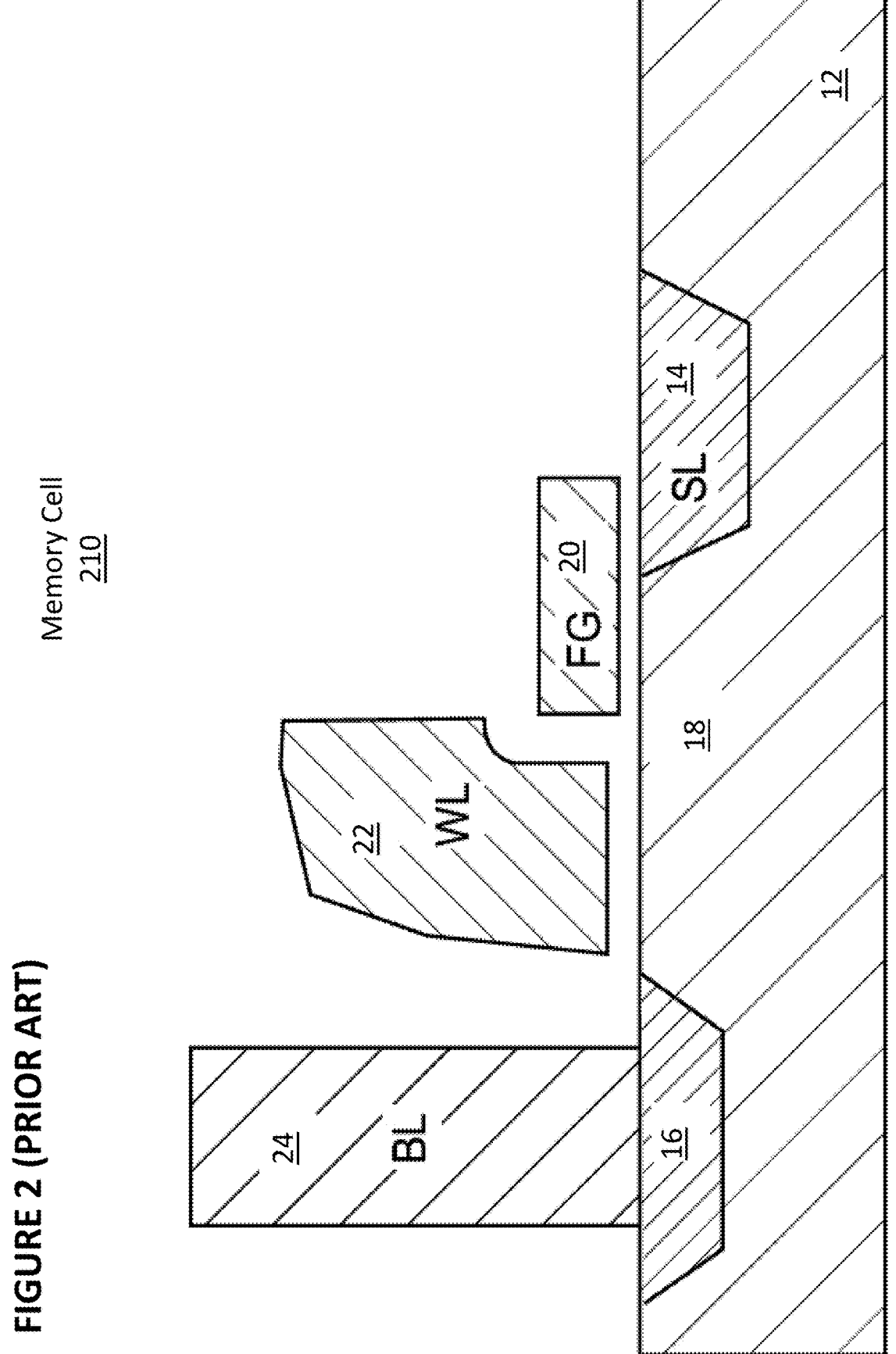
FIG. 2 depicts a prior art split gate flash memory cell.
Figure 3:
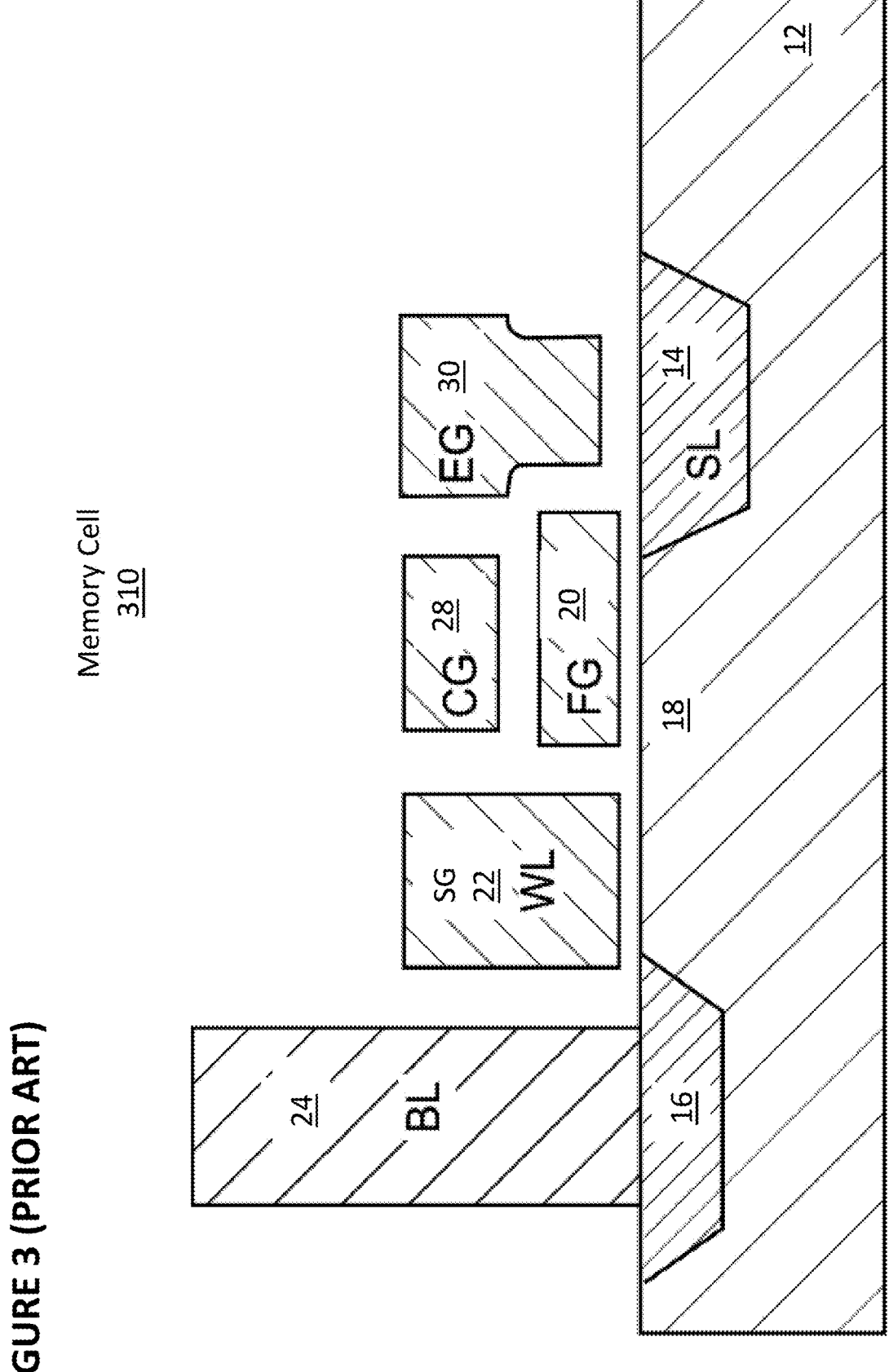
FIG. 3 depicts another prior art split gate flash memory cell.
Figure 4:
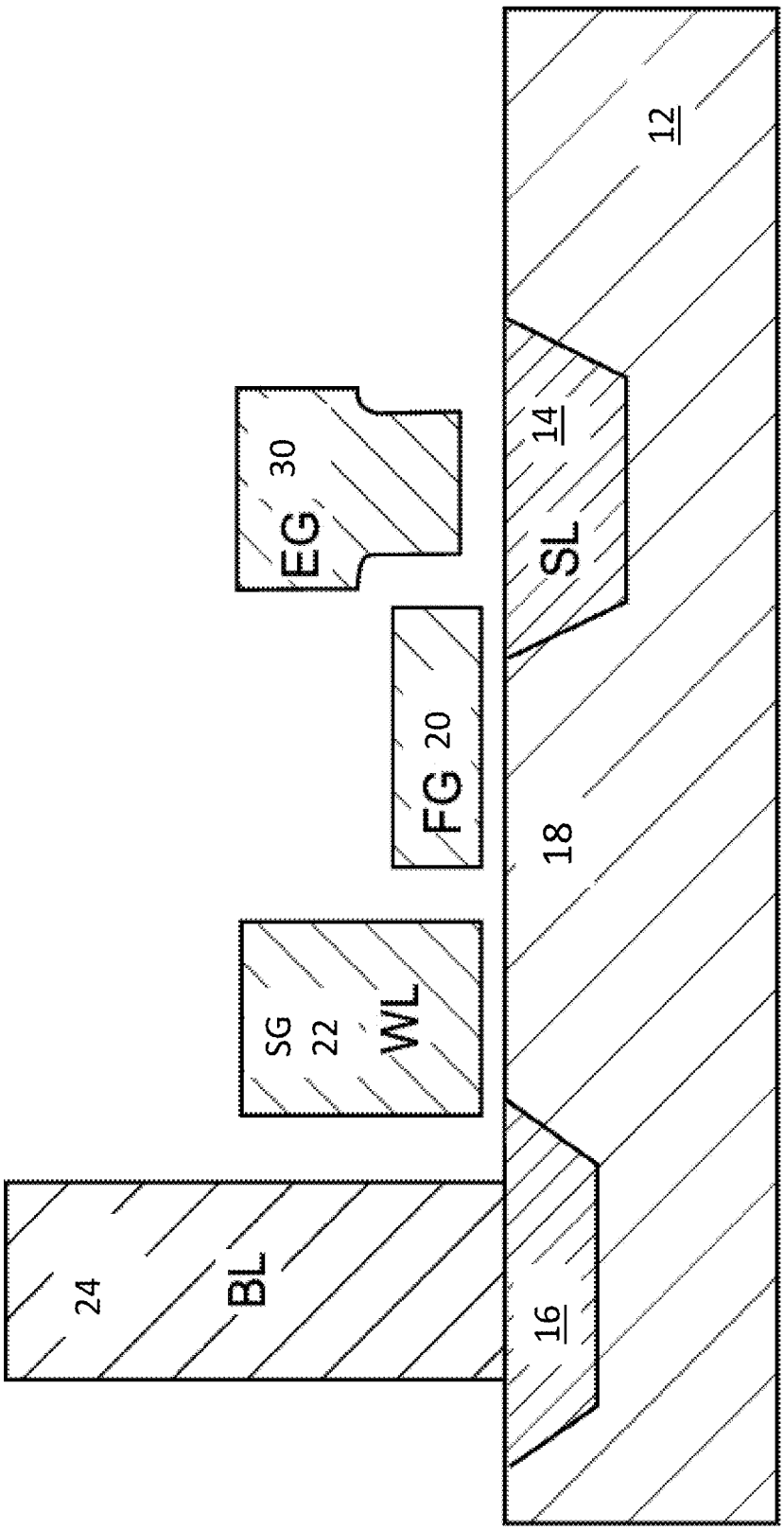
FIG. 4 depicts another prior art split gate flash memory cell.
Figure 5:
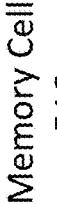
FIG. 5 depicts another prior art split gate flash memory cell.
Figure 5:
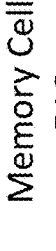
Figure 5:
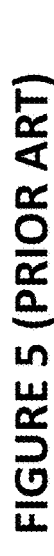
Figure 6:
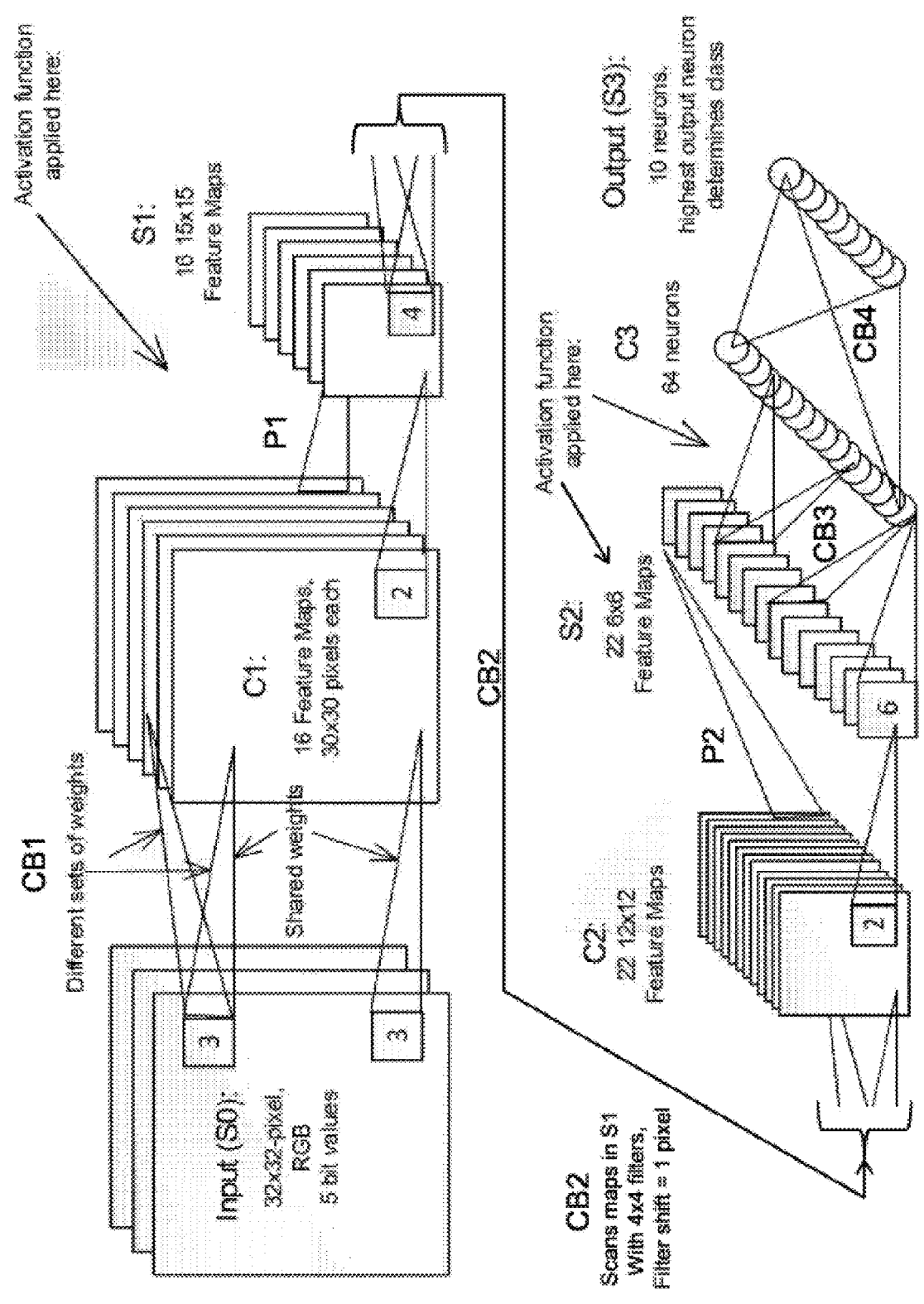
FIG. 6 is a diagram illustrating the different levels of an exemplary artificial neural network utilizing one or more non-volatile memory arrays.
Figure 7:
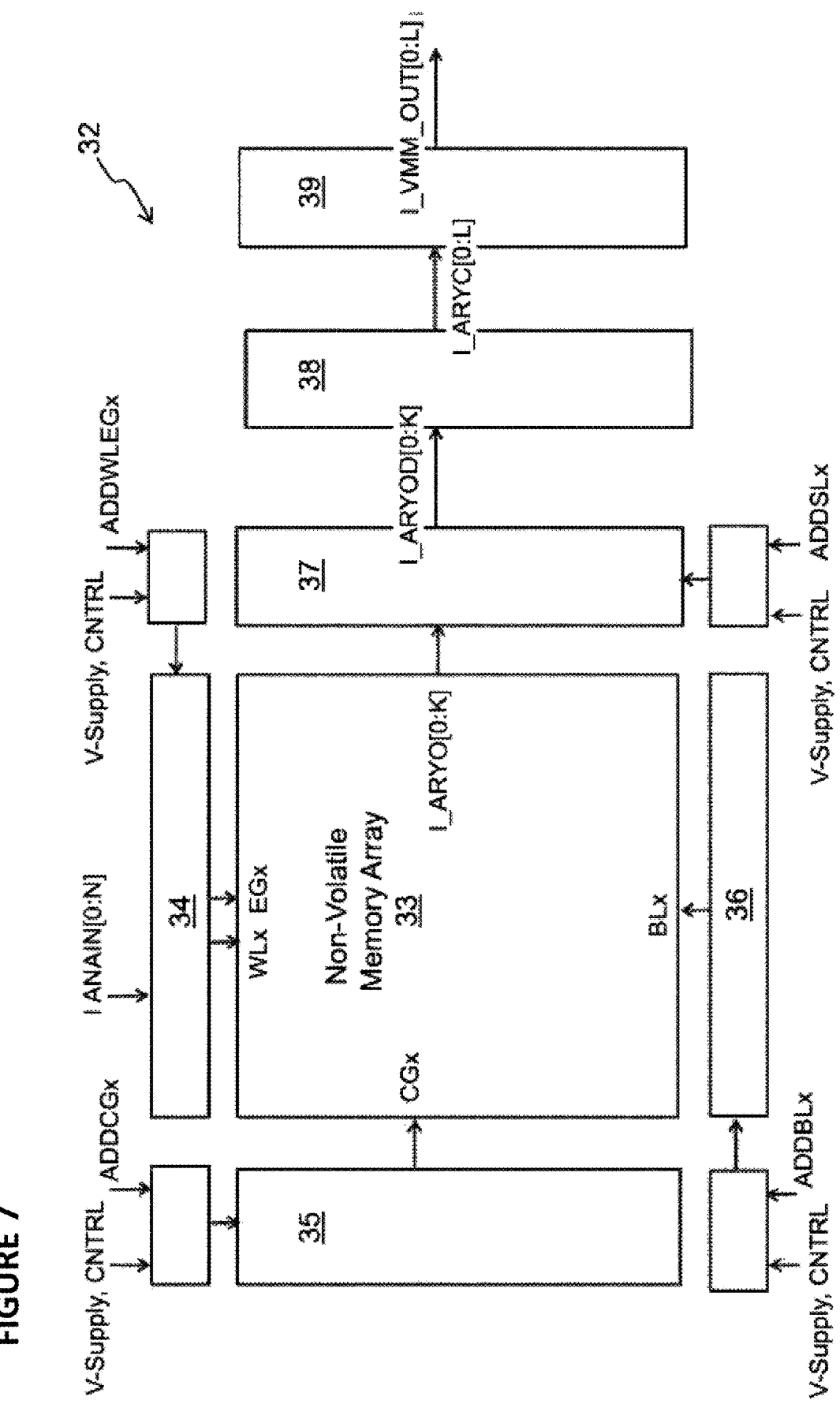
FIG. 7 is a block diagram illustrating a VMM system.
Figure 8:
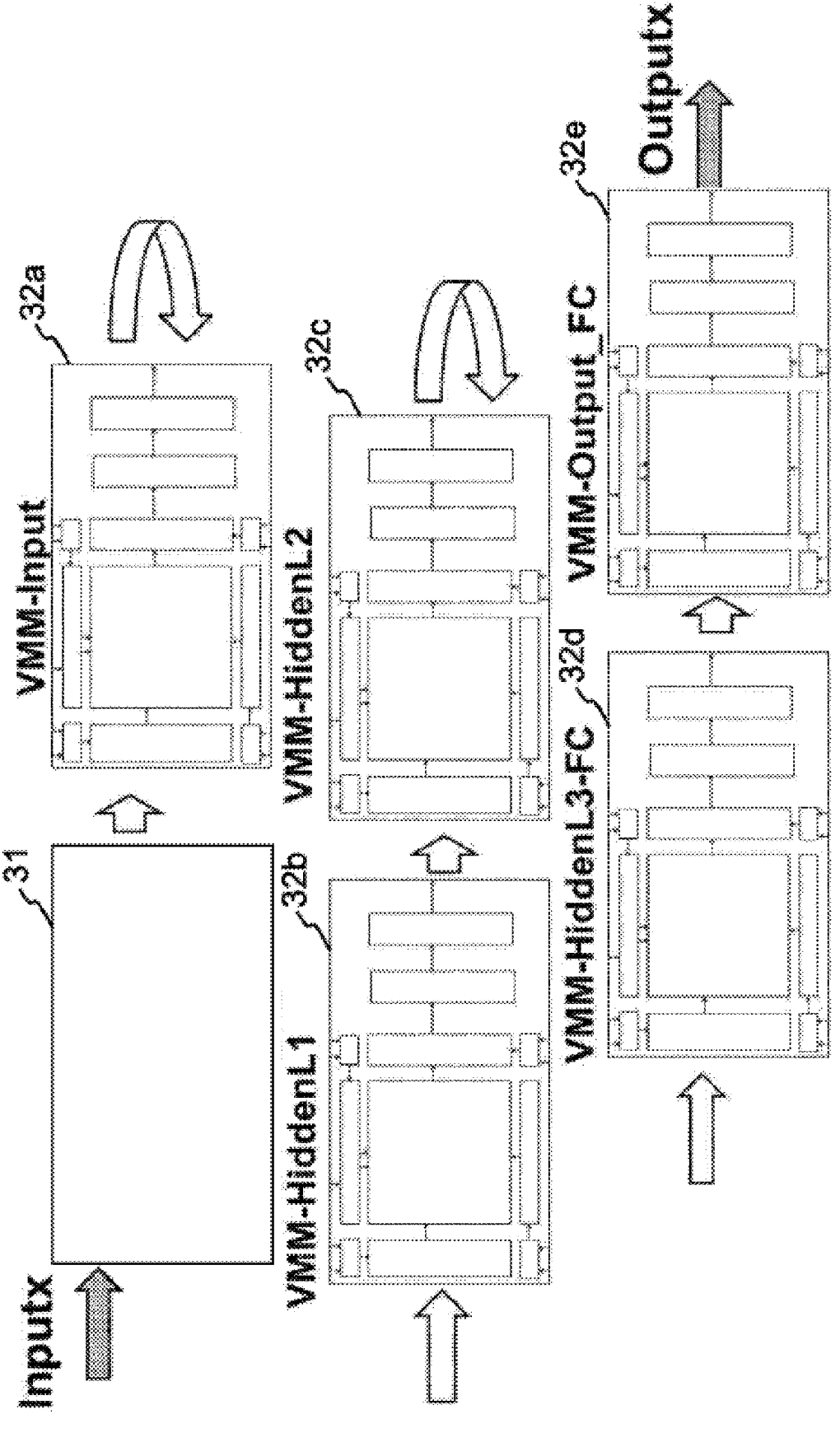
FIG. 8 is a block diagram illustrates an example artificial neural network utilizing one or more VMM systems.
Figure 9:
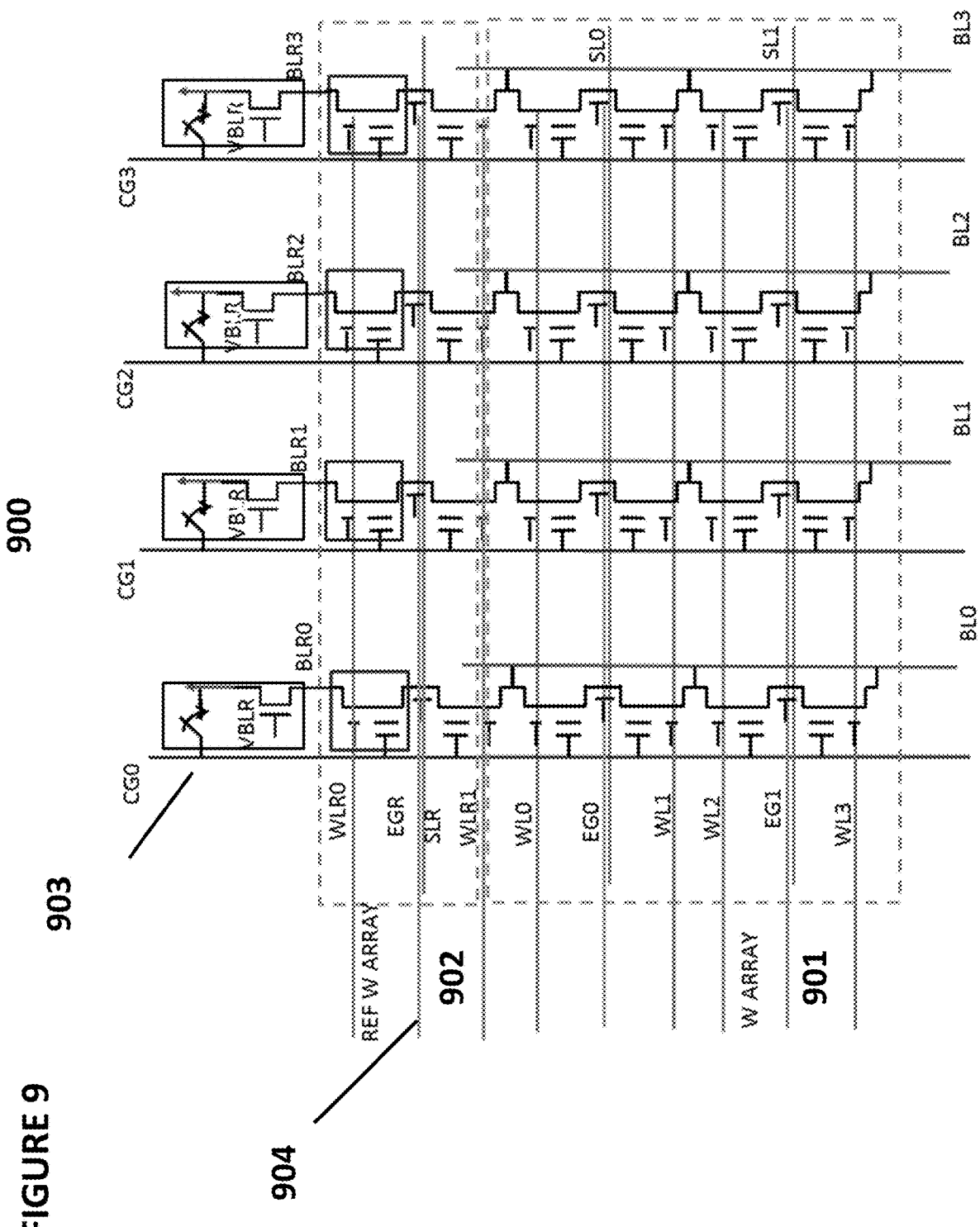
FIG. 9 depicts another example of a VMM system.
Figure 10:
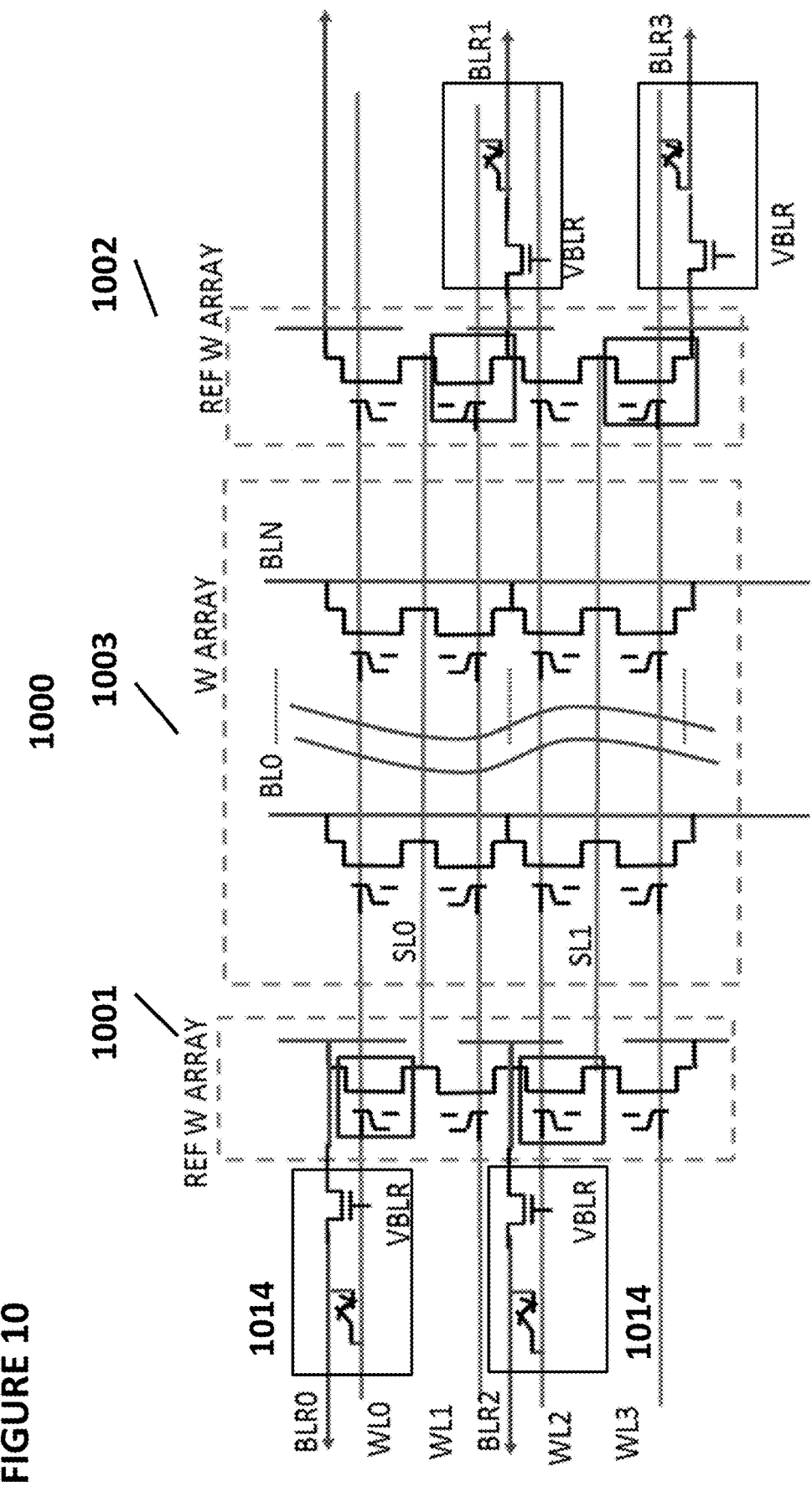
FIG. 10 depicts another example of a VMM system.
Figure 11:
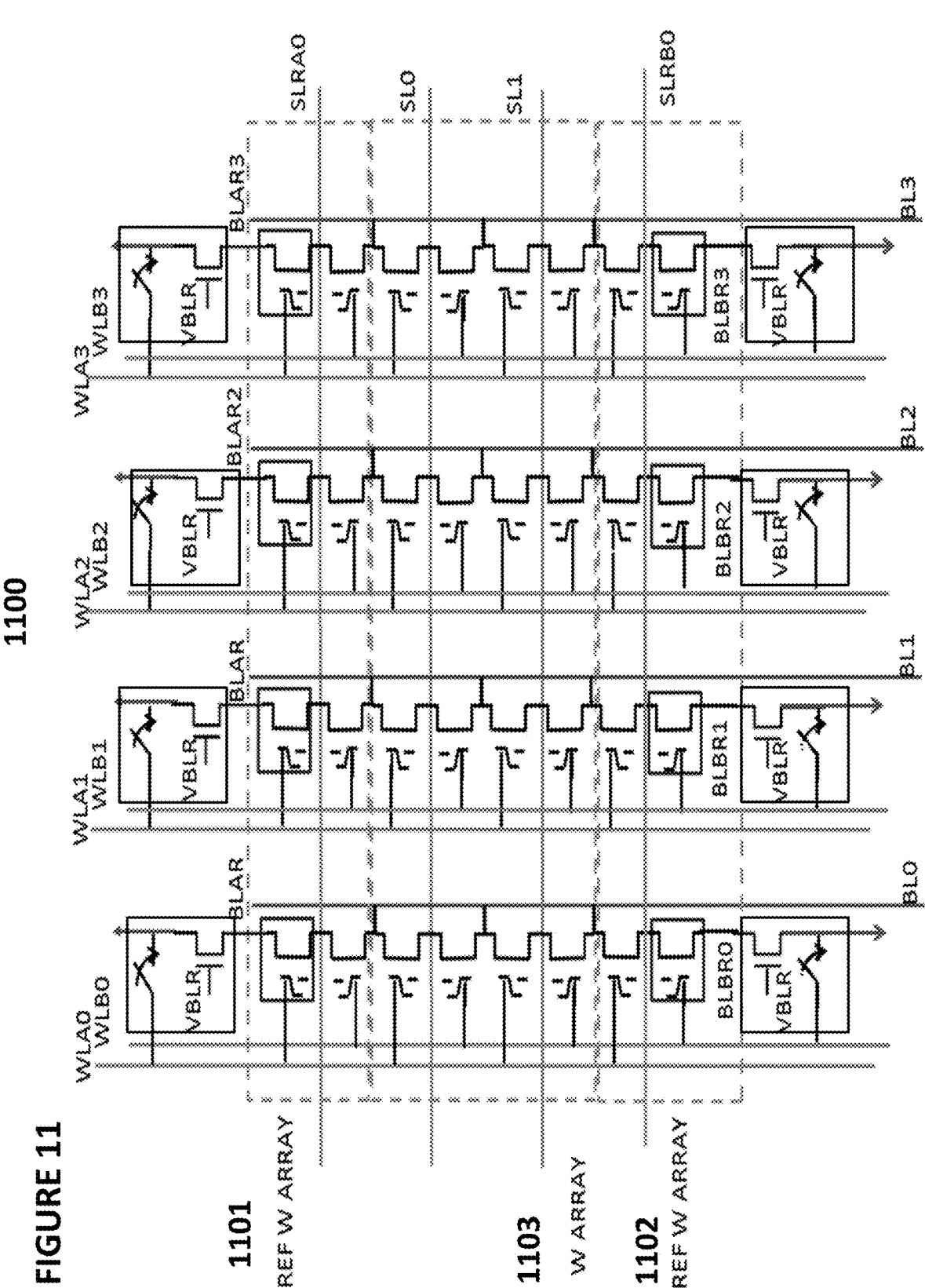
FIG. 11 depicts another example of a VMM system.
Figure 12:
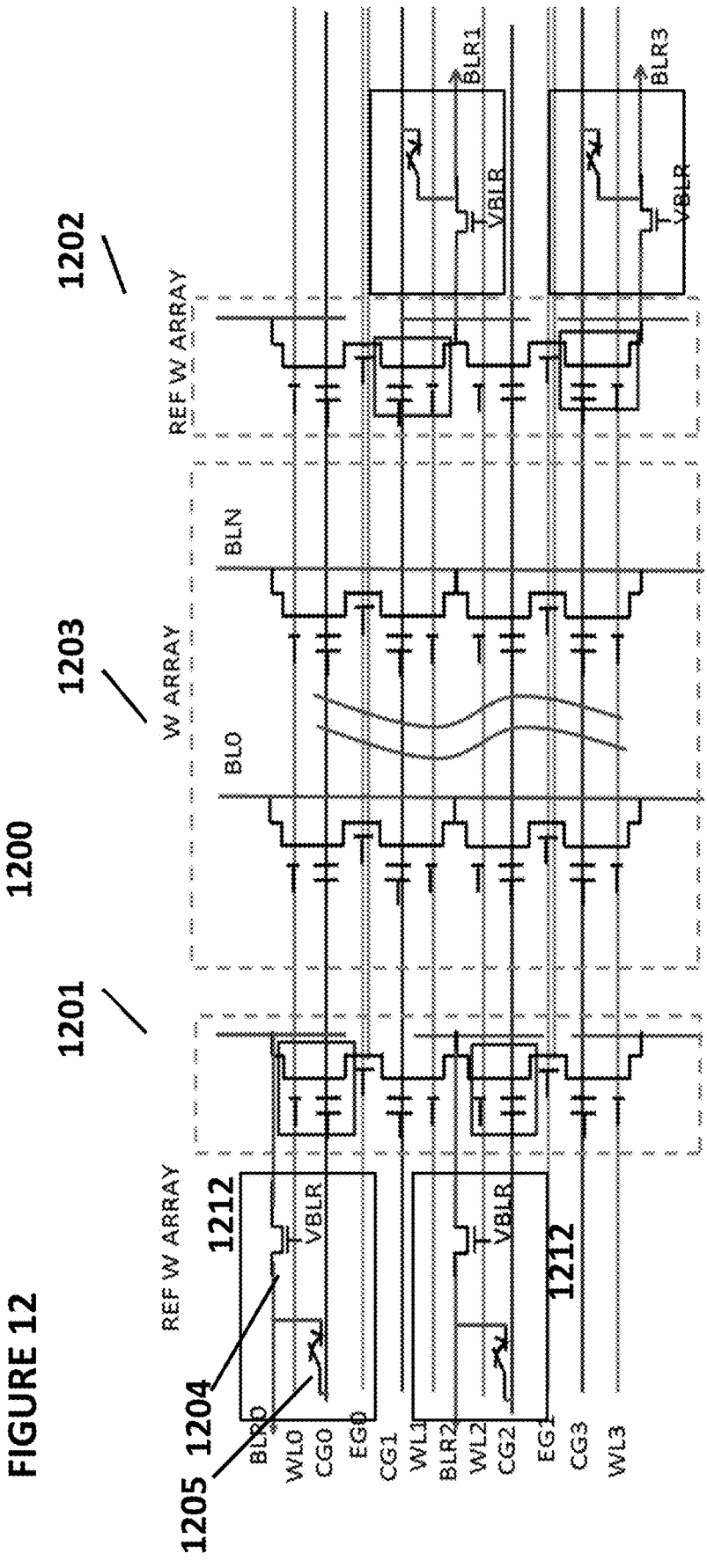
FIG. 12 depicts another example of a VMM system.
Figure 13:
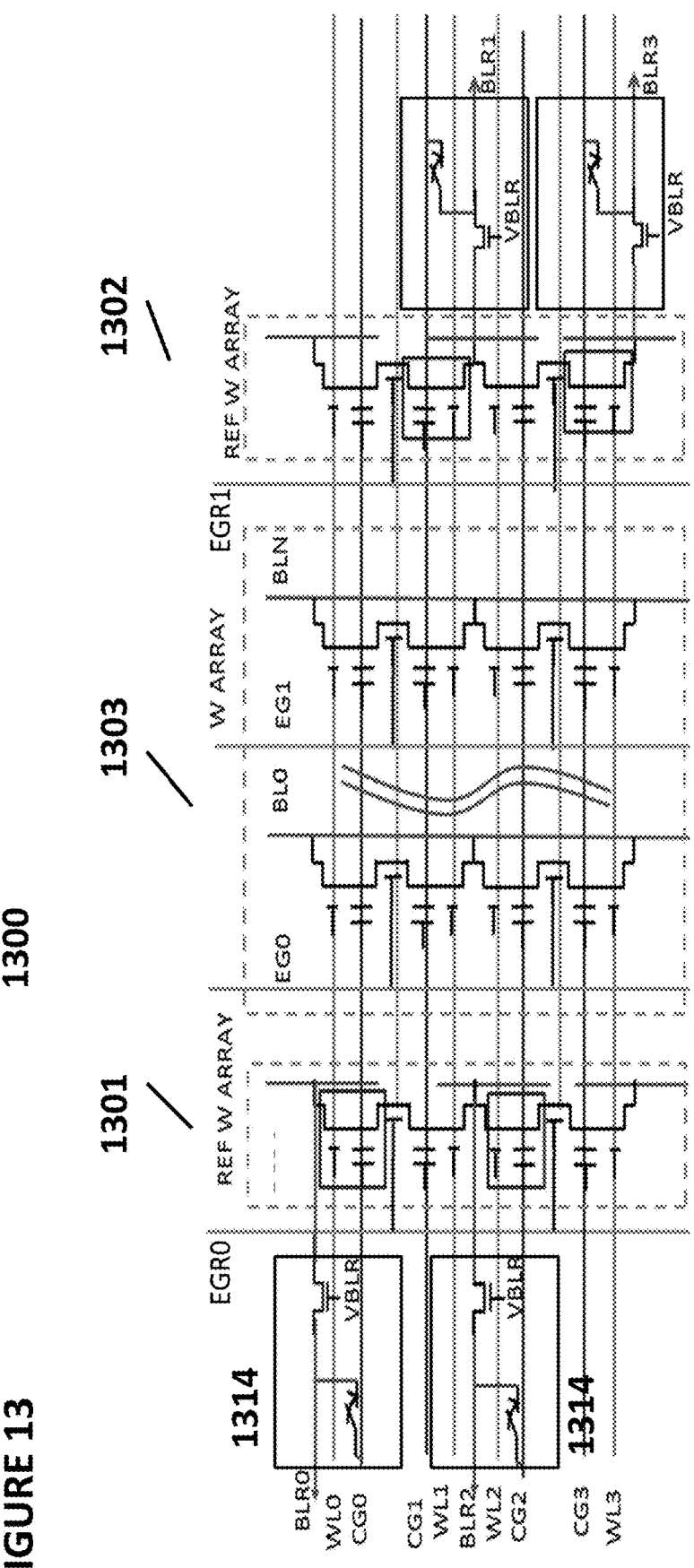
FIG. 13 depicts another example t of a VMM system.
Figure 15:
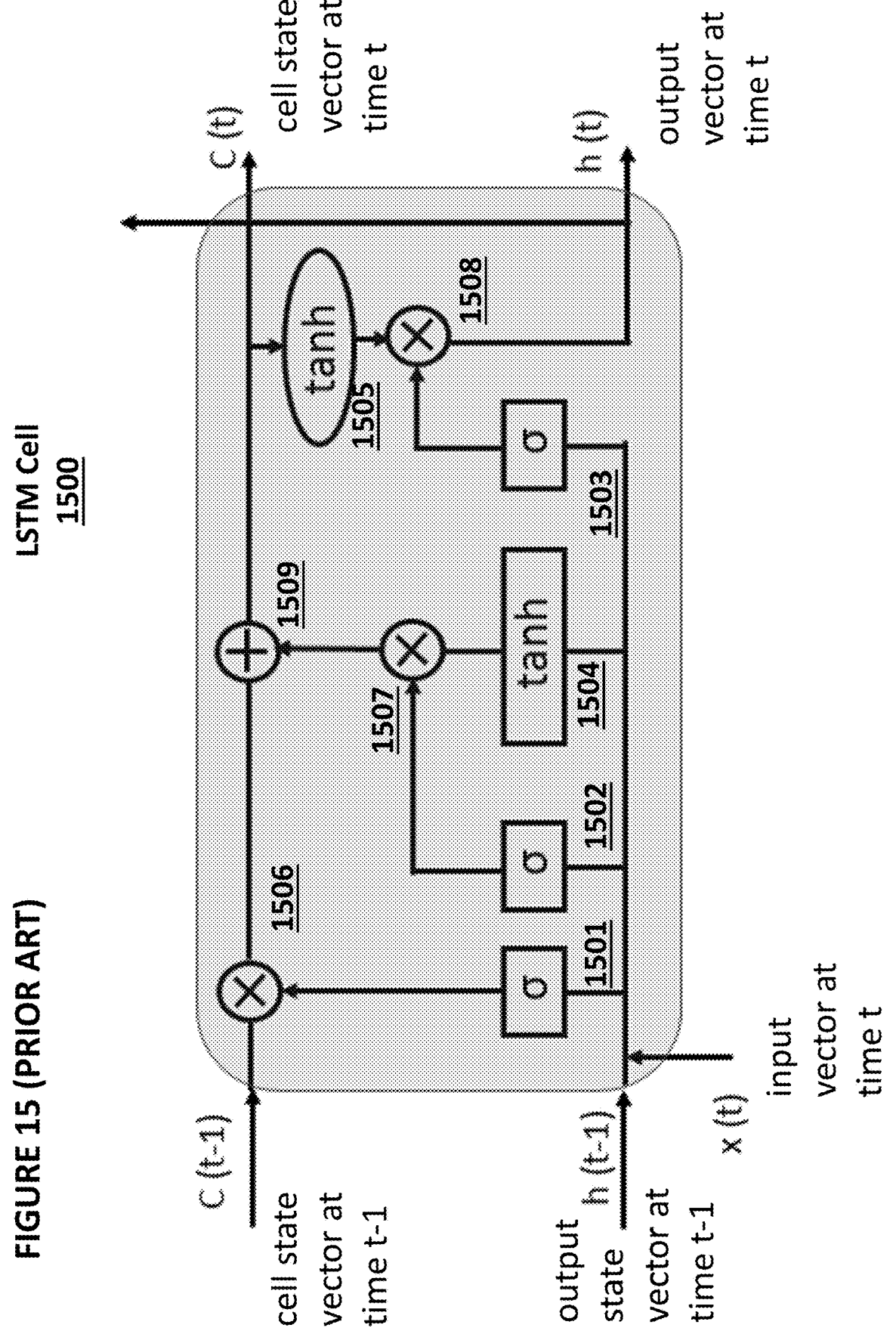
FIG. 15 depicts an example cell for use in a long short-term memory system.
Figure 16:
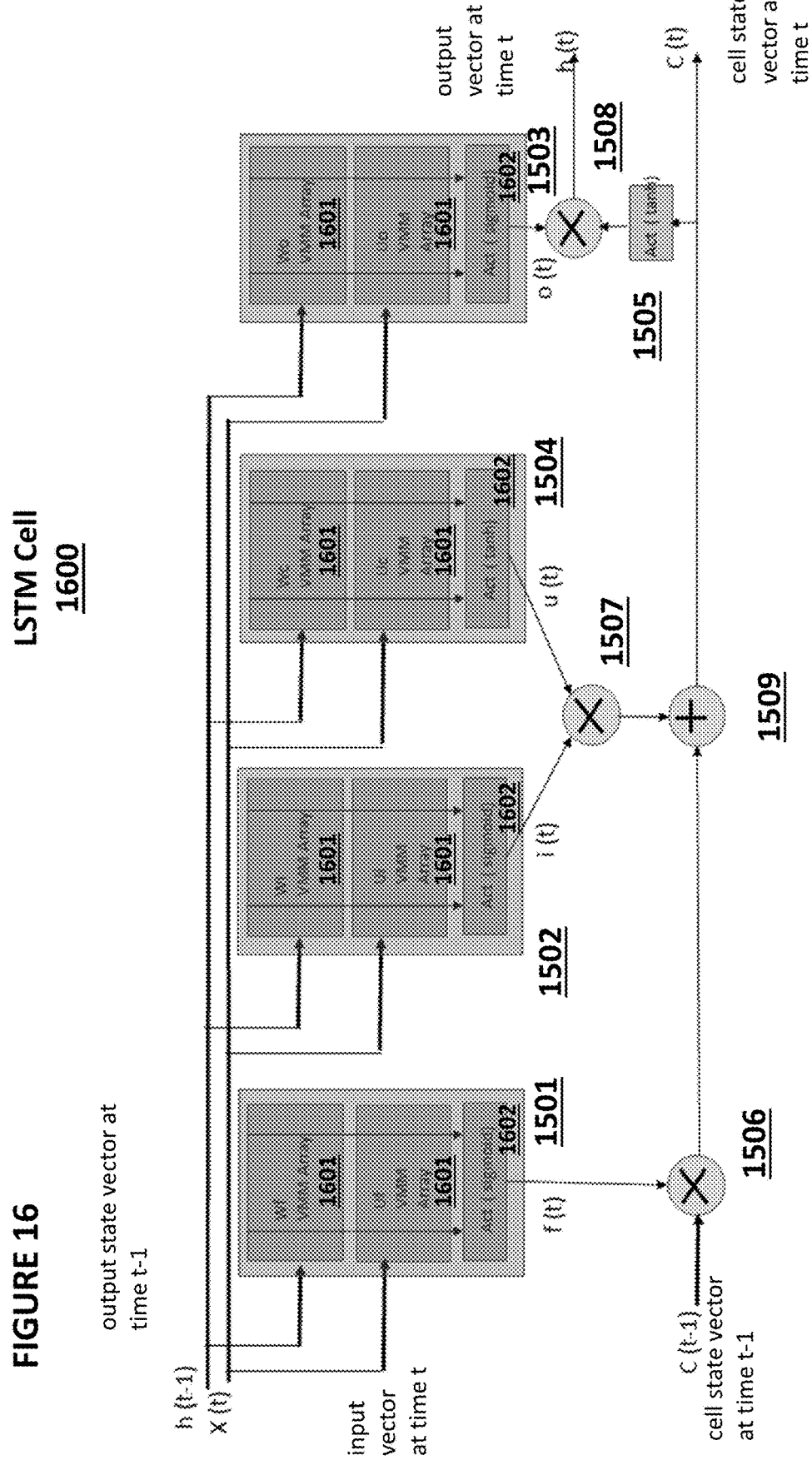
FIG. 16 depicts an example implementation of the cell of FIG. 15.
Figure 18:
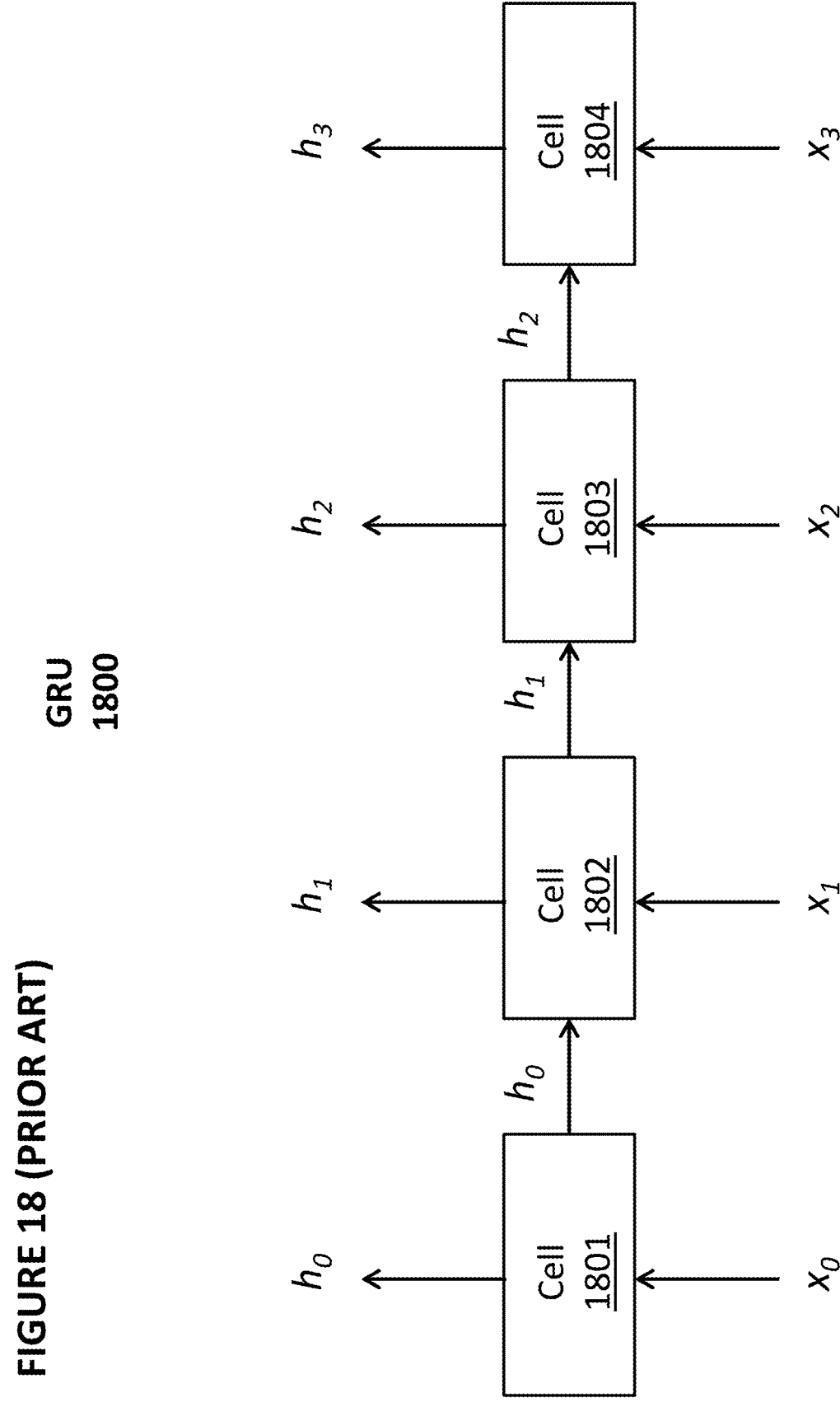
FIG. 18 depicts a prior art gated recurrent unit system.
Figure 19:
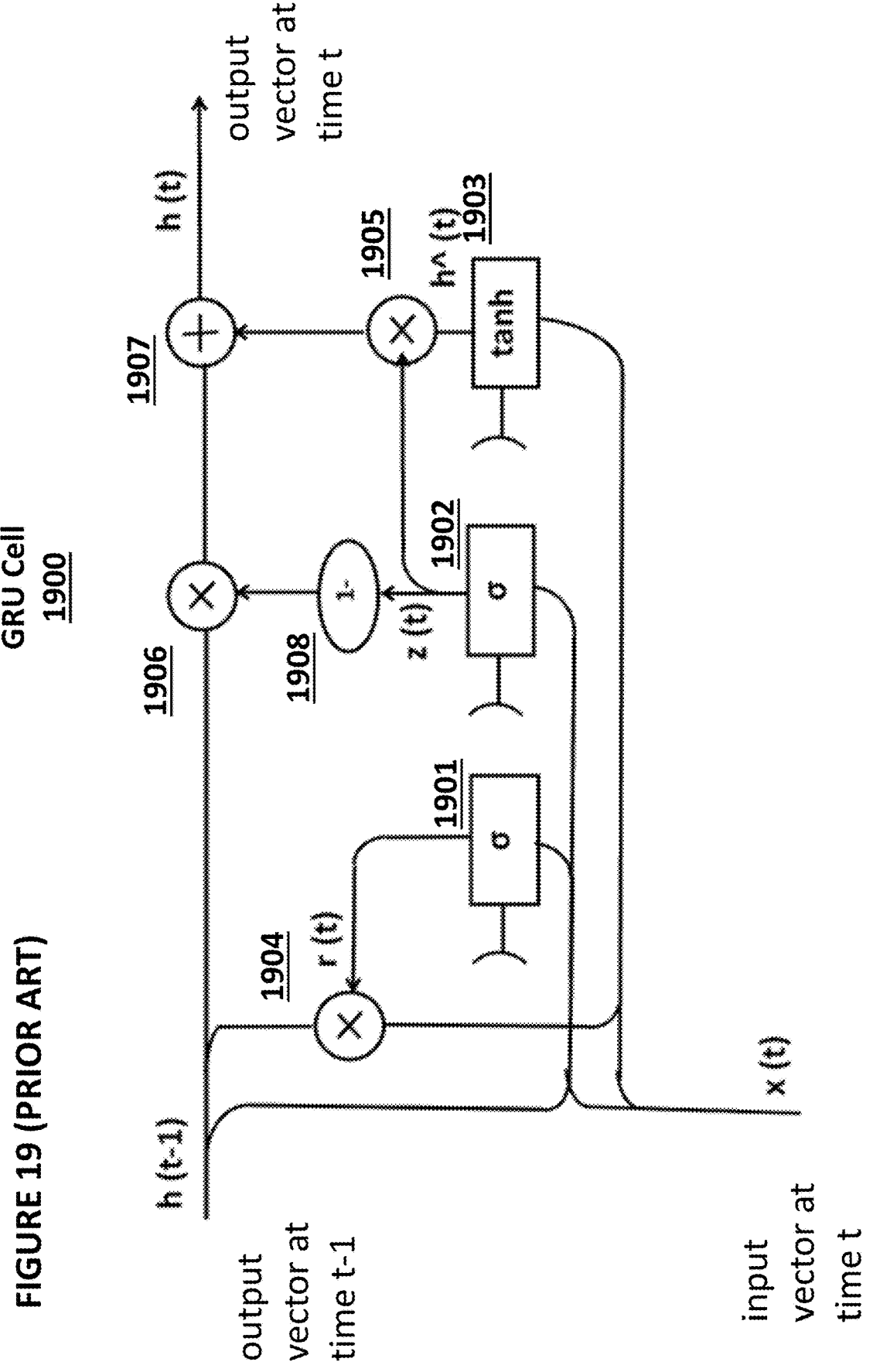
FIG. 19 depicts an example cell for use in a gated recurrent unit system.
Figure 20:
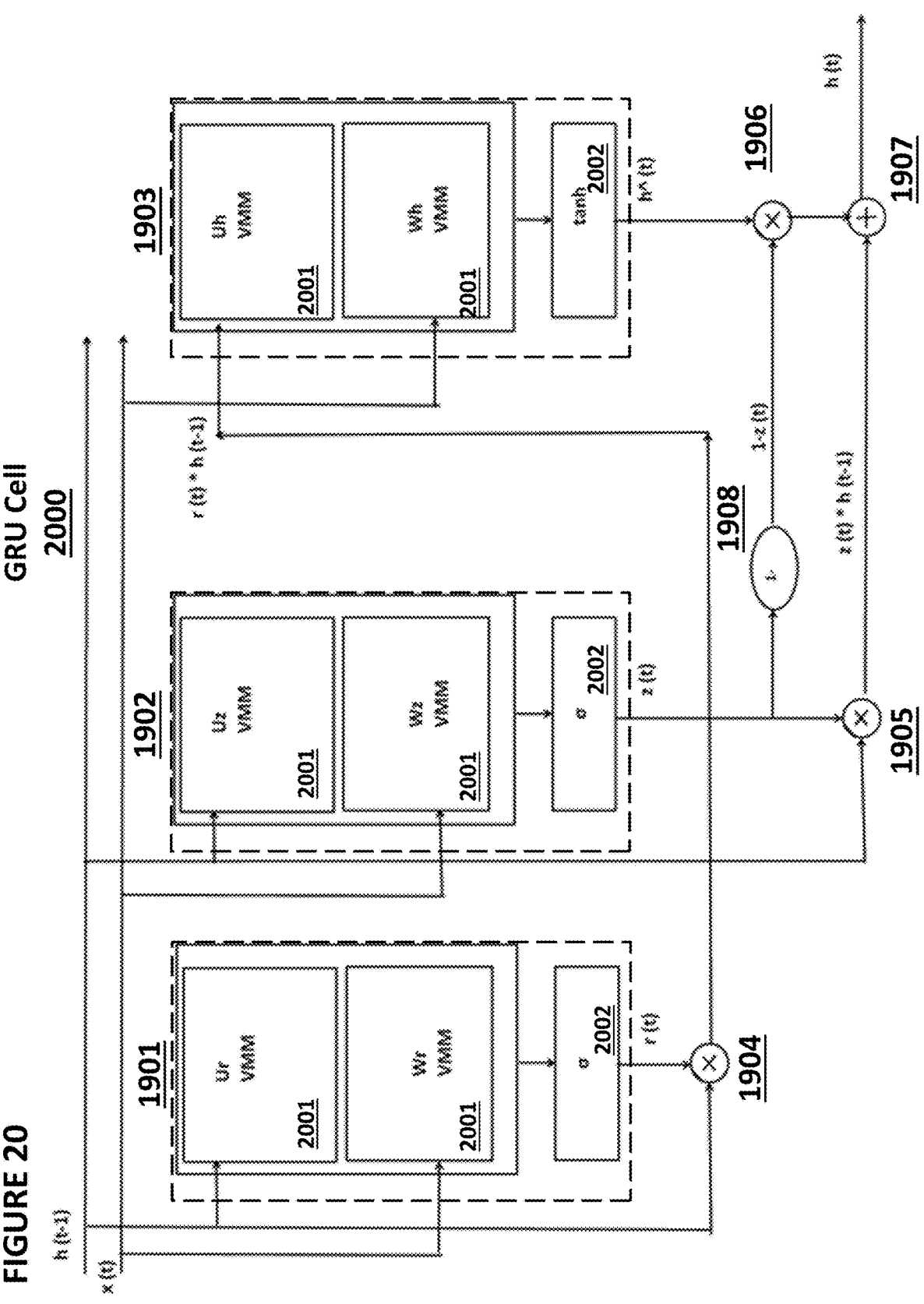
FIG. 20 depicts an example implementation t of the cell of FIG. 19.
Figure 21:
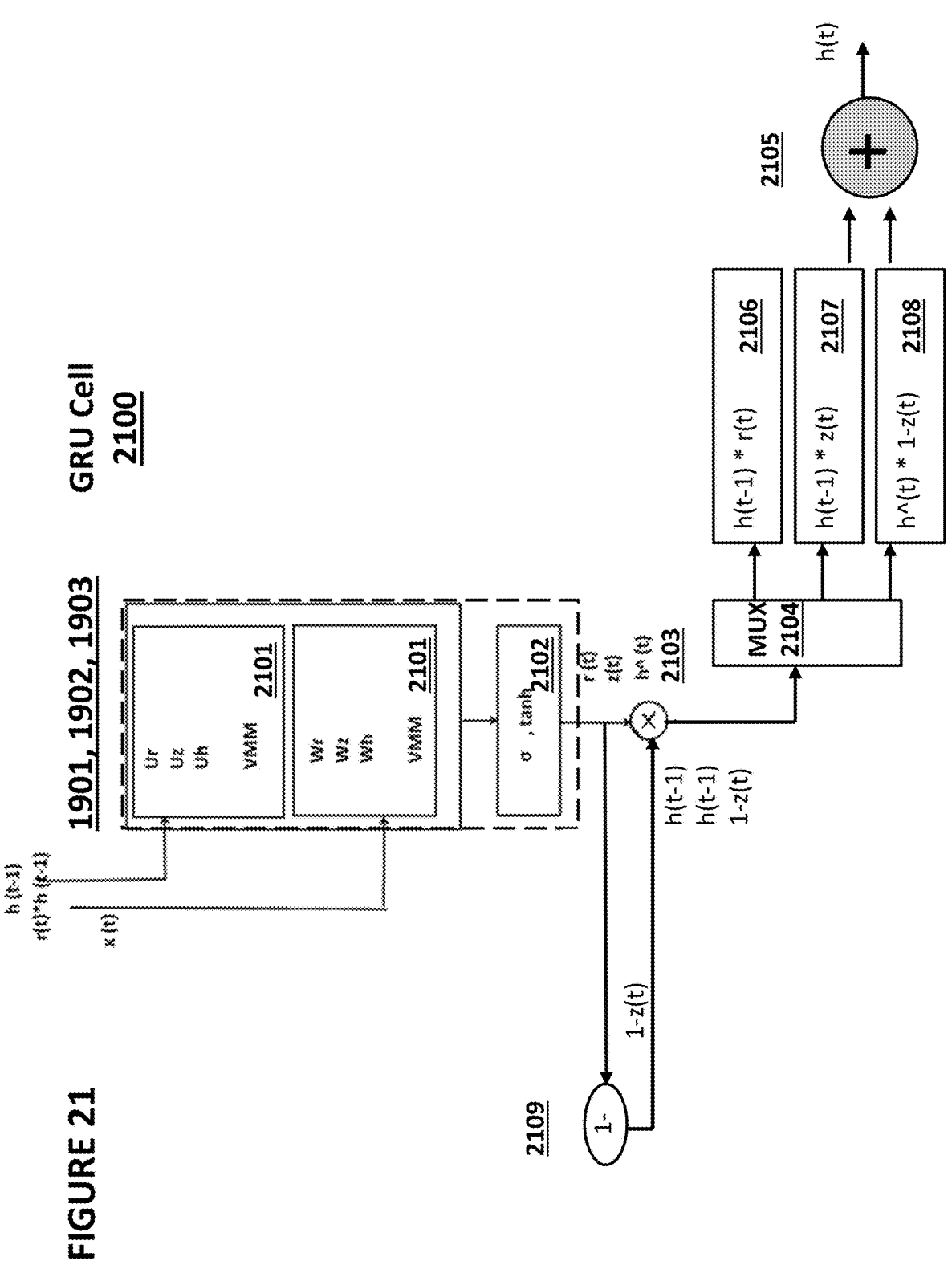
FIG. 21 depicts another example implementation of the cell of FIG. 19.
Figure 22:
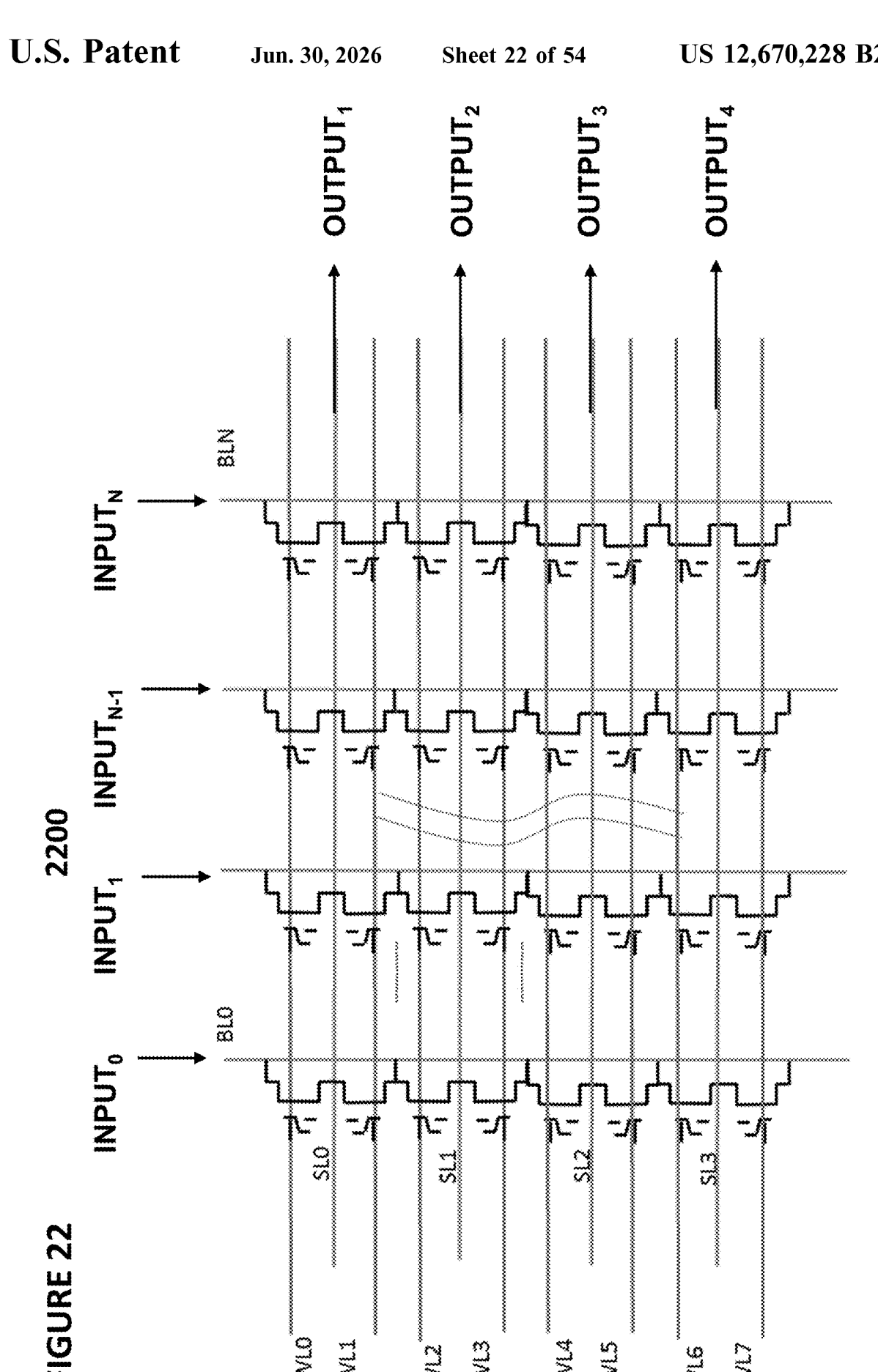
FIG. 22 depicts another example of a VMM system.
Figure 23:
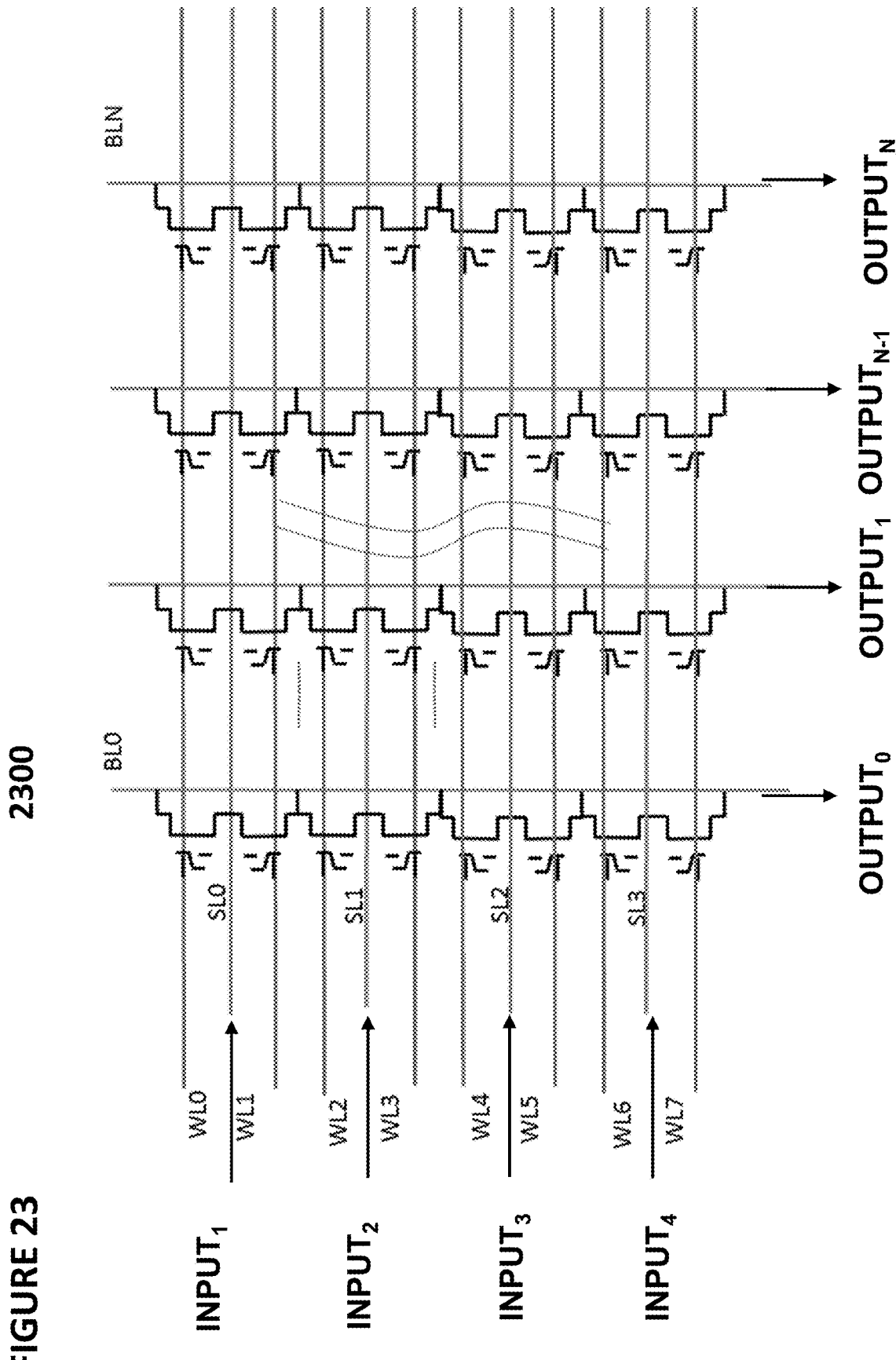
FIG. 23 depicts another example of a VMM system.
Figure 24:
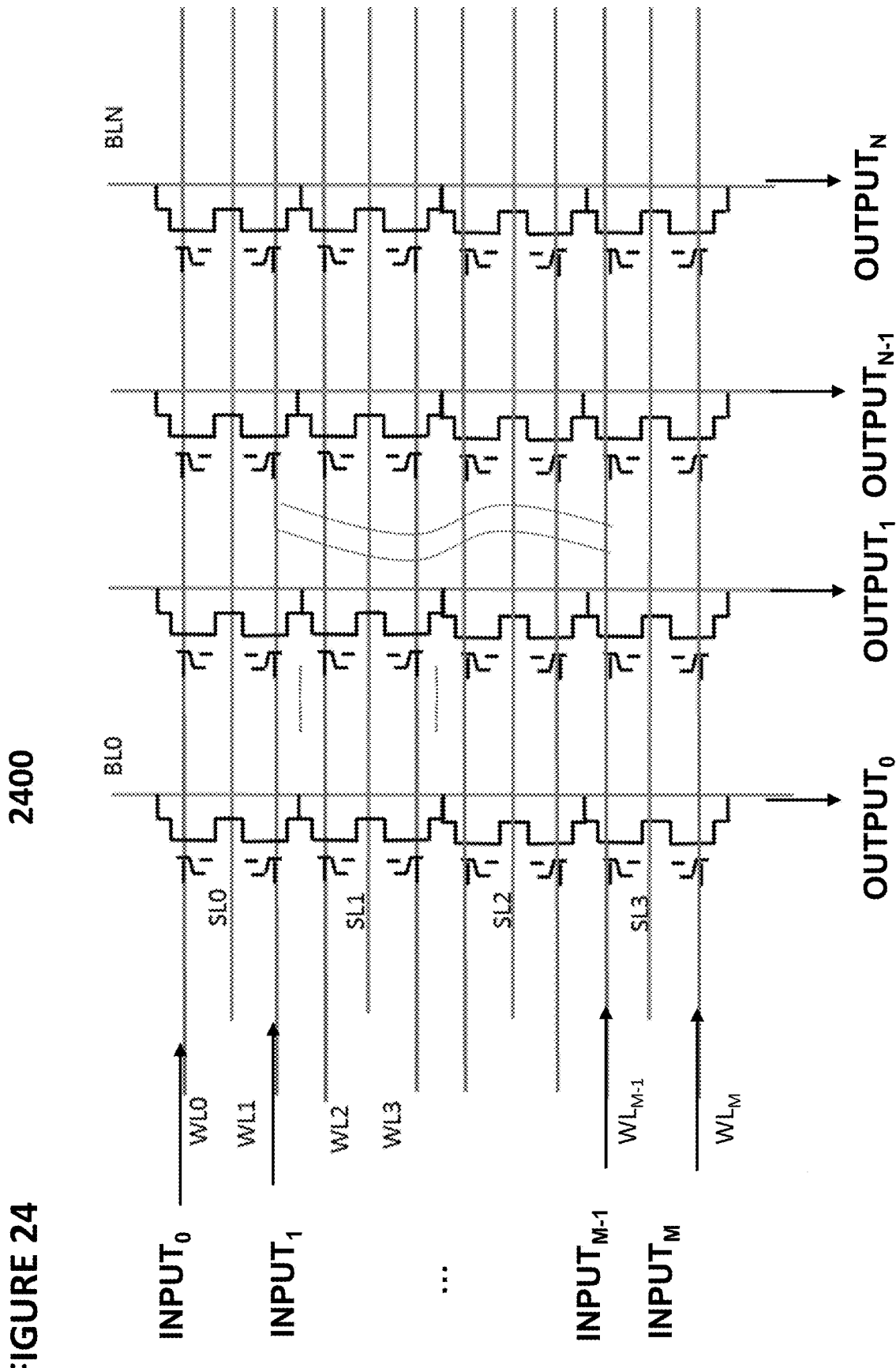
FIG. 24 depicts another example of a VMM system.
Figure 25:
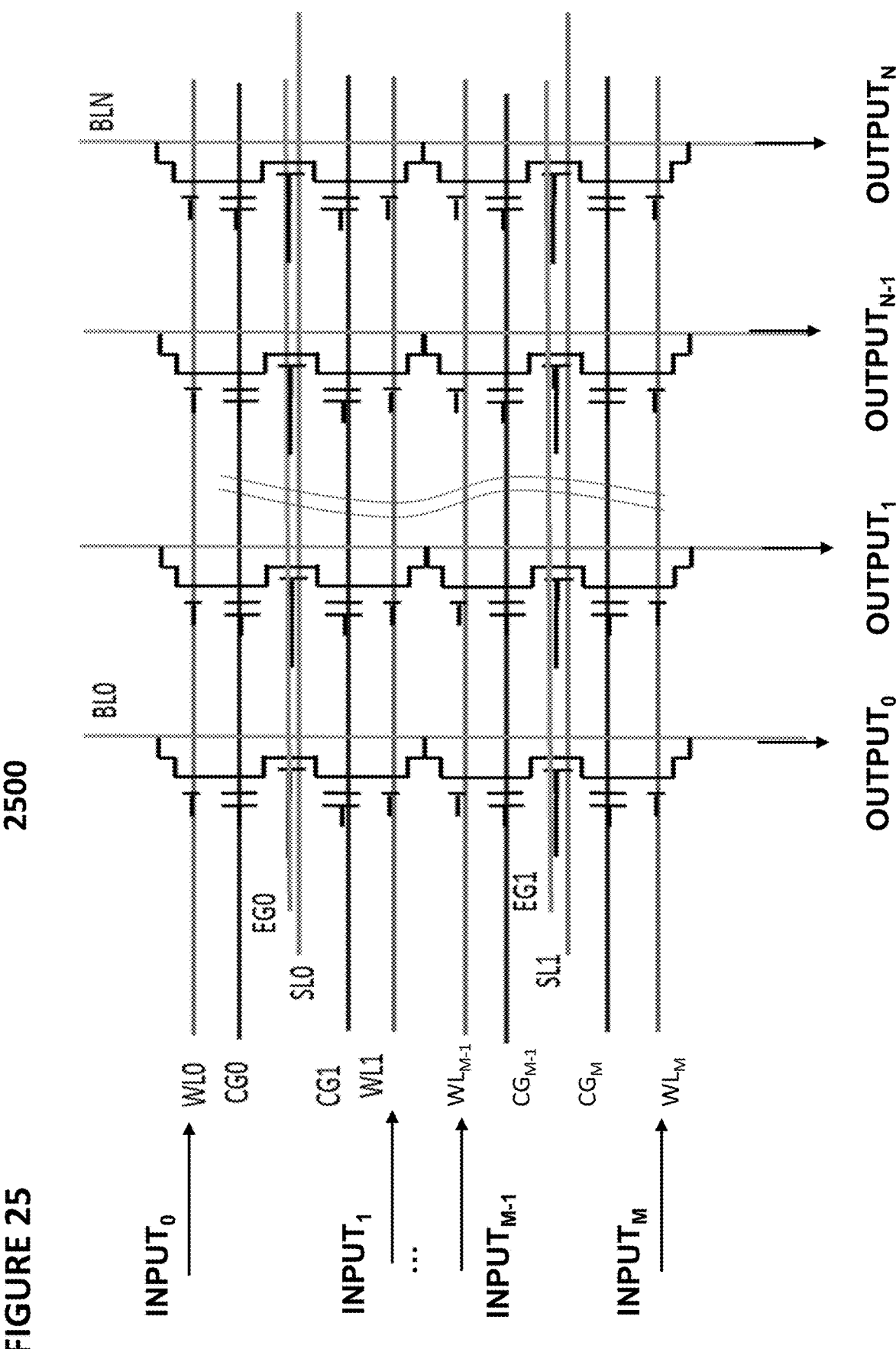
FIG. 25 depicts another example of a VMM system.
Figure 26:
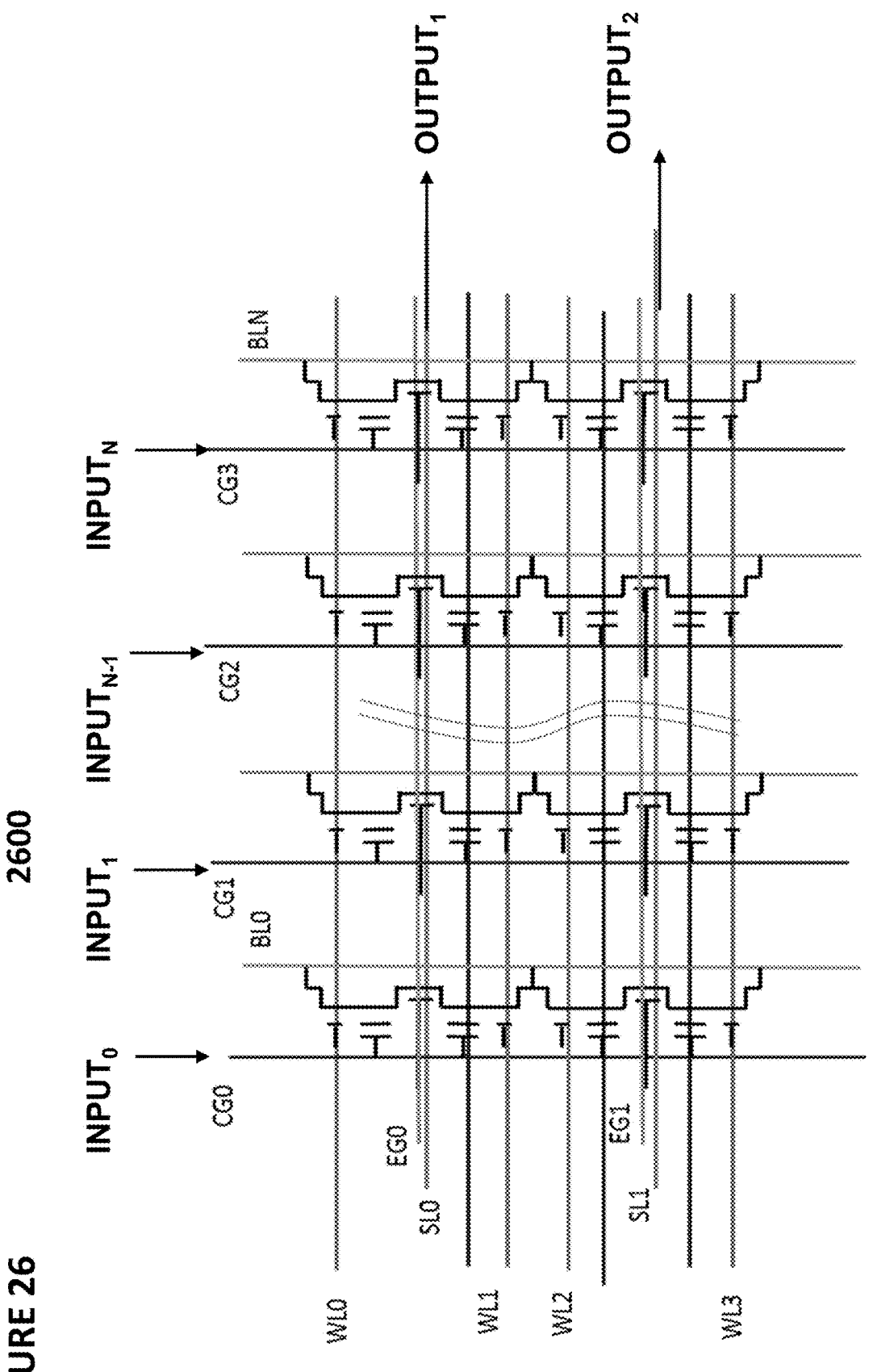
FIG. 26 depicts another example of a VMM system.
Figure 27:
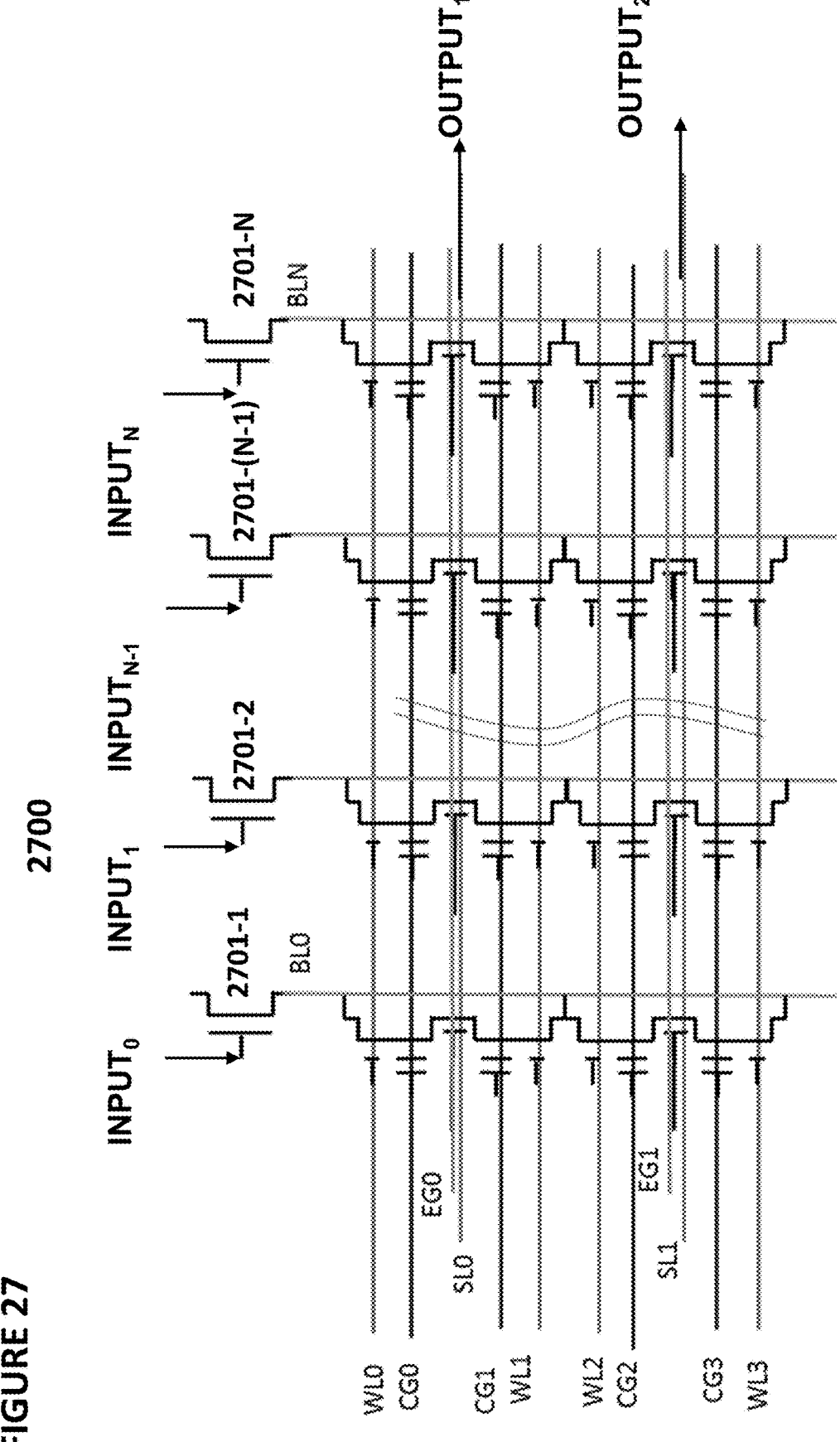
FIG. 27 depicts another example of a VMM system.
Figure 28:
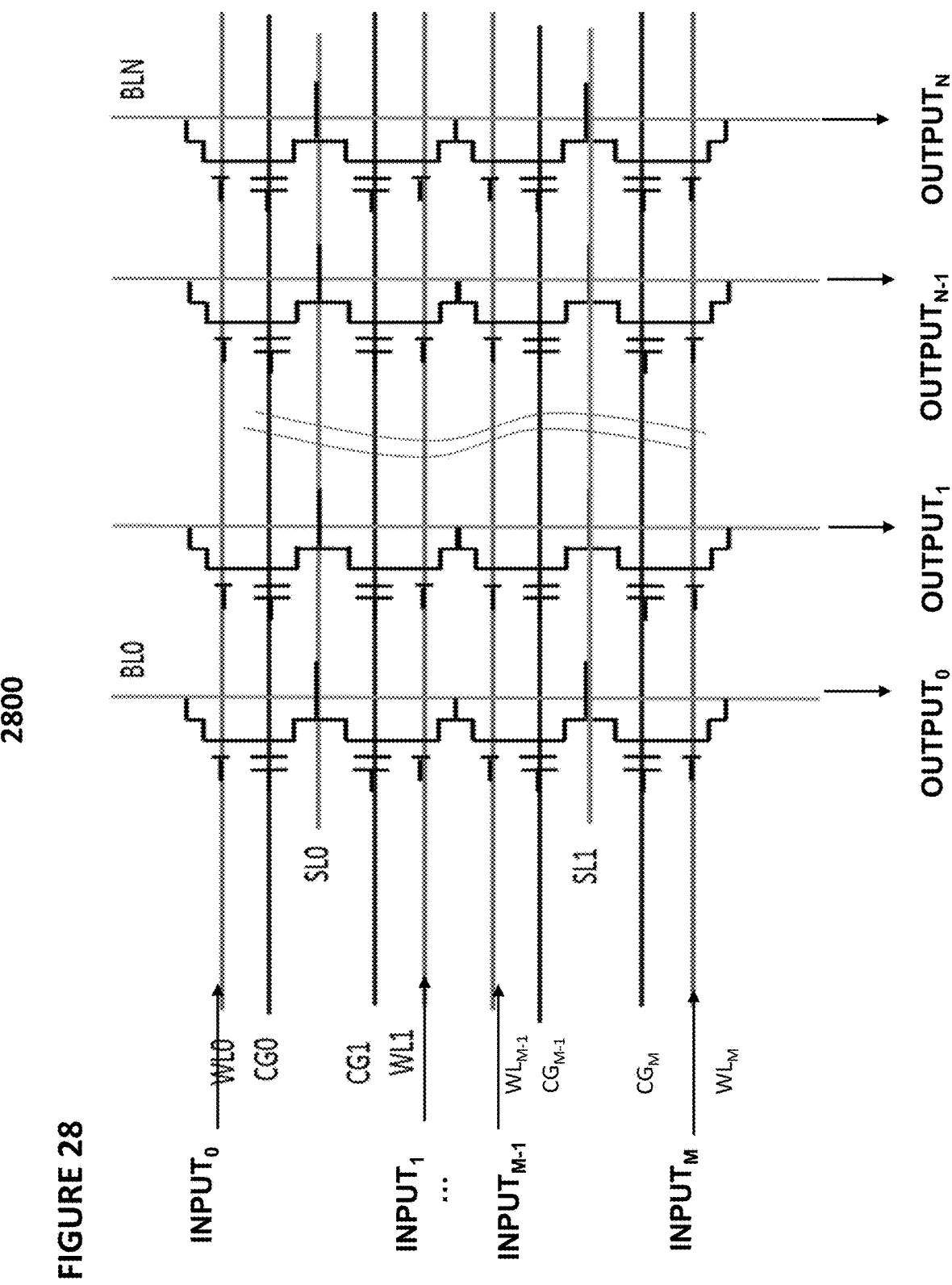
FIG. 28 depicts another example of a VMM system.
Figure 29:
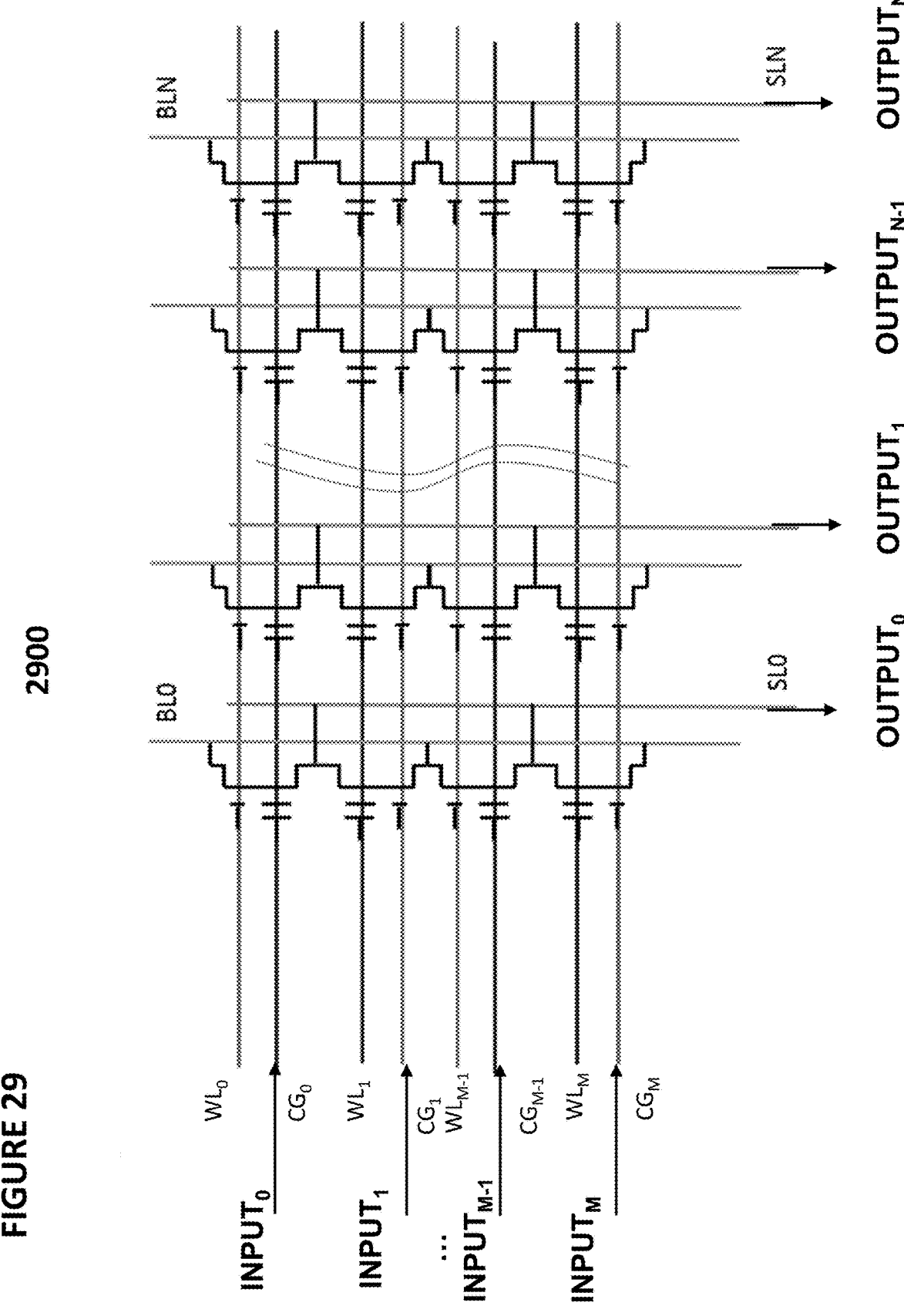
FIG. 29 depicts another example of a VMM system.
Figure 30:
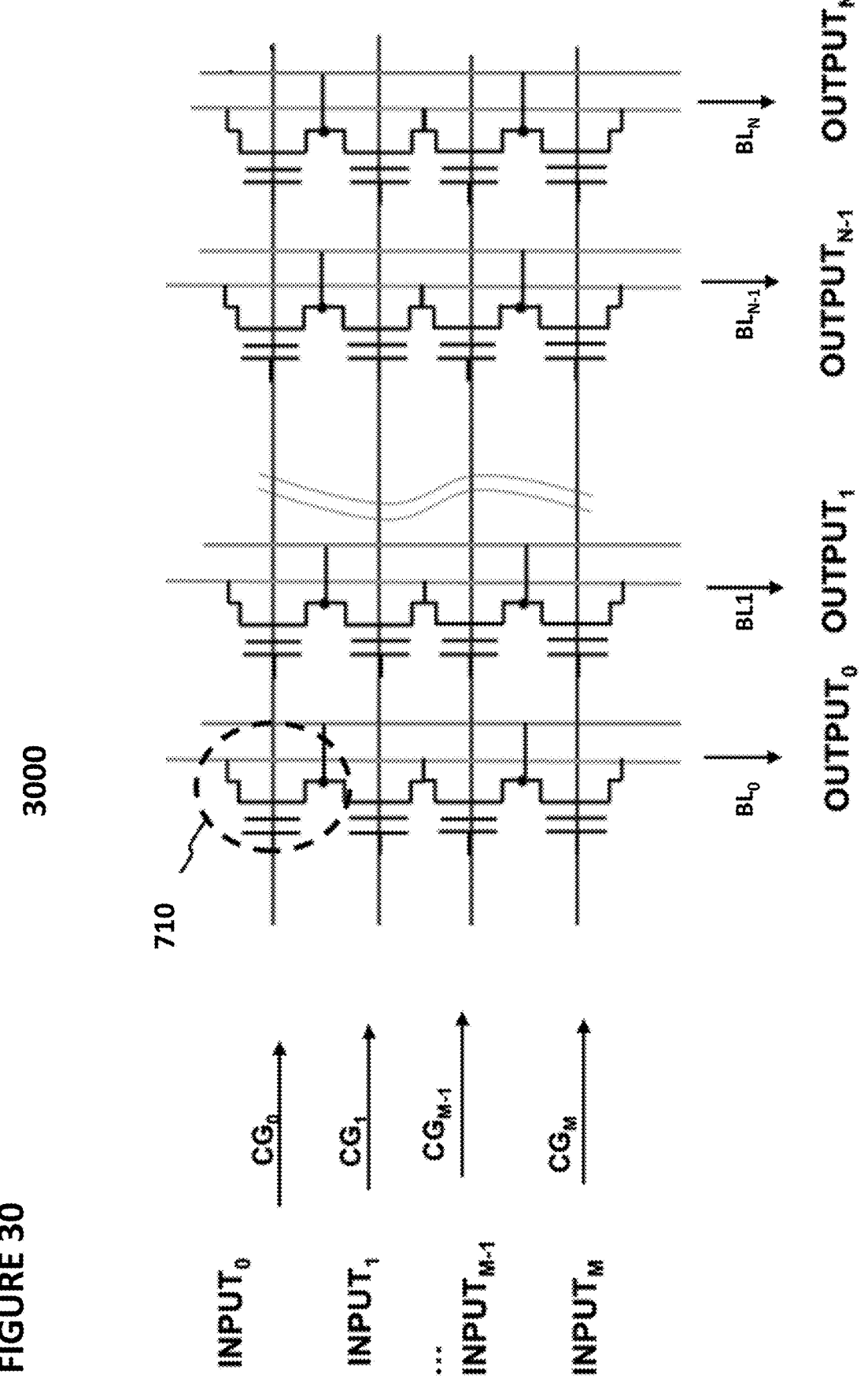
FIG. 30 depicts another example of a VMM system.
Figure 31:
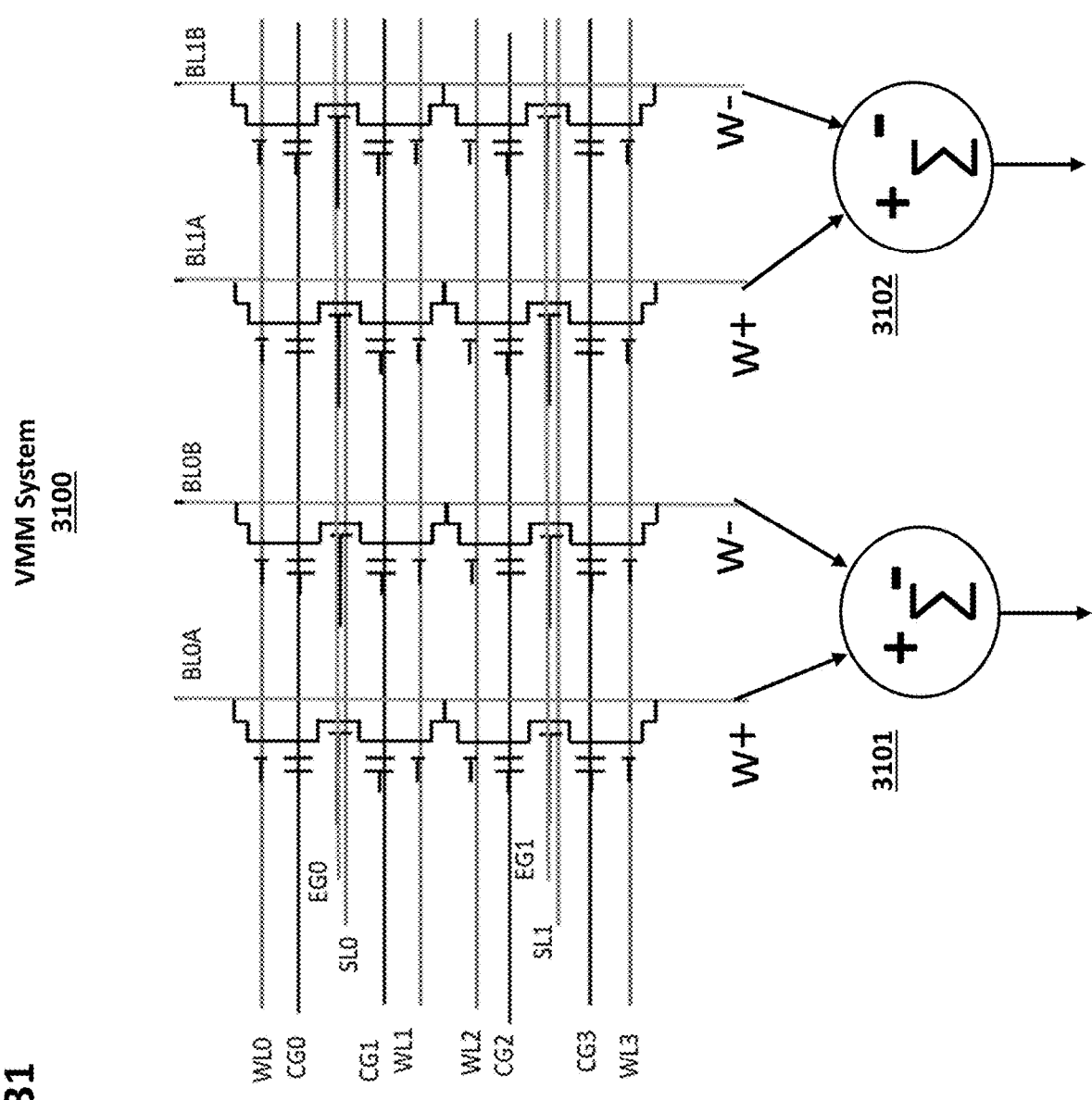
FIG. 31 depicts another example of a VMM system.
Figure 32:
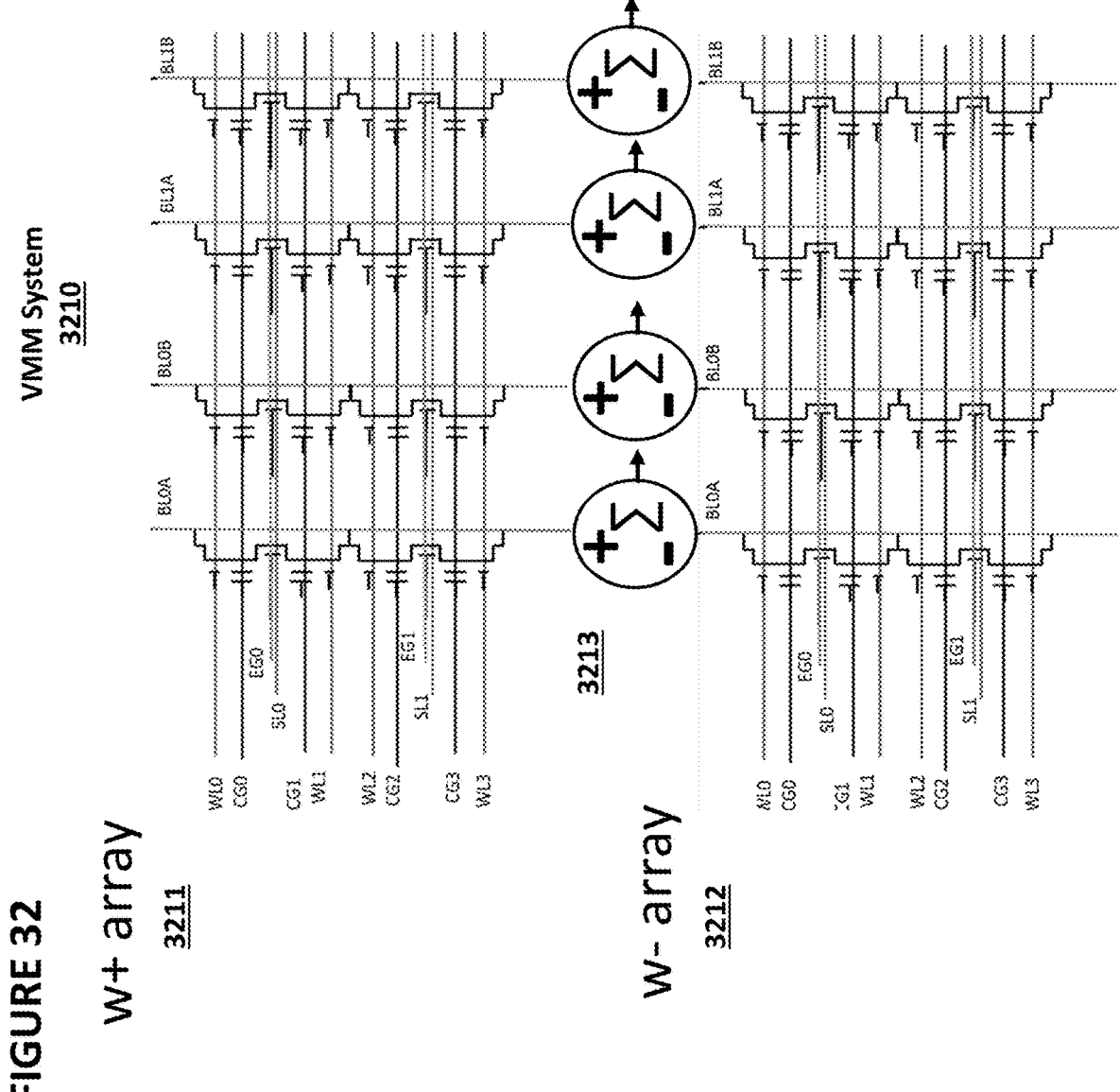
FIG. 32 depicts another example of a VMM system.
Figure 33:
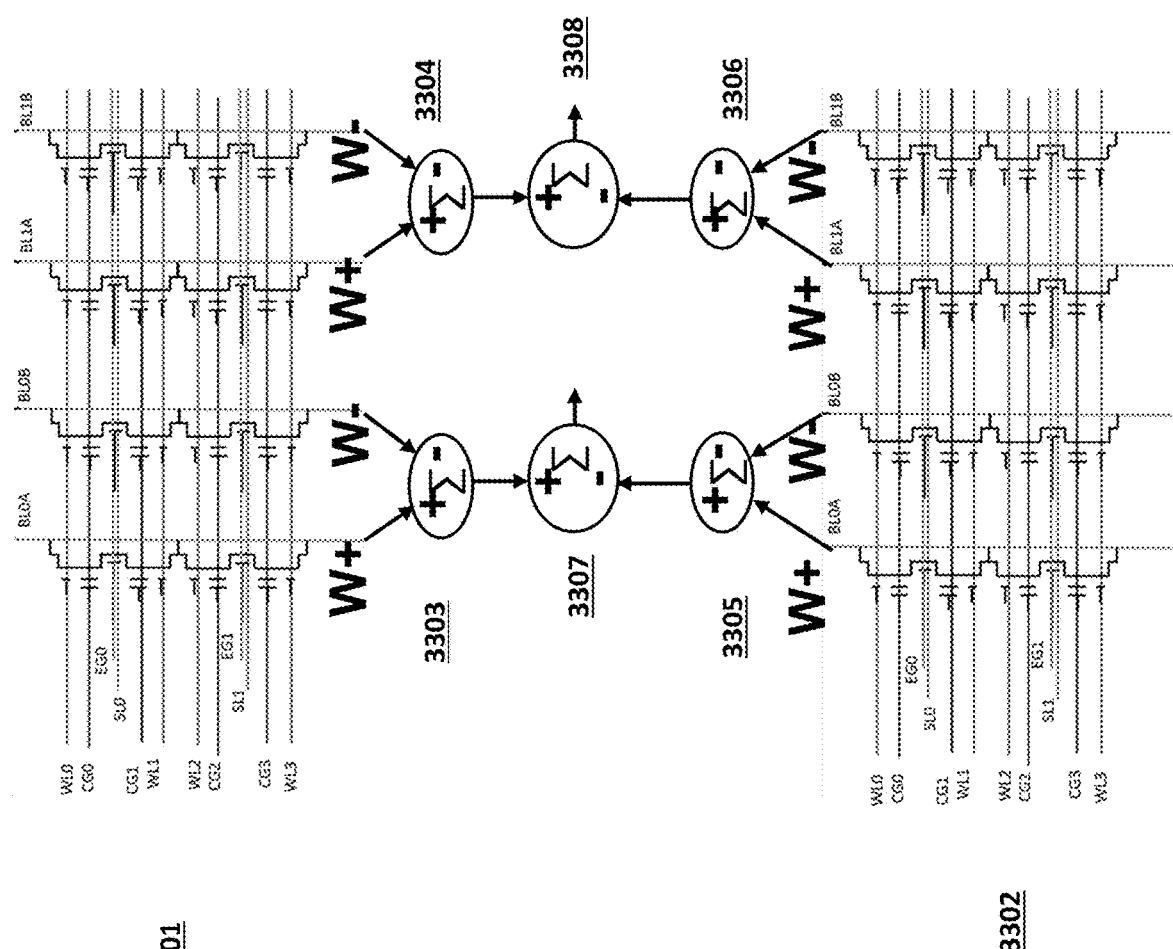
FIG. 33 depicts another example of a VMM system.
Figure 34:
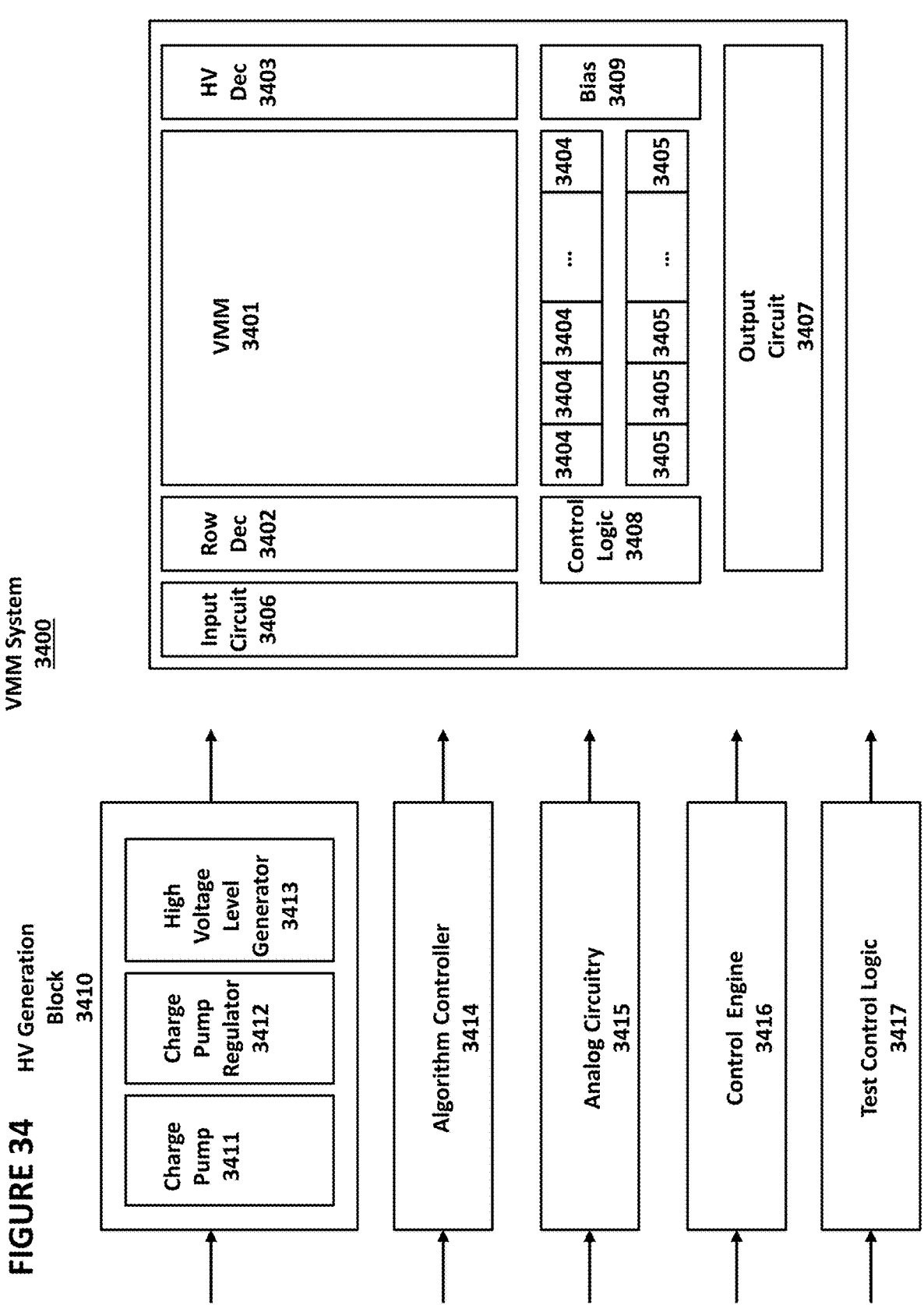
FIG. 34 depicts another example of a VMM system.

FIG. 34 depicts a block diagram of a VMM system 3400. VMM system 3400 comprises VMM array 3401, row decoder 3402, high voltage decoder 3403, column decoders 3404, bit line drivers 3405, input circuit 3406, output circuit 3407, control logic 3408, and bias generator 3409. VMM system 3400 further comprises high voltage generation block 3410, which comprises charge pump 3411, charge pump regulator 3412, and high voltage analog precision level generator 3413. VMM system 3400 further comprises (program/erase, or weight tuning) algorithm controller 3414, analog circuitry 3415, control engine 3416 (that may include special functions such as arithmetic functions, activation functions, embedded microcontroller logic, without limitation), and test control logic 3417.

As discussed in further detail below, input circuit 3406 may include circuits such as an AAC (analog to analog converter, such as a current to voltage converter or a logarithmic converter), PAC (pulse to analog level converter), or any other type of converter. The input circuit 3406 may implement one or more of normalization, linear or non-linear up/down scaling functions, or arithmetic functions. The input circuit 3406 may implement a temperature compensation function for input levels. The input circuit 3406 may implement an activation function such as a rectified linear activation function (ReLU) or a sigmoid.

As also discussed in further detail below, output circuit 3407 may include circuits such as an AAC (analog to analog converter, such as a current to voltage converter or a logarithmic converter), APC (analog to pulse(s) converter or analog to time modulated pulse converter), or any other type of converter. Output circuit 3407 may implement an activation function such as ReLU or sigmoid. Output circuit 3407 may implement one or more of statistic normalization, regularization, up/down scaling/gain functions, statistical rounding, or arithmetic functions (e.g., add, subtract, divide, multiply, shift, log) for neuron outputs. Output circuit 3407 may implement a temperature compensation function for neuron outputs or array outputs (such as bitline output) so as to keep power consumption of the array approximately constant over temperature or to improve precision of the array (neuron) outputs such as by keeping the IV slope approximately the same over temperature. Output circuit 3407 may include output temperature compensation circuitry for output circuits, such as an ADC circuit, such as by keeping approximately constant a full scale input range for the ADC over different array output current ranges.

Additional detail regarding examples of input circuit 3406 will now be described.

Table No. 8 depicts various types of functions that can be performed by input circuit 3406 in the analog domain:

TABLE NO. 8

| Example Functions Performed By Input Circuit 3406 | | |
|---|---|---|
| Example No. | Signal Received by Input Circuit 3406 | Signal Output by Input Circuit 3406 to VMM Array 3401 |
| 1 | Neuron Current (Scaled or Unscaled) | Analog Voltage (Log or Linear) |
| 2 | Analog Current | Analog Voltage (Log or Linear) |
| 3 | Pulse Signal (Width of Pulse Varies) | Analog Voltage |
| 4 | Pulse Signal (Number of Pulses Varies) | Analog Voltage |
| 5 | Neuron Current (Scaled or Unscaled) | Pulse Signal (Width of Pulse Varies) |
| 6 | Neuron Current (Scaled or Unscaled) | Pulse Signal (Number of Pulses Varies) |
| 7 | Analog Voltage | Pulse Signal (Width of Pulse Varies or Number of Pulses Varies) |

Figure 35A:
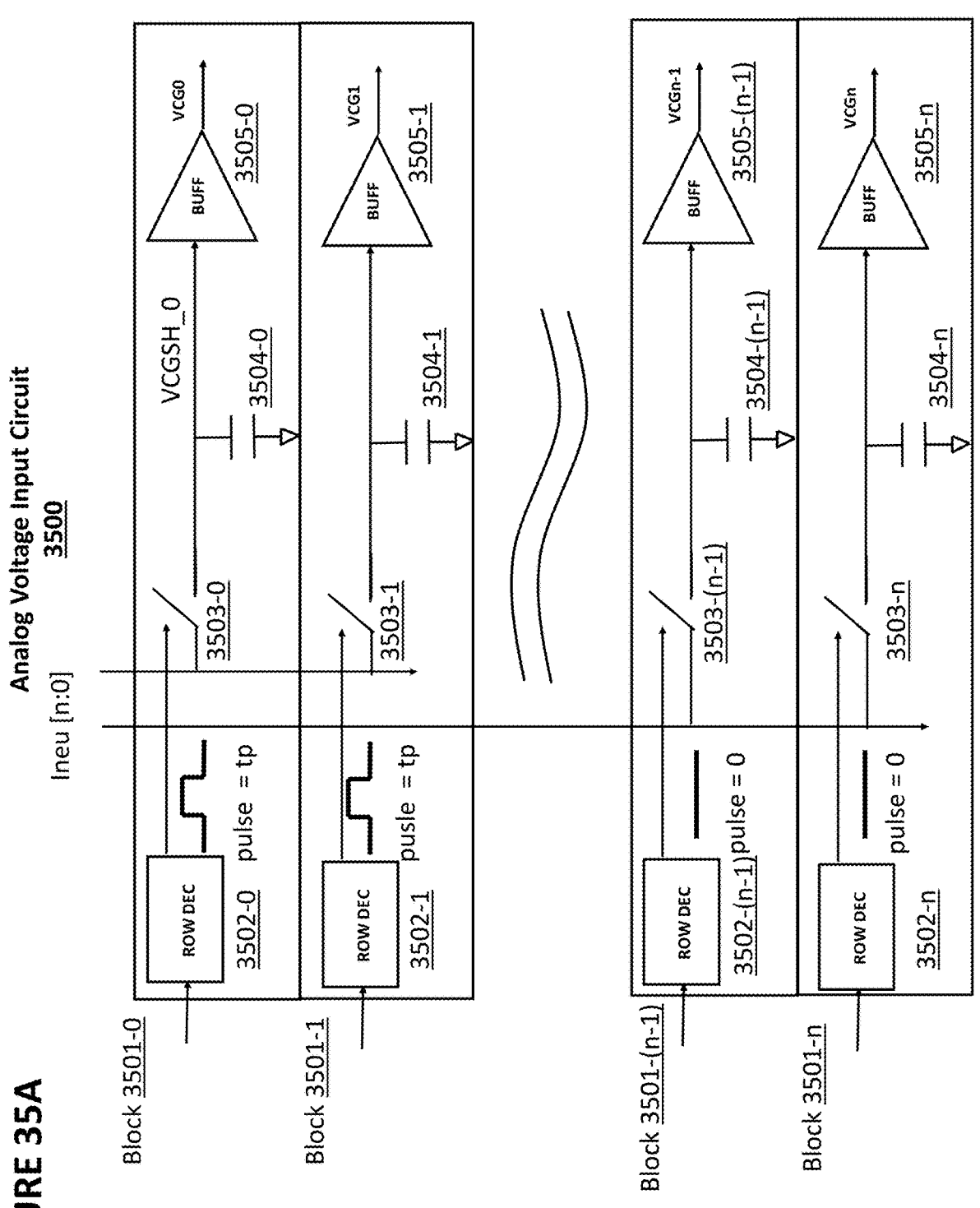
FIGS. 35A, 35B, and 35C depicts analog voltage input circuits.

FIG. 35A depicts analog voltage input circuit 3500, which can be used to perform Example No. 1 in Table No. 8 (Neuron Current to Analog Voltage). Input circuit 3500 receives scaled or unscaled n neuron input currents, Ineu [n:0], and converts the n neuron input currents into respective analog voltages in a linear fashion. Input circuit 3500 comprises blocks 3501-0, 3501-1, . . . , 3501(n−1), 3501-n, where each block is coupled to one of the n+1 rows in a VMM array (such as VMM array 3401 in FIG. 34). Block 3501-0 comprises row decoder 3502-0, switch 3503-0, capacitor 3504-0, and buffer 3505-0. Row decoders 3502-0 to 3502-n receive respective row addresses, and the respective output is asserted when the received row addresses are the addresses for corresponding rows. For example, an individual row, such as row 0, might be asserted, or a plurality of rows, such as row 0 to row 512, might be asserted. Referring to block 3501-0, as an example, the asserted output signal of the respective row decoder 3052-0 closes switch 3503-0 for a predetermined amount of time, tp, in response to a pulse received with a pulse width of tp, which switch 3503-0 then passes the current Ineu [n:0] and charges one terminal of capacitor 3504-0 to generate a voltage which is effectively a sampled and hold voltage, VCGSH_0 of current Ineu_0, which is provided to buffer 3505-0, which is a voltage buffer and maintains the voltage VCG0 at its output even after switch 3503-0 is opened after the predetermined amount of time. The other terminal of capacitor 3504-0 is connected to a common potential, such as ground. Thus, row decoder 3052-0 enables application of current Ineu[n:0] to capacitor 3504 for the predetermined amount of time, tp. Block 3501-0 performs a sample-and-hold function. The voltage VCG0 is then applied to the control gate line of row0 in the VMM array. Each block 3501-1, . . . , 3501($n$–1), 3501-n contains identical components as block 3501-0 and operates in the same manner. In the example shown, switch 3503-1 also receives a pulse of pulse width tp, while switches 3503-($n$–1) and 3503-n do not receive pulses.

Figure 35B:
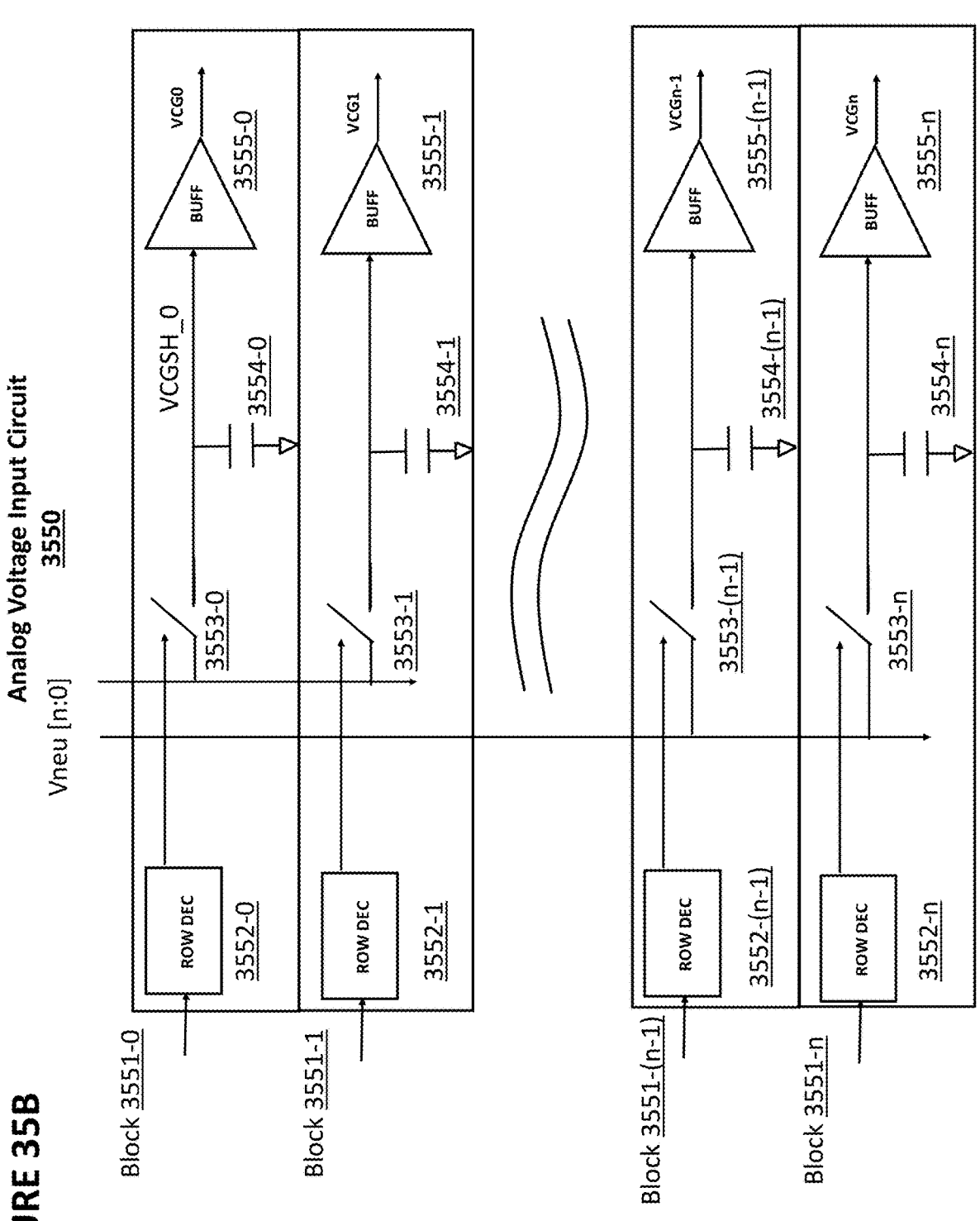

FIG. 35B depicts analog voltage input circuit 3550, which can be used to perform Example No. 2 in Table No. 8 (Analog Current to Analog Voltage). Input circuit 3550 receives a neuron input voltage, Vneu [n:0], and converts it into an analog voltage in a linear fashion. Input circuit 3550 comprises blocks 3551-0, 3551-1, . . . , 3551($n$–1), 3551-n, where each block is coupled to a respective one of the n+1 rows in a VMM array (such as VMM array 3401 in FIG. 34). Block 3551-0 comprises row decoder 3552-0, switch 3553-0, capacitor 3554-0, and buffer 3555-0. Row decoders 3552-0 to 3552-$n$ receive row addresses, and the output(s) is asserted when the row addresses are the addresses for corresponding rows. For example, an individual row, such as row 0, might be asserted, or a plurality of rows, such as row 0 to row 512, might be asserted. The asserted output signal closes switch 3553-0 for a predetermined amount of time, tp (in response to a pulse received of width tp, not shown) which then passes the voltage Vneu_0 and charges one terminal of capacitor 3554-0 to a voltage which is effectively a sampled and hold voltage, VCGSH_0, which is provided to buffer 3555-0, which acts as a voltage buffer and maintains the voltage VCG0 at its output even after switch 3553-0 is opened after the predetermined amount of time. The other terminal of capacitor 3554-0 is connected to a common potential, such as ground. Thus, row decoder 3552-0 enables application of Vneu_0 to capacitor 3554. Thus, block 3551-0 performs a sample-and-hold function. The voltage VCG0 is then applied to the control gate line of row 0 in the VMM array. Each block 3551-1, . . . , 3551($n$–1), 3551-$n$ contains identical components as block 3551-0 and operates in the same manner.

Figure 35C:
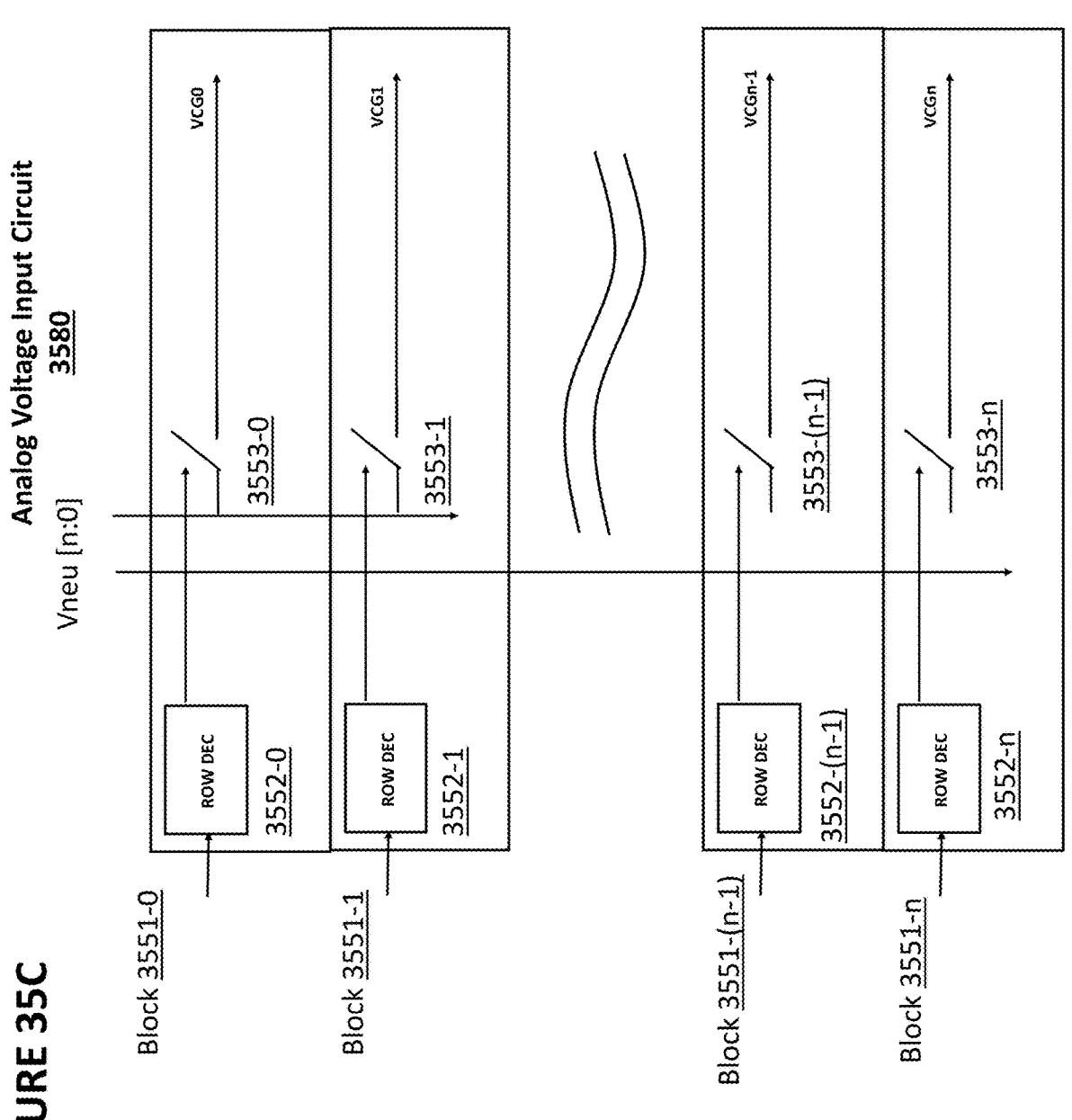

FIG. 35C depicts analog voltage input circuit 3580, which can be used to perform Example No. 2 in Table No. 8 (Analog Current to Analog Voltage). In this figure, the input neuron voltages are enabled directly (passed through) by row decoder 3551-0, 3552-1, . . . , 3552-($n$–1), 3552-n with appropriate addresses and applied by switches 3552-0, 3552-1, . . . , 3552-($n$–1), 3552-$n$ to the VCG0 voltages of the corresponding rows. The VCG0 are applied the control gates of the VMM array.

Figure 36:
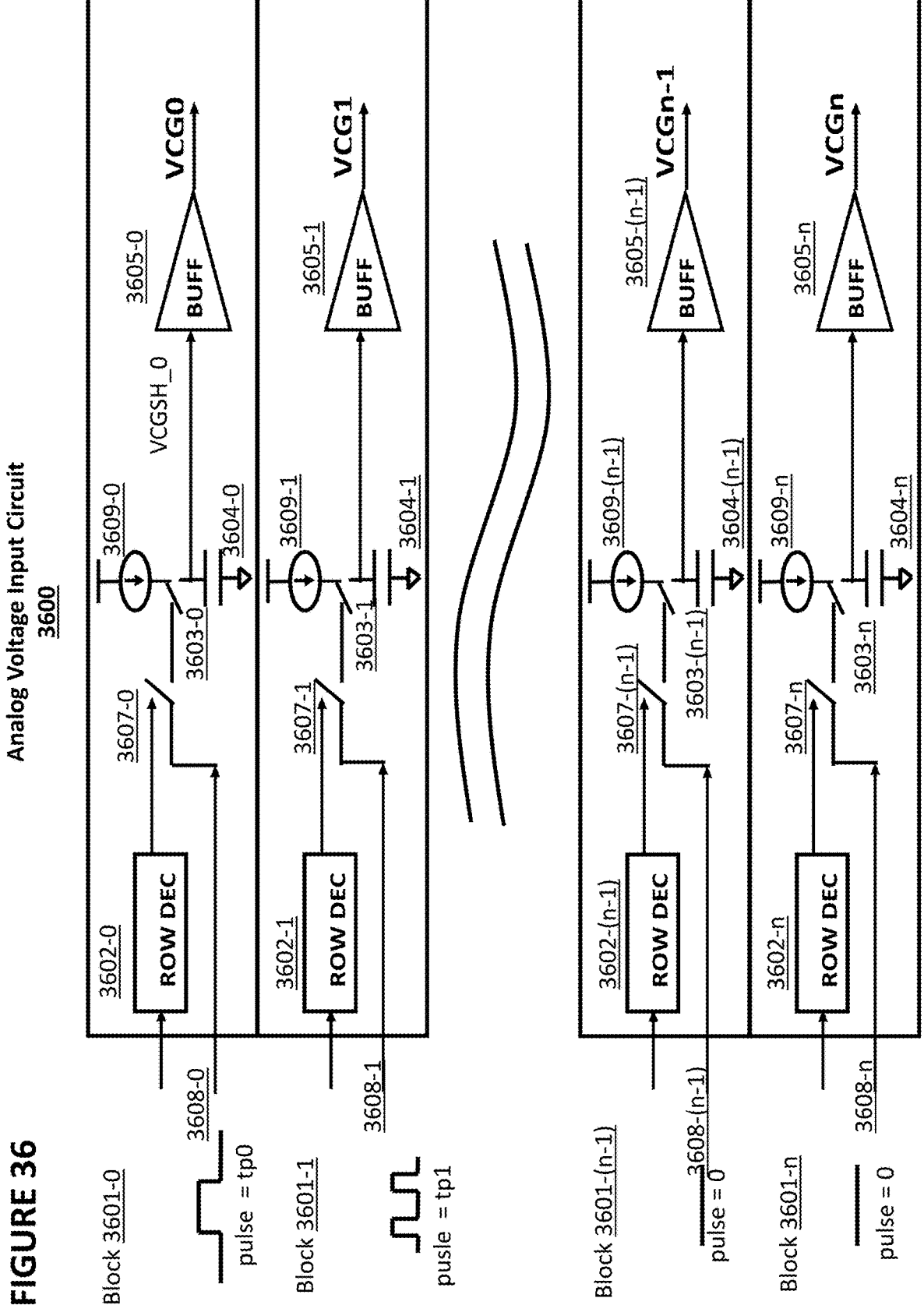
FIG. 36 depicts an analog voltage input circuit.

FIG. 36 depicts analog voltage input circuit 3600, which can be used to perform Example Nos. 3 and 4 in Table No.

8 in input circuit 3406 to convert an input comprising one or more pulses, into a voltage in a linear fashion. Input circuit 3600 comprises blocks 3601-0, 3601-1, . . . , 3601($n$–1), 3601-$n$, where each respective block is coupled to one of the n+1 rows in a VMM array (such as VMM array 3401 in FIG. 34). Block 3601-0 comprises row decoder 3602-0, switch 3603-0, capacitor 3604-0, switch 3607-0, input signal 3608-0, current source 3609-0, and buffer 3605-0. Row decoder 3602-0 receives row addresses, and the output is asserted when the row address is the address for corresponding row. For example, an individual row, such as row 0, might be asserted, or a plurality of rows, such as row 0 to row 512, might be asserted. The asserted output signal of row decoder 3602-0 closes switch 3607-0, which enables the input signal 3608-0, which is a pulse with a pulse width tp0, representing a time, to be passed through to close switch 3603-0 for the time of the pulse width tp0, which closed switch 3603-0 passes current from a respective current source 3609-0 to generate a pulsed current, which charges one terminal of capacitor 3604-0 to generate a voltage, VCGSH_0, which is provided to buffer 3605-0, which acts as a voltage buffer and maintains the voltage VCO0 at its output even after switch 3603-0 is open at the end of pulse width tp0. The other terminal of capacitor 3604-0 is connected to a common potential, such as ground. Each pulse input 3608-0 can be a single pulse whose pulse width, tp, can vary, as illustrated by tp0 for row 0, or one or more pulses of non-varying width but varying in the number of pulses, as illustrated by two pulses of constant width tp1 for row1. Here, the variability in the pulse width or the number of pulses reflects the activation value to be applied to a particular row. For example, an activation value might vary from 0 to 256 for an 8-bit activation value. Thus, block 3601-0 converts a pulsed input signal into a sampled and held voltage VCG0. The voltage VCG0 is then applied to the control gate line of row 0 in the VMM array. Each block 3601-1, . . . , 3601($n$–1), 3601-n contains identical components as block 3601-0 and operates in the same manner.

Figure 37:
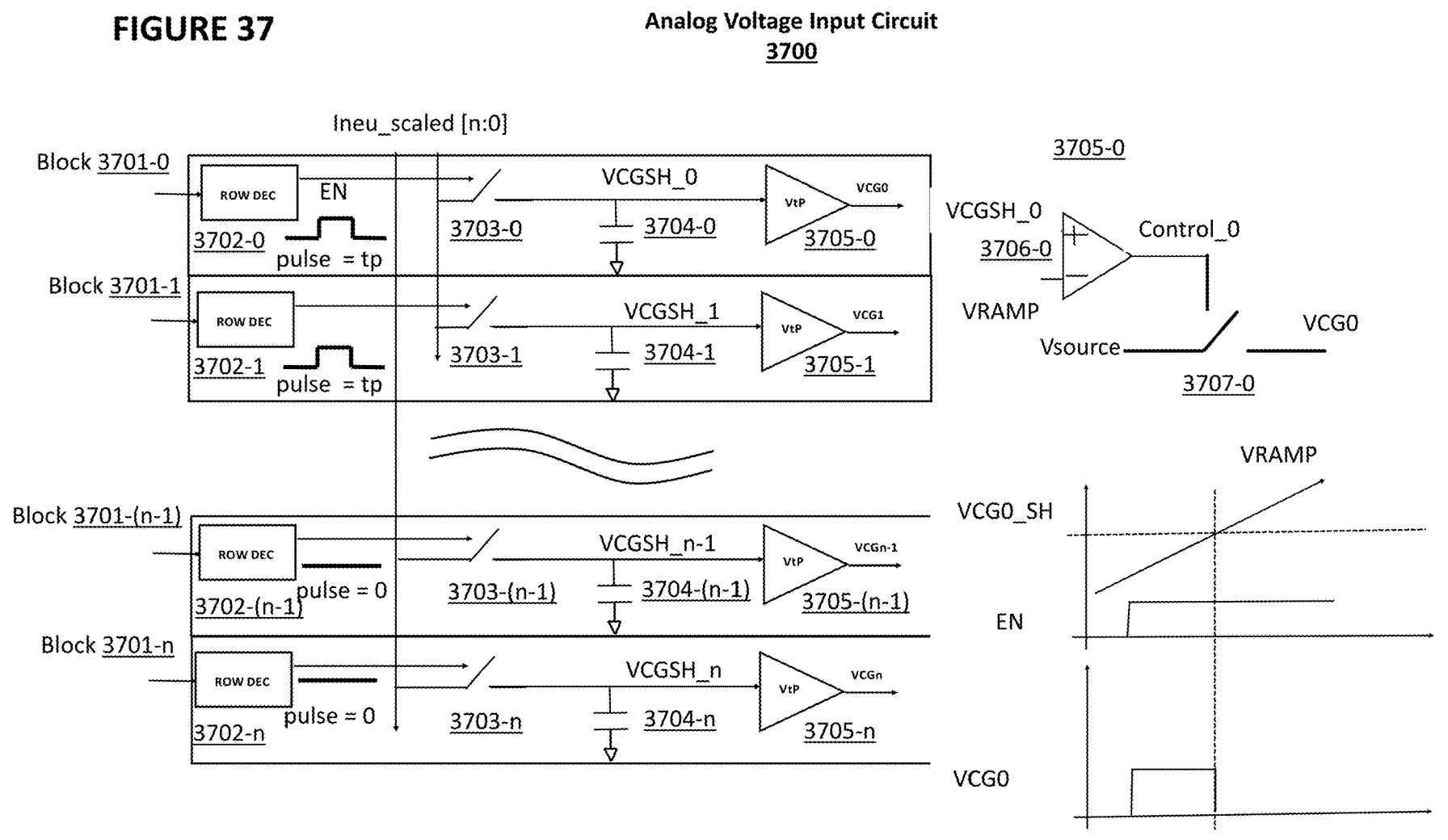

FIG. 37 depicts analog voltage input circuit 3700, which can be used to perform Example No. 5 in Table No. 8 in input circuit 3406 to convert a scaled neuron input current, Ineu_scaled, into a pulse signal, where the width of the pulse signal is proportional to the magnitude of Ineu_scaled. Input circuit 3700 comprises blocks 3701-0, 3701-1, . . . , 3701($n$–1), 3701-$n$, where the respective block is coupled to a respective one of the n+1 rows in a VMM array (such as VMM array 3401 in FIG. 34). Block 3701-0 comprises row decoder 3702-0, switch 3703-0, capacitor 3704-0, and voltage-to-pulse (VtP) converter 3705-0. Row decoder 3702-0 receives a row address, and the output of row decoder 3702-0, EN, is asserted for a predetermined amount of time, tp, to generate a pulse of pulse width tp, when the row address is the address for row 0. The asserted output signal closes switch 3703-0, which when closed passes the signal Ineu_scaled to charge one terminal of capacitor 3704-0 during the pulse width tp to generate a voltage, VCGSH_0, which is provided to voltage-to-pulse converter 3705-0. The other terminal of capacitor 3704-0 is connected to a common potential, such as ground. Voltage-to-pulse converter 3705-0 comprises comparator 3706-0, that compares the generated voltage, VCGSH_0 against a reference voltage VRAMP that ramps upward as shown in the graph. The output of the comparator, Control_0, is high when VCGSH_0>VRAMP, and which Control_0 when high closes switch 3707-0 to generate the voltage VCG0, which is equal to the voltage Vsource, for example 1.5V. When VCGSH_0<VRAMP, Control_0 will switch to low, which opens switch 3707-0, causing VCG0 to go low, effectively ending the pulse. Thus, block 3701-0 converts an input current, Ineu_scaled, into a pulse, VCG0, of constant voltage, where the width of the pulse is proportional to the magnitude of the input current. The pulse VCG0 is then applied to the control gate line of row 0 in the VMM array. Each block 3701-1, . . . , 3701(n−1), 3701-n contains identical components as block 3701-0 and operates in the same manner.

The VtP block 3705-0 can be equally applied to FIG. 35A/35B/35C to convert the sampled and hold voltage into a pulse to be applied to VMM array to perform Example No. 7 in Table No. 8.

Additional detail regarding examples of output circuit 3407 in FIG. 34 will now be described.

Table No. 9 depicts various types of functions that can be performed by output circuit 3407 in the analog domain:

TABLE NO. 9

| Example No. | Signal Received by Output Circuit 3407 | Signal Output by Output Circuit 3407 |
|---|---|---|
| | Example Functions Performed By Output Circuit 3407 | |
| 1 | Neuron Current (Unscaled) | Neuron Current (Scaled) |
| 2 | Neuron Current (Unscaled) | Analog Voltage (Log or Linear) |
| 3 | Neuron Current (Unscaled) | Pulse Signal (Width of Pulse Varies) |
| 4 | Neuron Current (Unscaled) | Pulse Signal (Number of Pulses Varies) |

FIG. 38 depicts WM system 3800 comprising WM array 3401 and output circuit 3407, where output circuit 3407 comprises Ineuron Scaler 3801 to perform Example No. 1 in Table No. 9. Ineuron Scaler 3801 receives outputs from WM array 3401 in the form of neuron current, Ineu. Ineuron Scaler 3801 converts the neuron current, Ineu, into a scaled neuron current, Ineu_scaled. Ineuron Scaler 3801, for example, can use a current mirror ratio circuit to scale the current.

FIG. 39 depicts WM system 3900 comprising WM array 3401 and output circuit 3407, where output circuit 3407 comprises Ineuron Scaler 3801 and current-to-voltage converter (ItV) 3901 to perform Example No. 2 in Table No. 9. Ineuron Scaler 3801 receives outputs from WM array 3401 in the form of neuron current, Ineu. Ineuron Scaler 3801 converts the neuron current, Ineu, into a scaled neuron current, Ineu_scaled. Current-to-voltage converter 3901 receives the scaled neuron current, Ineu_scaled, and converts the current into a voltage, Vout, according to a linear function or a logarithmic function.

Figures 40, 41:
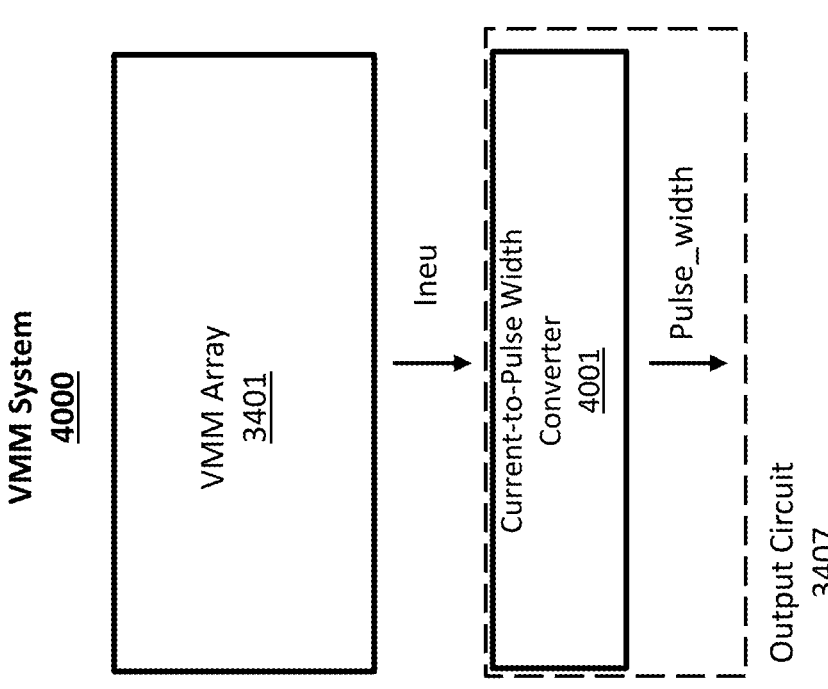
FIG. 40 depicts another example of a VMM system.
FIG. 41 depicts another example of a VMM system.

FIG. 40 depicts WM system 4000 comprising WM array 3401 and output circuit 3407, where output circuit 3407 comprises current-to-pulse width (ItPW) converter 4001 to perform Example No. 3 in Table No. 9. Current-to-pulse width converter 4001 receives outputs from columns of WM array 3401 in the form of neuron current, Ineu.

Current-to-pulse width converter 4001 converts the neuron current, Ineu, into the signal Pulse_width, which is a signal containing a single pulse whose width is proportional to the magnitude of Ineu.

FIG. 41 depicts VMM system 4100 comprising VMM array 3401 and output circuit 3407, where output circuit 3407 comprises current-to-pulse count (ItPC) converter 4101 to perform Example No. 4 in Table No. 9. Current-to-pulse count converter 4101 receives outputs from columns of VMM array 3401 in the form of neuron current, Ineu. Current-to-pulse count converter 4101 converts the neuron current, Ineu, into the signal Pulse_count, which is a signal containing one or more pulses of uniform width where the number of pulses is proportional to the magnitude of Ineu.

FIGS. 42A, 42B, 43, and 44 depict VMM systems 4200, 4250, 4300, and 4400, respectively, which are similar to the VMM systems of FIGS. 39-41 except that activation circuit 4201 is added to output circuit 3407. Activation circuit 4201 performs activation functions such as ReLU, sigmoid, or tanh, without limitation.

Figures 42A, 42B:
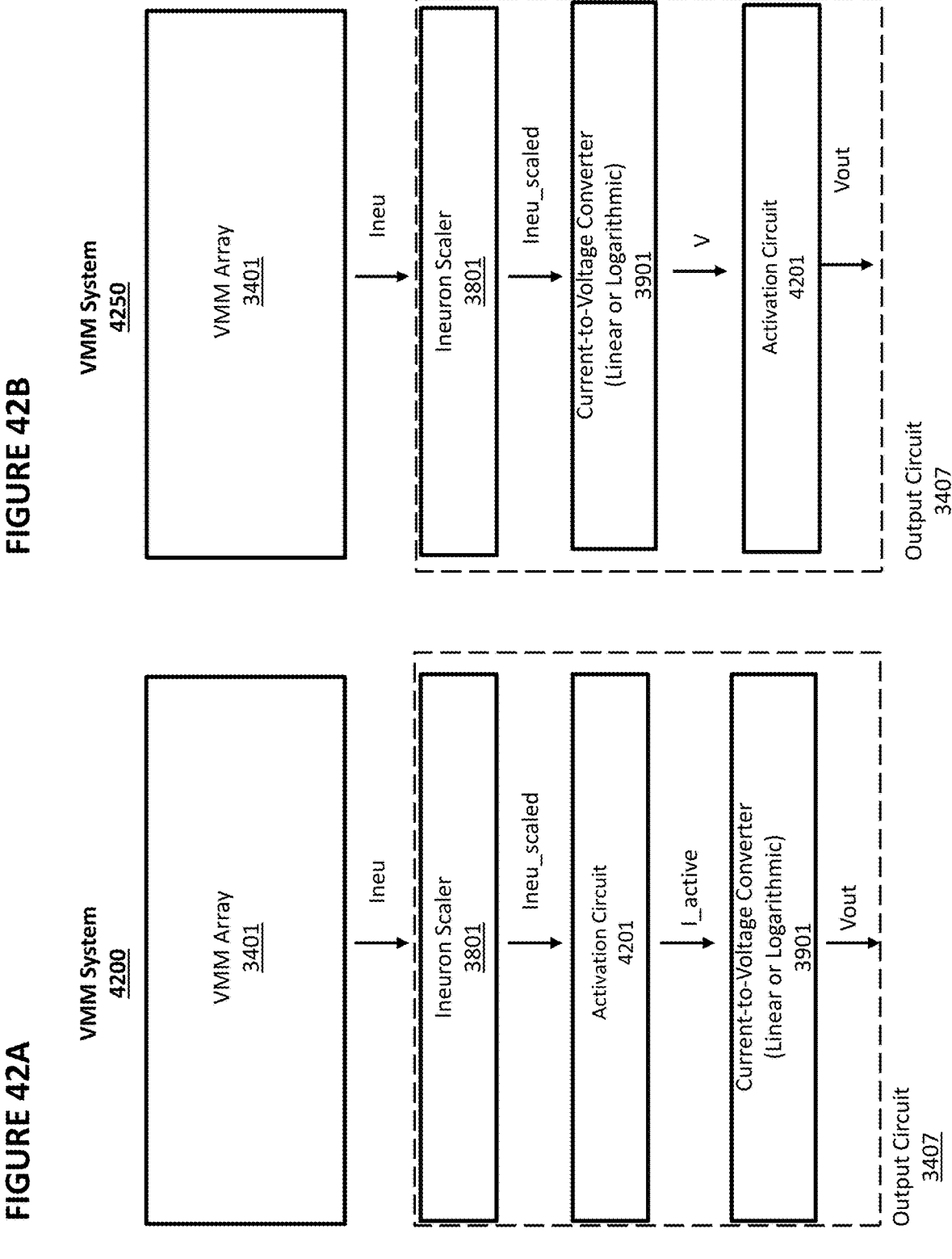
FIGS. 42A and 42B depict examples of a VMM system.

In FIG. 42A, output circuit 3407 comprises Ineuron Scaler 3801, activation circuit 4201, and current-to-voltage converter 3901. Ineuron Scaler 3801 receives outputs from VMM array 3401 in the form of neuron current, Ineu. Ineuron Scaler 3801 converts the neuron current, Ineu, into a scaled neuron current, Ineu_scaled. Activation circuit 4201 receives scaled neuron current, Ineu_scaled, and performs a function on it to generate I_active. Current-to-voltage converter 3901 receives I_active and converts the current into a voltage, Vout, according to a linear function or a logarithmic function.

Alternately the activation can be placed after the current to voltage converter as shown in FIG. 42B.

Figure 43:
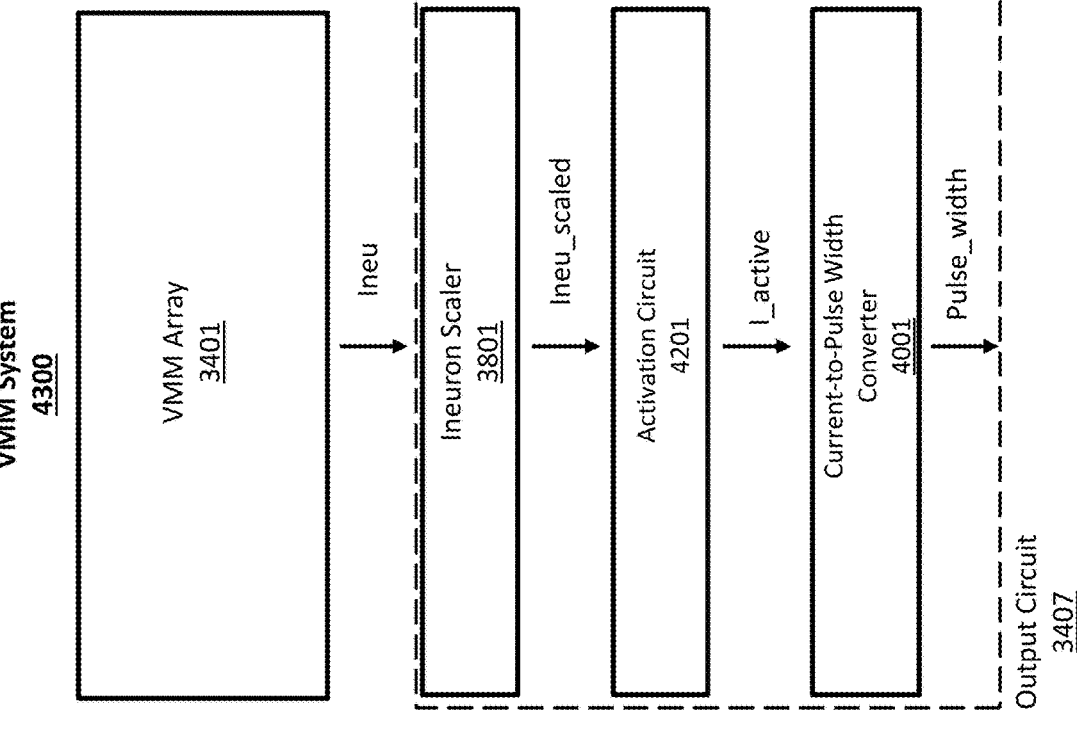
FIG. 43 depicts another example of a VMM system.

In FIG. 43, output circuit 3407 comprises Ineuron Scaler 3801, activation circuit 4201, and current-to-pulse width converter 4001. Ineuron Scaler 3801 receives outputs from VMM array 3401 in the form of neuron current, Ineu. Ineuron Scaler 3801 converts the neuron current, Ineu, into a scaled neuron current, Ineu_scaled. Activation circuit 4201 receives scaled neuron current, Ineu_scaled, and performs a function on it to generate I_active. Current-to-pulse width converter 4001 converts I_active into the signal Pulse_width, which is a signal containing a single pulse whose width is proportional to the magnitude of I_active.

Figure 44:
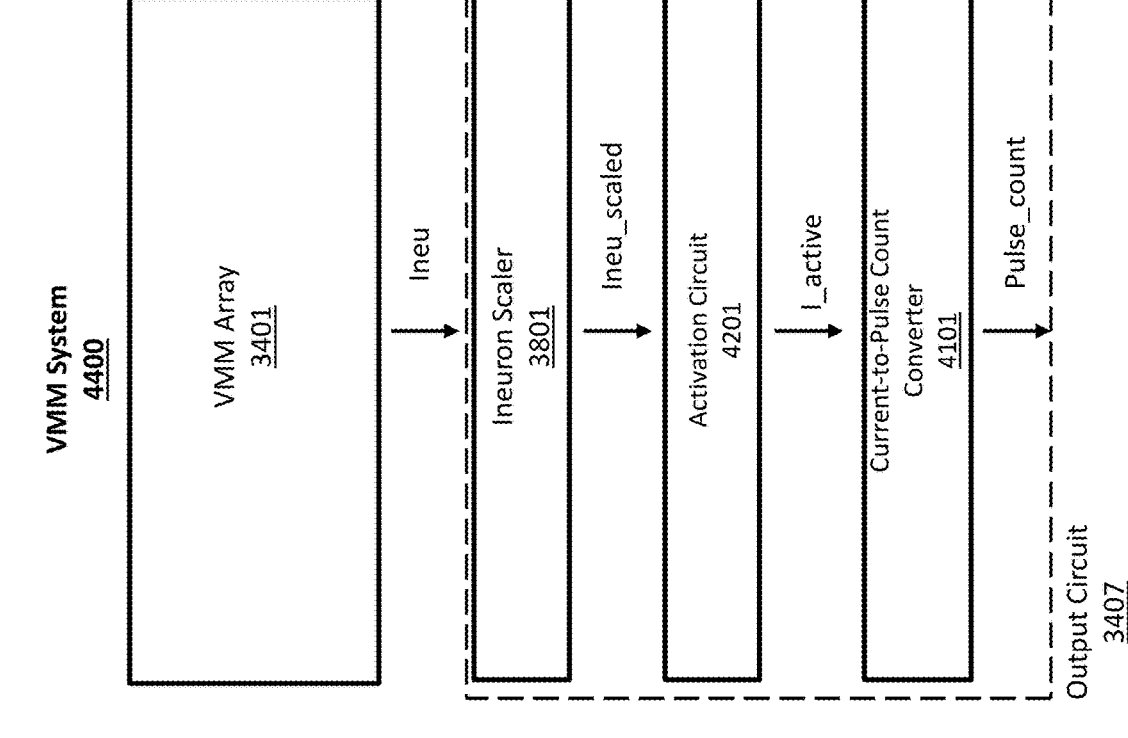
FIG. 44 depicts another example of a VMM system.

In FIG. 44, output circuit 3407 comprises Ineuron Scaler 3801, activation circuit 4201, and current-to-pulse count converter 4101. Ineuron Scaler 3801 receives outputs from VMM array 3401 in the form of neuron current, Ineu. Ineuron Scaler 3801 converts the neuron current, Ineu, into a scaled neuron current, Ineu_scaled. Activation circuit 4201 receives scaled neuron current, Ineu_scaled, and performs a function on it to generate I_active. Current-to-pulse count converter 4101 converts I_active into the signal Pulse-_count, which is a signal containing one or more pulses of uniform width where the number of pulses is proportional to the magnitude of I_active.

FIGS. 45 to 51 depict example circuits to implement the functions of output circuit 3407 discussed in FIGS. 38-44.

Figure 45A:
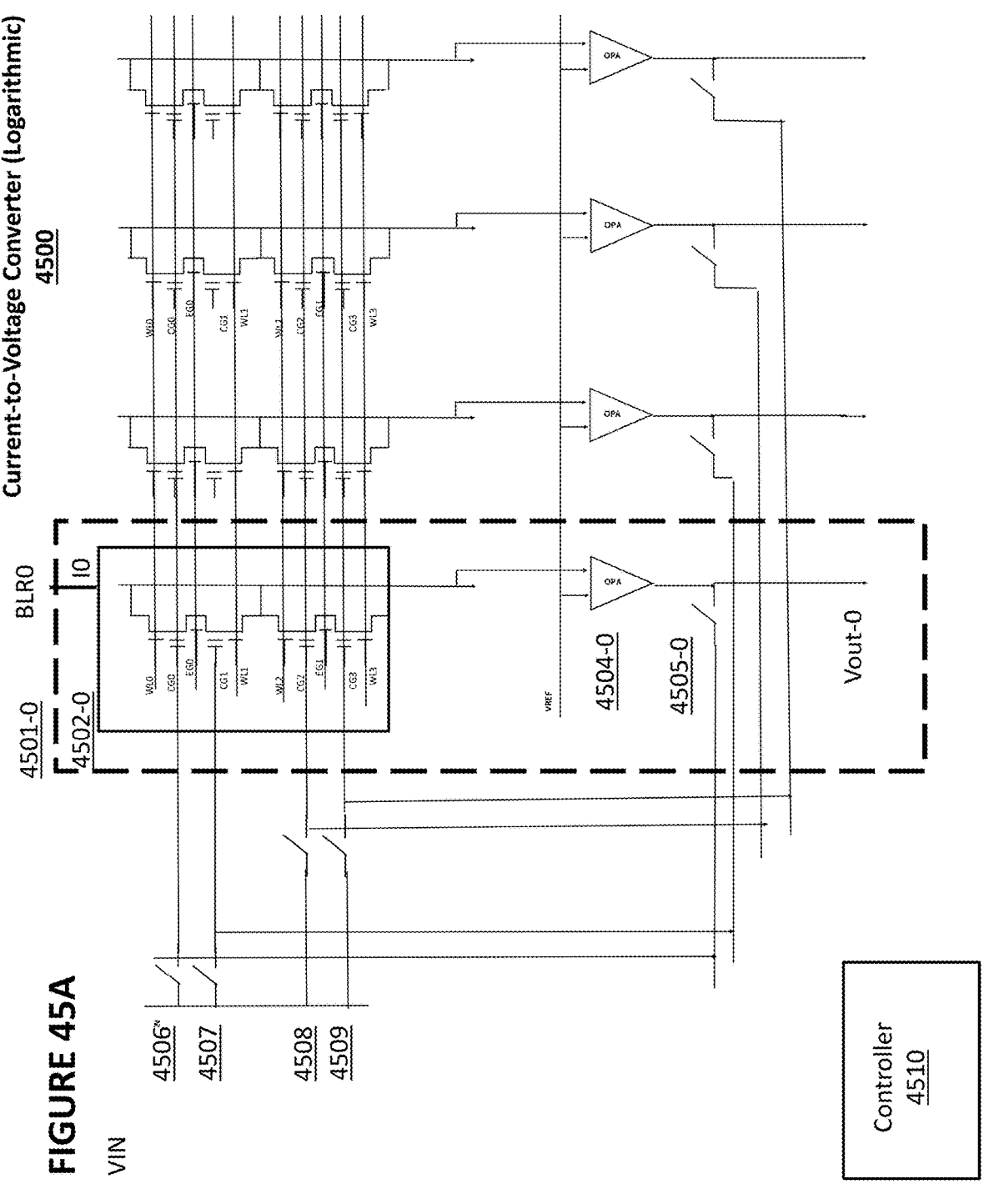
FIG. 45A depicts an example current-to-voltage converter.

FIG. 45A depicts current-to-voltage converter 4500, which can be used for current-to-voltage converter (logarithmic) 3901. Current-to-voltage converter 4500 comprises example block 4501 coupled to bit line BLR0 and identical blocks for the other bit lines. Current-to-voltage converter 4500 also comprises switches 4506, 4507, 4508, and 4509 and controller 4510. Block 4501-0 comprises reference cells 4502-0, op amp (operational amplifier) 4504-0, and switch 4505-0. Controller 4510 controls the operation of switch 4505-0 and switches 4506, 4507, 4508, and 4509.

During operation of current-to-voltage converter, controller 4510 closes switch 4505-0 and opens switches 4506, 4507, 4508, and 4509. Block 4501-0 receives input current I0 on bit line BLR0, where the input current I0 can be a current from VMM array 3401, which is the contribution to Ineu from column 0 in the array. Op amp 4504-0 will force the voltage of its inputs to be equal through the feedback from the output of op amp 4504-0 to the control gates of reference cells 4502-0, which forces a constant voltage VREF onto the bitline BLR0. The current of reference cells 4502-0 will be adjusted by its control gate (output of the op amp 4504-0) such that the current equals to the input current I0. The output of op amp 4504-0, which is same as the control gate voltage of reference cells 4502-0, Vout-0, is a voltage signal that is a logarithmic function of the input current, I0, received on BLR0 for the reference cells working in sub threshold region. For a cell operating in the sub threshold region, VCG is a logarithmic function of cell current Icell. A block identical to block 4501-0 is coupled to respective array outputs from VMM array 3401.

Figure 45B:
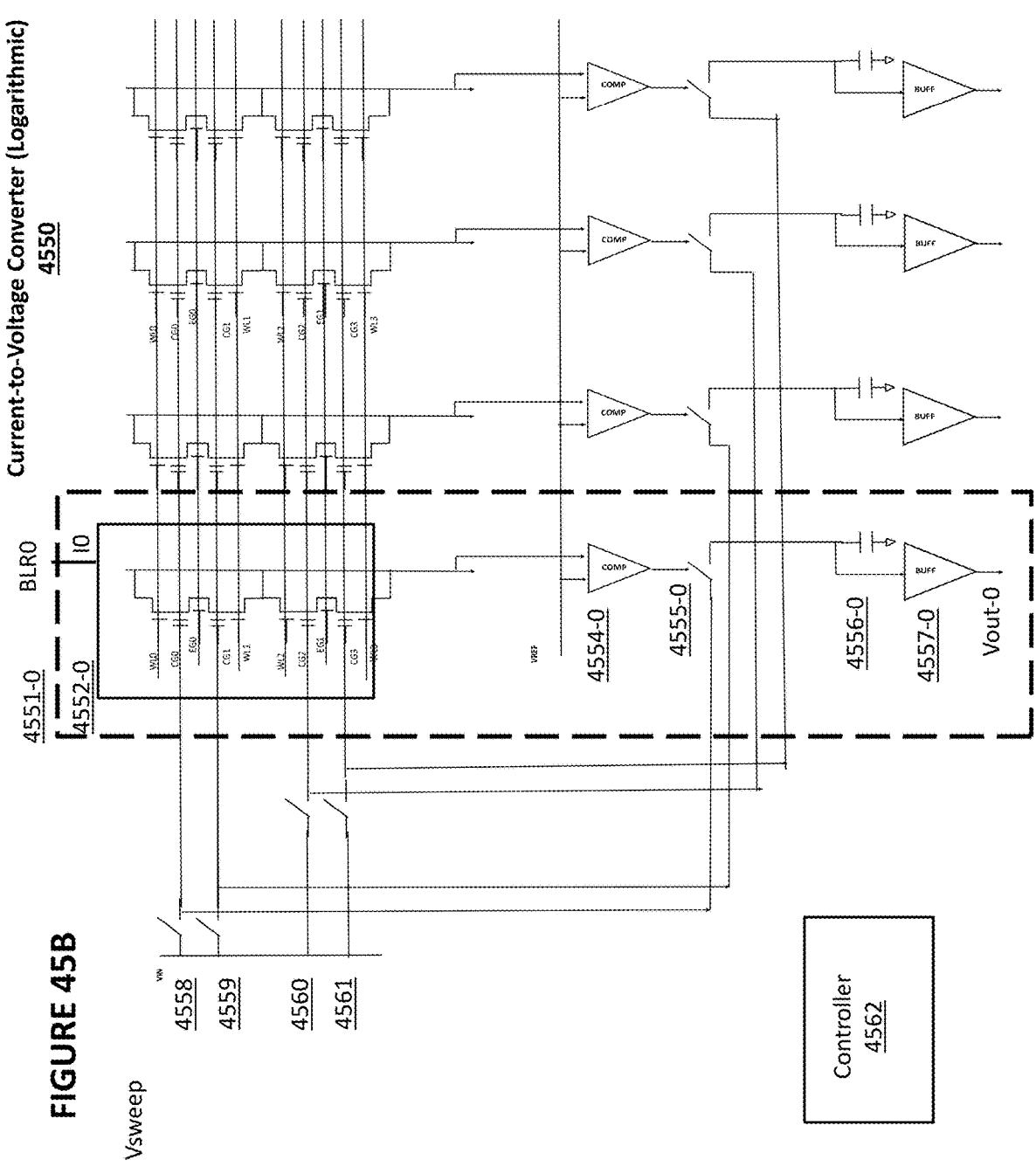
FIG. 45B depicts another example current-to-voltage converter.

FIG. 45B depicts current-to-voltage converter 4550, which can be used for current-to-voltage converter (logarithmic) 3901. Current-to-voltage converter 4550 comprises example block 4551 coupled to bit line BLR0 and identical blocks for the other bit lines. Current-to-voltage converter 4550 also comprises switches 4558, 4559, 4560, and 4561 and controller 4562. Block 4551-0 comprises reference cells 4552-0, op amp (operational amplifier) 4554-0, switch 4555-0, capacitor 4556-0, and buffer 4557-0. Controller 4562 controls 4558, 4559, 4560, and 4561.

During operation, block 4551-0 receives current TO, which is an inverted version of current from bit line BLR0 from an output of VMM array 3401. The bitline current is inverted so that the current flows from Vdd (high supply) to low (into this circuit). Optionally, the current can be scaled prior to being provided to this circuit.

The (array output) current is provided to reference cells 4552-0, which when the respective switch is closed, also receive the voltage Vsweep on their control gate terminals. Vsweep is a varying voltage (such as a ramp signal) that charges up capacitor 4556-0 during the sweeping operation when switch 4550-0 is closed. When the output of comparator 4554-0 changes due to the change in Vsweep, switch 4555-0 opens, which causes Vsweep to be sampled to capacitor 4556-0 so that that voltage of Vsweep at that instant can be held on the capacitor 4556-0, where the held voltage represents the output voltage that causes the reference cells to conduct the same current as the array. That voltage is provided to buffer 4557-0 and is output as voltage Vout-0. Vout-0 is a voltage signal that is a logarithmic function of the current, I0, received on BL0, which is due to the cell operating in the sub-threshold region, i.e., VCG is a log (Icell) function. A block identical to block 4551-0 is coupled to an array current output of VMM array 3401.

Figures 46A, 46B:
FIG. 46A depicts another example current-to-voltage converter.
FIG. 46B depicts another example current-to-voltage converter.

FIG. 46A depicts current-to-voltage converter 4600, which can be used for current-to-voltage converter (logarithmic) 3901. Current-to-voltage converter 4600 comprises reference memory cell 4601, switch 4602, op amp 4603, and controller 4604, arranged as shown. Reference memory cell 4601 receives a current, BLR, from a bit line in a VMM array, which is the contribution to Ineuron for that particular column in the VMM array. Op amp 4603 outputs a voltage VNEUOUT, and switch 4602 is closed by controller 4604 and applies that voltage to the control gate terminal of reference memory cell 4601. This feedback loop will cause VNEUOUT to move to a value that causes the voltage applied to the inverting terminal of op amp 4603 to equal the voltage, VREF, applied to the non-inverting terminal of op amp 4603. In this manner, current-to-voltage converter 4600 converts the received current, BLR, into a voltage, VNEU-OUT, according to a logarithmic function for the cells in sub threshold region and to a linear function for the cells in linear region.

FIG. 46B depicts current-to-voltage converter 4550, which can be used for current-to-voltage converter (logarithmic) 3901 in FIG. 39. Current-to-voltage converter 4650 comprises reference memory cell 4651, switch 4652, comparator 4653, switch 4654, capacitor 4655, buffer 4656, and controller 4657, arranged as shown. Reference memory cell 4650 receives a current, IBL, from a bit line in a VMM array, which is the contribution to Ineuron for that particular column in the VMM array. Op amp 4653 outputs a voltage COMPOUT, and switches 4654 and 4652 are closed by controller 4657 and apply that voltage to the control gate terminal of reference memory cell 4651. This feedback loop will cause COMPOUT to move to a value that causes the voltage applied to the inverting terminal of op amp 4653 to equal the voltage, VREF, applied to the non-inverting terminal of op amp 4653. The voltage of capacitor 4655 also will be COMPOUT, and it will hold that voltage. That voltage is input to buffer 4656 and output as VNEUOUT. In this manner, current-to-voltage converter 4650 converts the received current, IBL, into a voltage, VNEUOUT, according to a logarithmic function.

Figure 47:
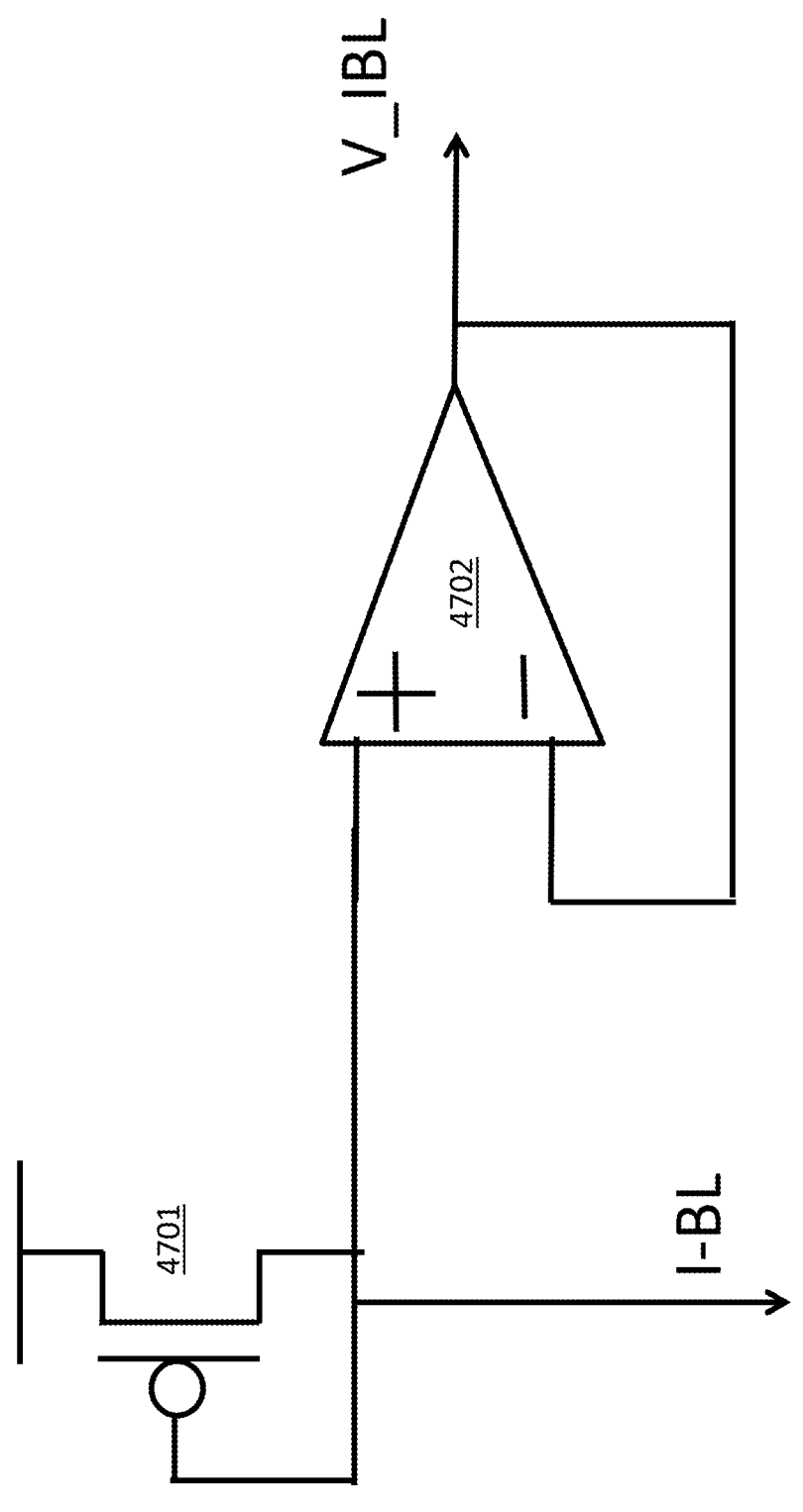
FIG. 47 depicts another example current-to-voltage converter.
Figure 48:
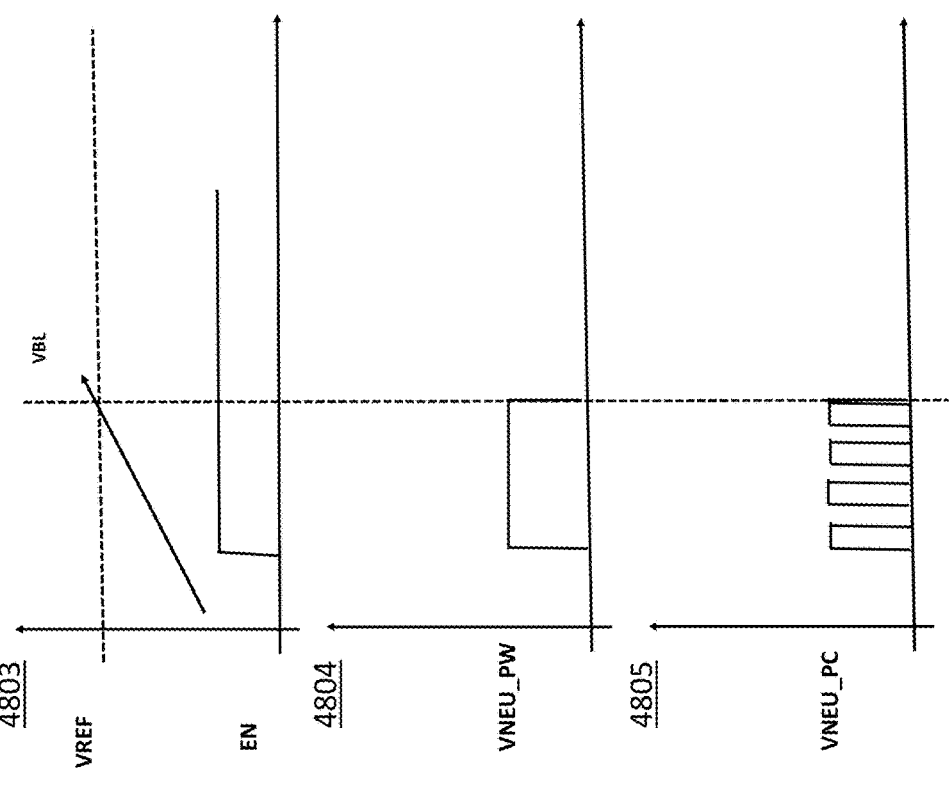
FIG. 48 depicts an example current-to-pulse converter.

FIG. 47 depicts current-to-voltage converter 4700, which can be used for current-to-voltage converter 3901 to convert current into voltage in a linear fashion. Specifically, current-to-voltage converter 3901 comprises an instance of current-to-voltage converter 4700 for each bit line output in VMM array 3401. Current-to-voltage converter 4700 comprises PMOS transistor 4701 and operational amplifier 4702, arranged as shown. One terminal of PMOS transistor 4701 is attached to a voltage source. Another terminal of PMOS transistor 4701 is attached to the gate of PMOS transistor 4701 and coupled to a bit line in VMM array 401 and to the non-inverting terminal of operational amplifier 4702. The inverting terminal of operational amplifier 4702 is connected to the output of operational amplifier 4702. The current drawn by the bit line, I-BL, results in a voltage, V_IBL, output from operational amplifier 4702. Operational amplifier 4702 acts as a buffer, and V_IBL will maintain its level, which level reflects the current drawn by the bit line, I-BL, despite any load that it might be attached to. Optionally, current-to-voltage converter 4700 can also be used in a bitline current mirror buffer. In such an example, the voltage V_IBL is fed to a gate of a similar PMOS (not shown), and the current in this PMOS then is a mirrored current of the PMOS 4701. FIG. 48 depicts current-to-pulse converter 4800, which can be used for current-to-pulse width converter 4001 or current-to-pulse count converter 4101 to convert current into one or more pulses. Current-to-pulse converter 4800 receives neuron current, I_BL, and enable signal, EN, and comprises capacitor 4801, comparator 4802, and gate 4806. During operation, capacitor 4801 is charged by I_BL. Initially, the voltage of capacitor 4801 will be lower than VREF, and the output, COMPOUT, will be high. When the voltage of capacitor 4801 exceeds VREF, the output of comparator 4802, COMPOUT, will change from high to low. COMPOUT is input into AND gate 4806 with enable signal, EN, and the output of AND gate 4806 will be a pulse, VNEU_PW, where the width of the pulse is proportional to the magnitude of I_BL. This is illustrated in graphs 4803 and 4804.

Optionally, AND gate 4807 can be used instead of AND gate 4806. AND gate 4807 receives COMPOUT, EN, and a clock signal as inputs, and outputs VNEU_PC. VNEU_PC comprises a series of pulses of having the frequency and phase of CLK, where the pulses begin when COMPOUT and EN are high and the pulses end when COMPOUT or EN go low. This converts a current, I_BL, into a series of uniform pulses, where the number of pulses is proportional to the magnitude of I_BL.

Figure 49:
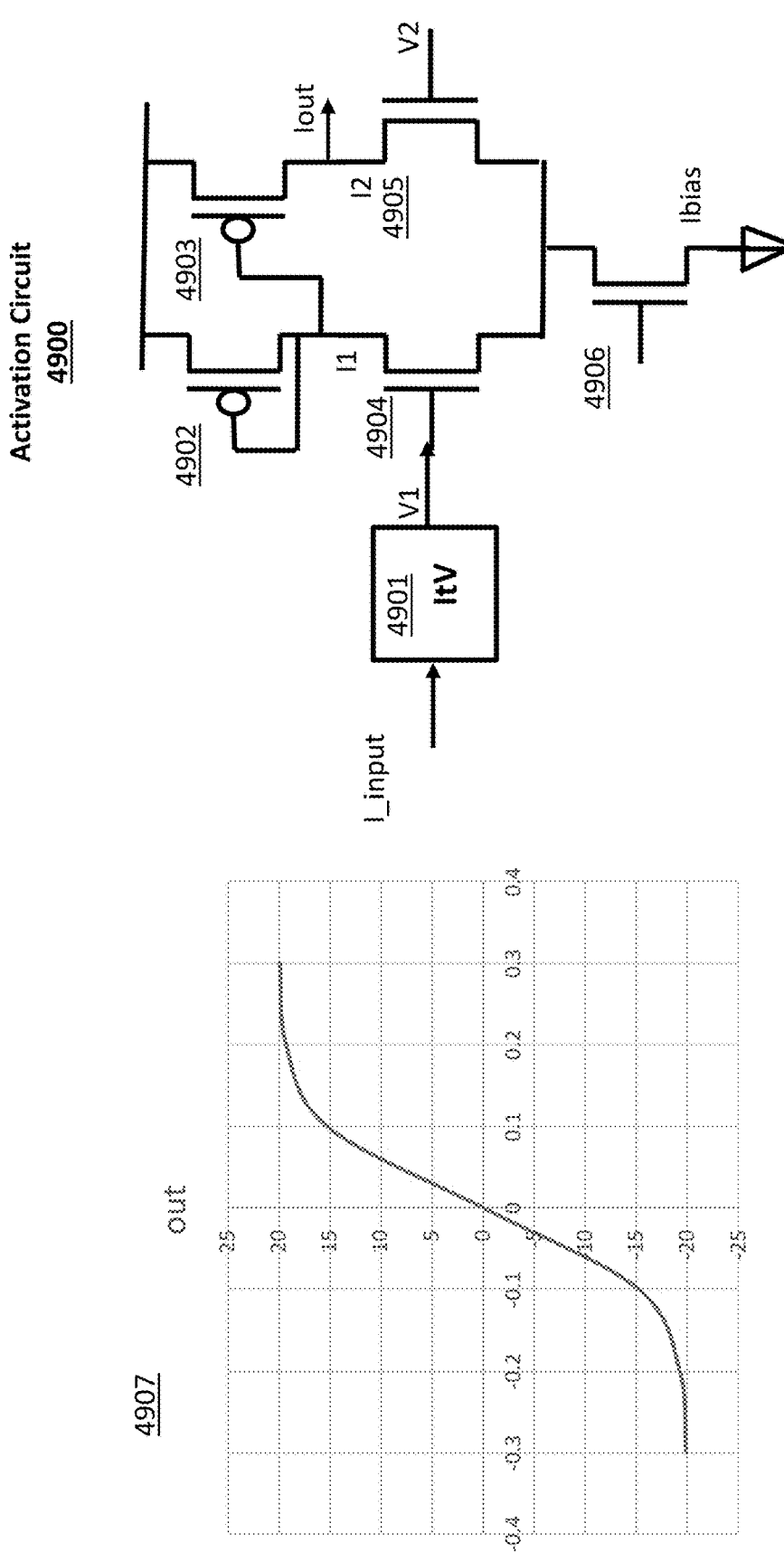
FIG. 49 depicts an example activation circuit.

FIG. 49 depicts activation circuit 4900, which is an example implementation of tanh activation circuit 4201.

Activation circuit 4900 comprises current-to-voltage converter 4901, PMOS transistors 4902 and 4903 (which form a current mirror), NMOS transistors 4904 and 4905, and NMOS transistor 4906, arranged as shown. Activation circuit 4900 receives a current input, I_input, and generates a current output, Tout, according to a Sigmoid function performed using a differential pair, as follows: Tout=I1–I2=Ibias*tanh(K*(V1–V2)/2). Thus, activation circuit 4900 converts I_input to Tout according to a Sigmoid function. Graph 4907 shows I0 as a function of I_input.

Figure 50:
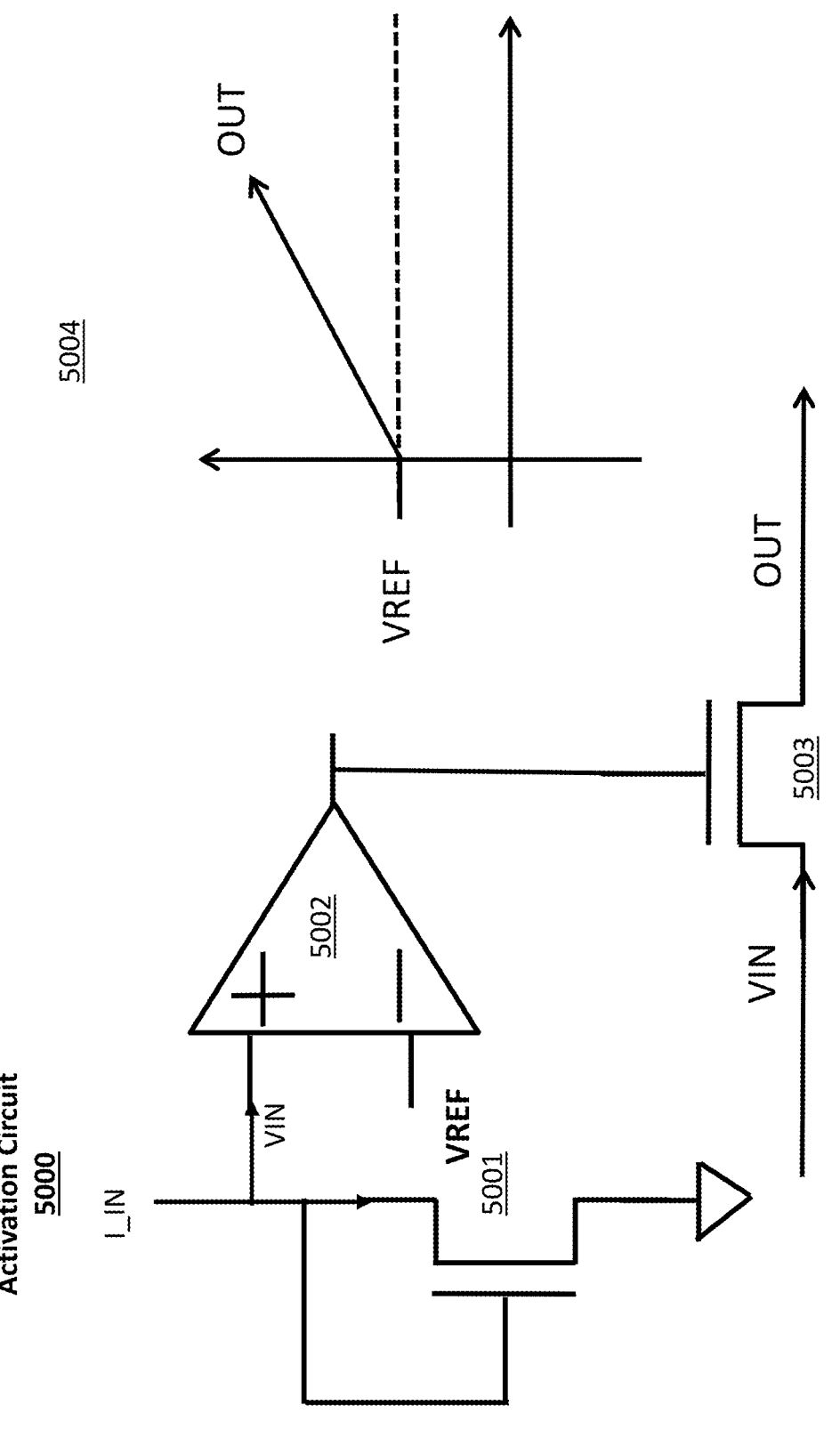
FIG. 50 depicts another example activation circuit.

FIG. 50 depicts activation circuit 5000, which is an example implementation of activation circuit 4201. Activation circuit 5000 comprises NMOS transistor 5001, operational amplifier 5002, and NMOS transistor 5003, arranged as shown. Activation circuit 5000 receives a current input, I_In, and generates a voltage output, OUT, according to a ReLu function, as shown by graph 5004.

Figure 51:
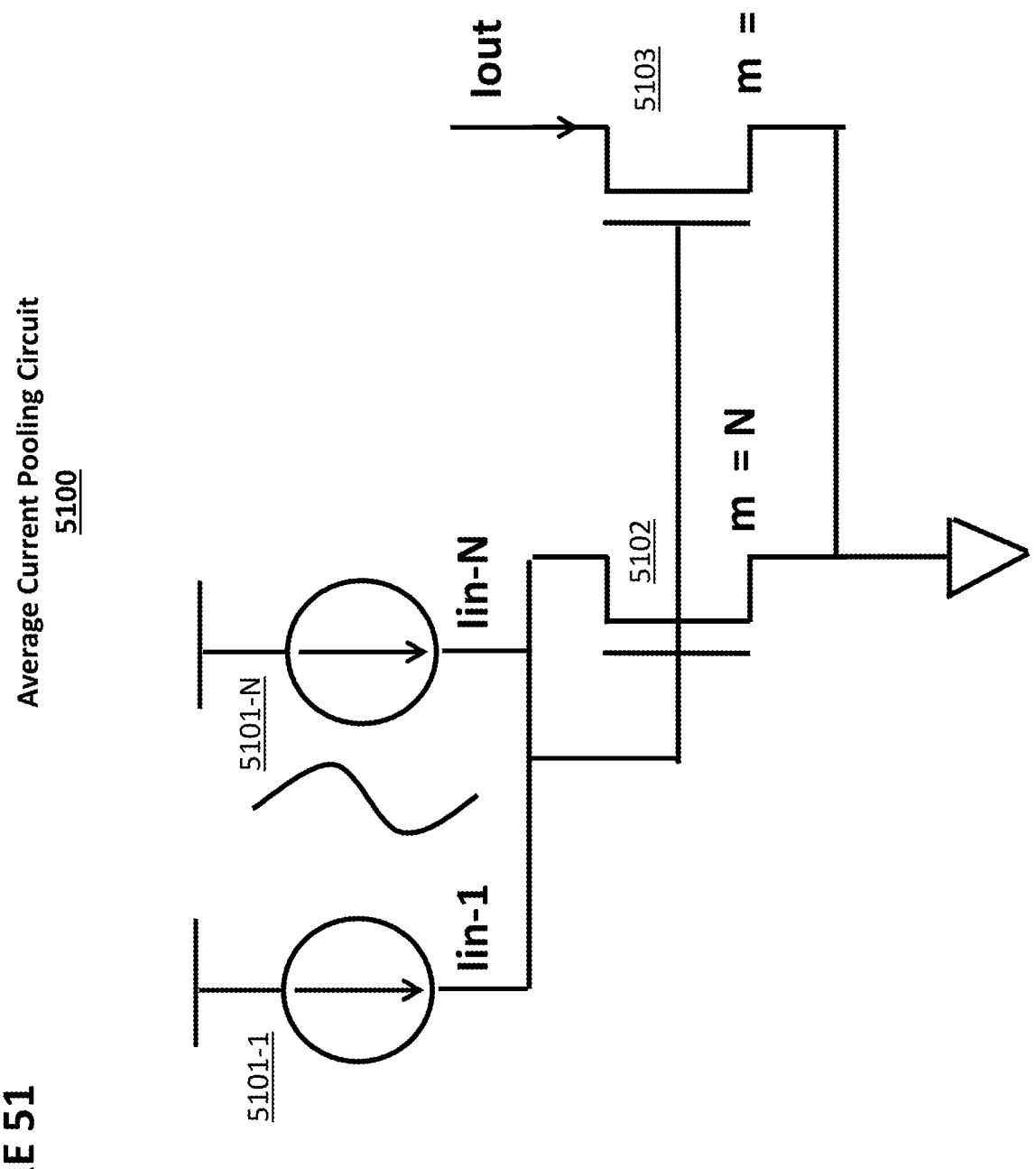
FIG. 51 depicts an example average current pooling circuit.

FIG. 51 depicts average current pooling circuit 5100, which optionally can be part of output circuit 3407 to perform an averaging function. Average current pooling circuit 5100 comprises N current sources 5101-1, . . . , 5101-N (which each represents current from a bitline in a VMM array), NMOS transistor 5102, and NMOS transistor 5103. NMOS transistor 5102 sums all of the received current from current sources 5101-1, . . . , 5101-N together. NMOS transistors 5102 and 5103 are arranged in a current mirror configuration. However, the width of NMOS transistors 5102 and 5103 differ by a factor of N, such that the current that is drawn through NMOS transistor 5103, Iout, is 1/N the current drawn by NMOS transistor 5102, which effectively generates an average of the current received from all N bit lines.

FIG. 52 depicts max voltage pooling circuit 5200, which optionally can be part of output circuit 3407. Max voltage pooling circuit 5200 receives n voltages (VIN1, . . . , VINn) and outputs the largest of the voltages as VOUT. It does this by comparing pairs of voltages (VIN1 and VIN2, . . . , VINn–1 and VINn) and outputting the larger of the two, and then comparing pairs of the results, and continuing that process until only one voltage remains, VOUT. The comparisons are done using circuit 5201, which comprises comparator 5202, NMOS transistor 5203, inverter 5204, and NMOS transistor 5205. Circuit 5201 receives two voltages, such as VIN1 and VIN 2, and outputs the voltage that is the larger of the two as OUT. In some detail, comparator 5202 outputs a high signal when VIN1 is greater than VIN2, which high signal turns on NMOS transistor 5203 to pass VIN1 to OUT, and via inverter 5204 turns off NMOS transistor 5205. Similarly, comparator 5202 outputs a low signal when VIN2 is greater than VIN1, which low signal turns off NMOS transistor 5203 and via inverter 5204 turns on NMOS transistor 5205 to pass VIN2 to OUT.

Figure 53:
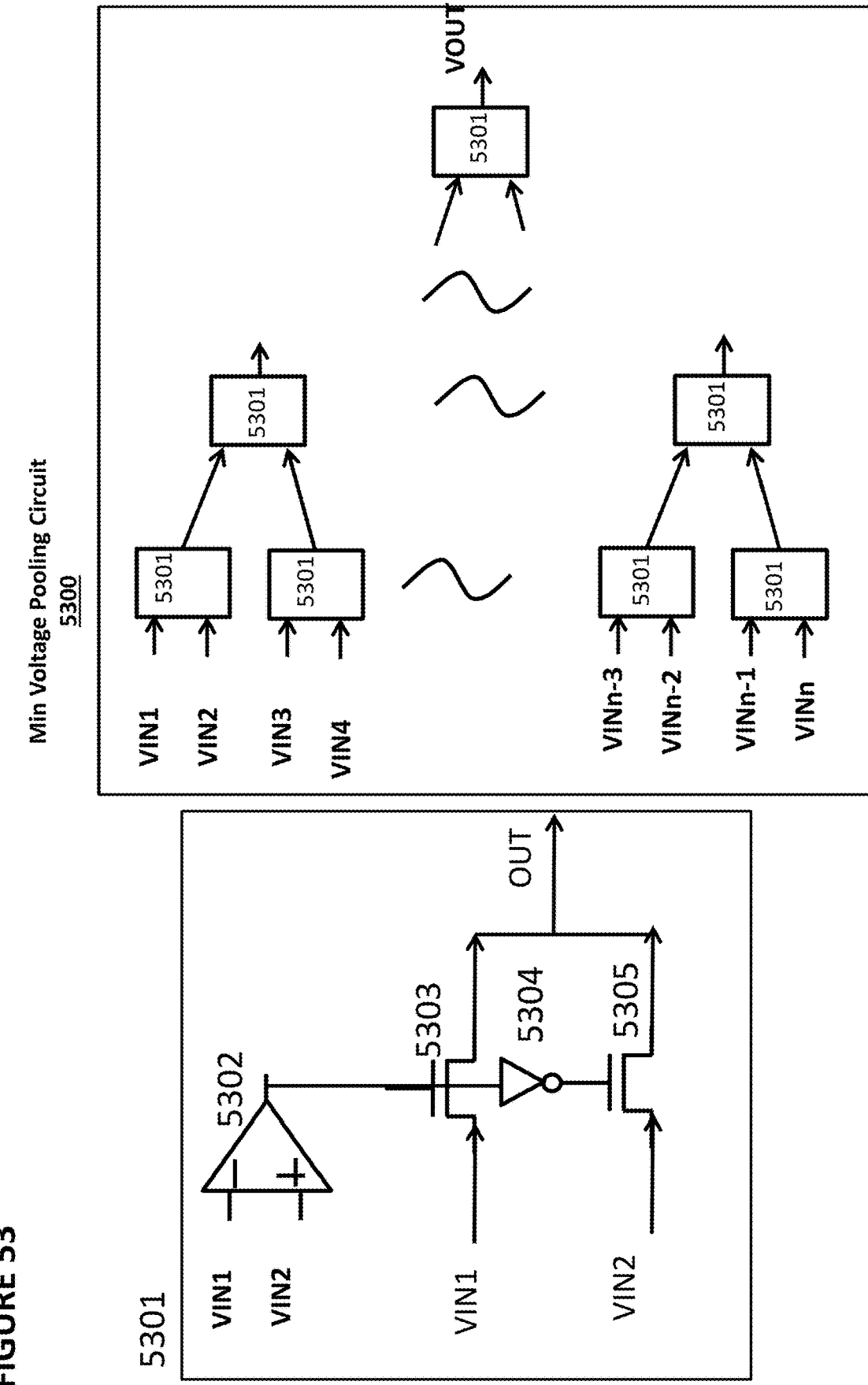
FIG. 53 depicts an example min voltage polling circuit.

FIG. 53 depicts min voltage pooling circuit 5300, which optionally can be part of output circuit 3407. Min voltage pooling circuit 5300 receives n voltages (VIN1, . . . , VINn) and outputs the smallest of the voltages as VOUT. It does this by comparing pairs of voltages (VIN1 and VIN2, . . . , VINn–1 and VINn) and outputting the smaller of the two, and then comparing pairs of the results, and continuing that process until only one voltage remains, VOUT. The comparisons are done using circuit 5301, which comprises comparator 5302, NMOS transistor 5303, inverter 5304, and NMOS transistor 5305. Circuit 5301 receives two voltages, such as VIN1 and VIN 2, and outputs the voltage that is the smaller of the two as OUT.

In some detail, comparator 5302 outputs a high signal when VIN1 is less than VIN2, which high signal turns on NMOS transistor 5203 to pass VIN1 to OUT, and via inverter 5204 turns off NMOS transistor 5205. Similarly, comparator 5202 outputs a low signal when VIN2 is less than VIN1, which low signal turns off NMOS transistor 5203 and via inverter 5204 turns on NMOS transistor 5205 to pass VIN2 to OUT.

It should be noted that, as used herein, the terms "over" and "on" both inclusively include "directly on" (no intermediate materials, elements or space disposed therebetween) and "indirectly on" (intermediate materials, elements or space disposed therebetween). Likewise, the term "adjacent" includes "directly adjacent" (no intermediate materials, elements or space disposed therebetween) and "indirectly adjacent" (intermediate materials, elements or space disposed there between), "mounted to" includes "directly mounted to" (no intermediate materials, elements or space disposed there between) and "indirectly mounted to" (intermediate materials, elements or spaced disposed there between), and "electrically coupled" includes "directly electrically coupled to" (no intermediate materials or elements there between that electrically connect the elements together) and "indirectly electrically coupled to" (intermediate materials or elements there between that electrically connect the elements together). For example, forming an element "over a substrate" can include forming the element directly on the substrate with no intermediate materials/elements therebetween, as well as forming the element indirectly on the substrate with one or more intermediate materials/elements there between.

What is claimed is:

1. A system comprising:
a vector by matrix multiplication array comprising a plurality of non-volatile memory cells arranged in rows and columns; and
an output circuit to receive a respective neuron current from respective columns of the vector by matrix multiplication array and to generate a respective output voltage, the output circuit comprising:
a neuron scalar to generate a scaled current from the received respective neuron current; and
a logarithmic current-to-voltage converter to convert the scaled current into the respective output voltage according to a logarithmic function of the scaled current, the logarithmic current-to-voltage converter comprising:
a reference memory cell comprising a bit line terminal coupled to receive the scaled current, a source line terminal coupled to ground, and a control gate terminal;
an operational amplifier comprising an inverting terminal for receiving the scaled current, a non-inverting terminal for receiving a reference voltage, and an output to provide the respective output voltage, wherein the output is coupled to the control gate terminal of the reference memory cell.

2. The system of claim 1, wherein the plurality of non-volatile memory cells comprises stacked-gate flash memory cells.

3. The system of claim 1, wherein the plurality of non-volatile memory cells comprises split-gate flash memory cells.

4. A system comprising:
a vector by matrix multiplication array comprising a plurality of non-volatile memory cells arranged in rows and columns; and an output circuit to receive a respective neuron current from the respective columns of the vector by matrix multiplication array and to generate a respective output voltage, the output circuit comprising:

a neuron scalar to generate a scaled current from the received respective neuron current;

an activation circuit to perform an activation function on the scaled current to generate an activation current; and a logarithmic current-to-voltage converter to convert the activation current into the respective output voltage according to a logarithmic function of the activation current, the logarithmic current-to-voltage converter comprising:

a reference memory cell comprising a bit line terminal coupled to receive the activation current, a source line terminal coupled to ground, and a control gate terminal;

an operational amplifier comprising an inverting terminal for receiving the activation current, a noninverting terminal for receiving a reference voltage, and an output to provide the respective output voltage, wherein the output is coupled to the control gate terminal of the reference memory cell.

5. The system of claim 4, wherein the activation function comprises a sigmoid function.

6. The system of claim 4, wherein the activation function comprises a tanh function.

7. The system of claim 4, wherein the activation function comprises a rectified linear activation function.

8. A system comprising:
a vector by matrix multiplication array comprising a plurality of non-volatile memory cells arranged in rows and columns; and an output circuit to receive a respective neuron current from respective columns of the vector by matrix multiplication array and to generate a respective output voltage, the output circuit comprising:

a neuron scalar to generate a scaled current from the received respective neuron current;

a logarithmic current-to-voltage converter to convert the scaled current into a converted voltage according to a logarithmic function of the scaled current, the logarithmic current-to-voltage converter comprising:

a reference memory cell comprising a bit line terminal coupled to receive the scaled current, a source line terminal coupled to ground, and a control gate terminal;

an operational amplifier comprising an inverting terminal for receiving the scaled current, a noninverting terminal for receiving a reference voltage, and an output to provide the respective output voltage, wherein the output is coupled to the control gate terminal of the reference memory cell; and an activation circuit to perform an activation function on the converted voltage to generate the respective output voltage.

9. The system of claim 8, wherein the activation function comprises a sigmoid function.

10. The system of claim 8, wherein the activation function comprises a tanh function.

11. The system of claim 8, wherein the activation function comprises a rectified linear activation function.

* * * * *